United States Patent
Wang et al.

(10) Patent No.: US 11,621,915 B2
(45) Date of Patent: Apr. 4, 2023

(54) PACKET FORWARDING METHOD, ROUTE SENDING AND RECEIVING METHOD, AND APPARATUS

(71) Applicant: HUAWEI TECHNOLOGIES CO., LTD., Shenzhen (CN)

(72) Inventors: Fang Wang, Beijing (CN); Tao Bai, Shenzhen (CN); Lei Fan, Beijing (CN); Jianbin Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/366,243

(22) Filed: Jul. 2, 2021

(65) Prior Publication Data

US 2022/0014465 A1    Jan. 13, 2022

(30) Foreign Application Priority Data

Jul. 7, 2020 (CN) .......................... 202010650282.5

(51) Int. Cl.
*H04L 45/586* (2022.01)
*G06F 9/455* (2018.01)
(Continued)

(52) U.S. Cl.
CPC ........ *H04L 45/586* (2013.01); *G06F 9/45558* (2013.01); *H04L 12/4641* (2013.01);
(Continued)

(58) Field of Classification Search
CPC ......... H04L 45/28; H04L 45/34; H04L 45/42; H04L 45/74; H04L 45/586; H04L 45/741;
(Continued)

(56) References Cited

U.S. PATENT DOCUMENTS

| | | | |
|---|---|---|---|
| 2014/0122634 A1 | 5/2014 | Conner et al. | |
| 2016/0149808 A1* | 5/2016 | Cai | ..................... H04L 12/4633 370/395.53 |

(Continued)

FOREIGN PATENT DOCUMENTS

| | | |
|---|---|---|
| CN | 106936739 A | 7/2017 |
| CN | 107995129 A | 5/2018 |

(Continued)

OTHER PUBLICATIONS

Banerjee, Amitabha, Rishi Mehta, and Zach Shen. "NUMA aware I/O in virtualized systems." 2015 IEEE 23rd Annual Symposium on High-Performance Interconnects. IEEE. (Year: 2015).*

(Continued)

*Primary Examiner* — John M MacIlwinen
(74) *Attorney, Agent, or Firm* — Rimon PC

(57) ABSTRACT

Embodiments of this application provide a packet forwarding method, a route sending and receiving method, and related apparatus. The method is applied to a data center in a non-uniform memory access (NUMA) architecture. The data center includes a server and a network device, and the server includes a first NUMA node and a second NUMA node. The method includes: The first interface processing unit (IPU) receives a first packet from the network device, where the first packet is a packet to be sent to the first virtual machine in the first NUMA node. The first IPU sends the first packet to the first virtual machine. The second IPU receives a second packet from the network device, where the second packet is a packet to be sent to the second virtual machine in the second NUMA node. The second IPU sends the second packet to the second virtual machine.

16 Claims, 41 Drawing Sheets

(51) Int. Cl.
  *H04L 12/46* (2006.01)
  *H04L 45/42* (2022.01)
  *H04L 45/741* (2022.01)
  *H04L 45/745* (2022.01)

(52) U.S. Cl.
  CPC ............ *H04L 45/42* (2013.01); *H04L 45/741* (2013.01); *H04L 45/745* (2013.01); *G06F 2009/45583* (2013.01); *G06F 2009/45595* (2013.01)

(58) Field of Classification Search
  CPC ............... H04L 45/745; H04L 12/4641; H04L 12/4633; H04L 12/4662; G06F 9/45558; G06F 2009/45583; G06F 2009/45595; G06F 9/45504
  See application file for complete search history.

(56) References Cited

U.S. PATENT DOCUMENTS

| | | | |
|---|---|---|---|
| 2017/0364279 A1 | 12/2017 | Banerjee et al. | |
| 2018/0307520 A1* | 10/2018 | Hyoudou | G06F 9/45558 |
| 2018/0375763 A1* | 12/2018 | Brissette | H04L 69/22 |
| 2019/0042298 A1* | 2/2019 | Sunku | G06F 9/5077 |
| 2019/0332408 A1* | 10/2019 | Jiang | H04L 69/22 |
| 2021/0029031 A1* | 1/2021 | Boutros | H04L 45/74 |

FOREIGN PATENT DOCUMENTS

| | | |
|---|---|---|
| CN | 109426544 A | 3/2019 |
| CN | 111198747 A | 5/2020 |
| EP | 3399709 A1 | 11/2018 |
| WO | 2019120233 A1 | 6/2019 |

OTHER PUBLICATIONS

Emmerich, Paul, et al. "Performance characteristics of virtual switching." 2014 IEEE 3rd International Conference on Cloud Networking (CloudNet). IEEE. (Year: 2015).*

Ren, Rong, Deng-Guo Feng, and Ke Ma. "Adetailed implement and analysis of MPLS VPN based on IPSec." Proceedings of 2004 International Conference on Machine Learning and Cybernetics (IEEE Cat. No. 04EX826). vol. 5. IEEE. (Year: 2004).*

Yao et al. English translation of WO 20200083016 A1. (Year: 2020).*

Gao et al. English translation of CN 107846342 A (Year: 2018).*

P. Psenak, Ed et al., IS-IS Extensions to Support Routing over IPv6 Dataplane, draft-bashandy-isis-srv6-extensions-05.txt. Networking Working Group, Mar. 6, 2019, total 21 pages.

C. Filsfils, Ed. et al., SRv6 Network Programming, draft-ietf-spring-srv6-network-programming-05, Spring Internet-Draft, Oct. 24, 2019, total 41 pages.

* cited by examiner

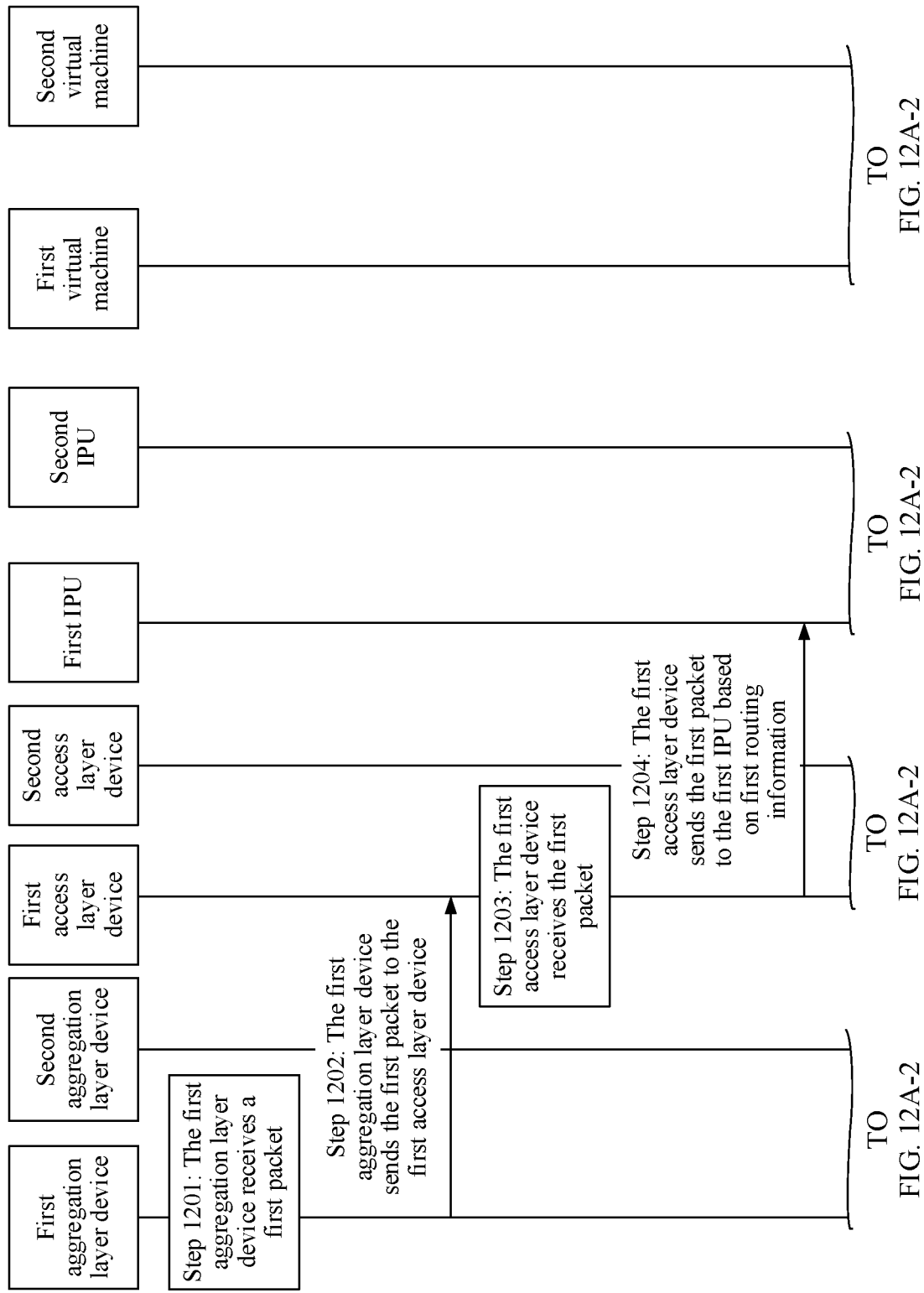

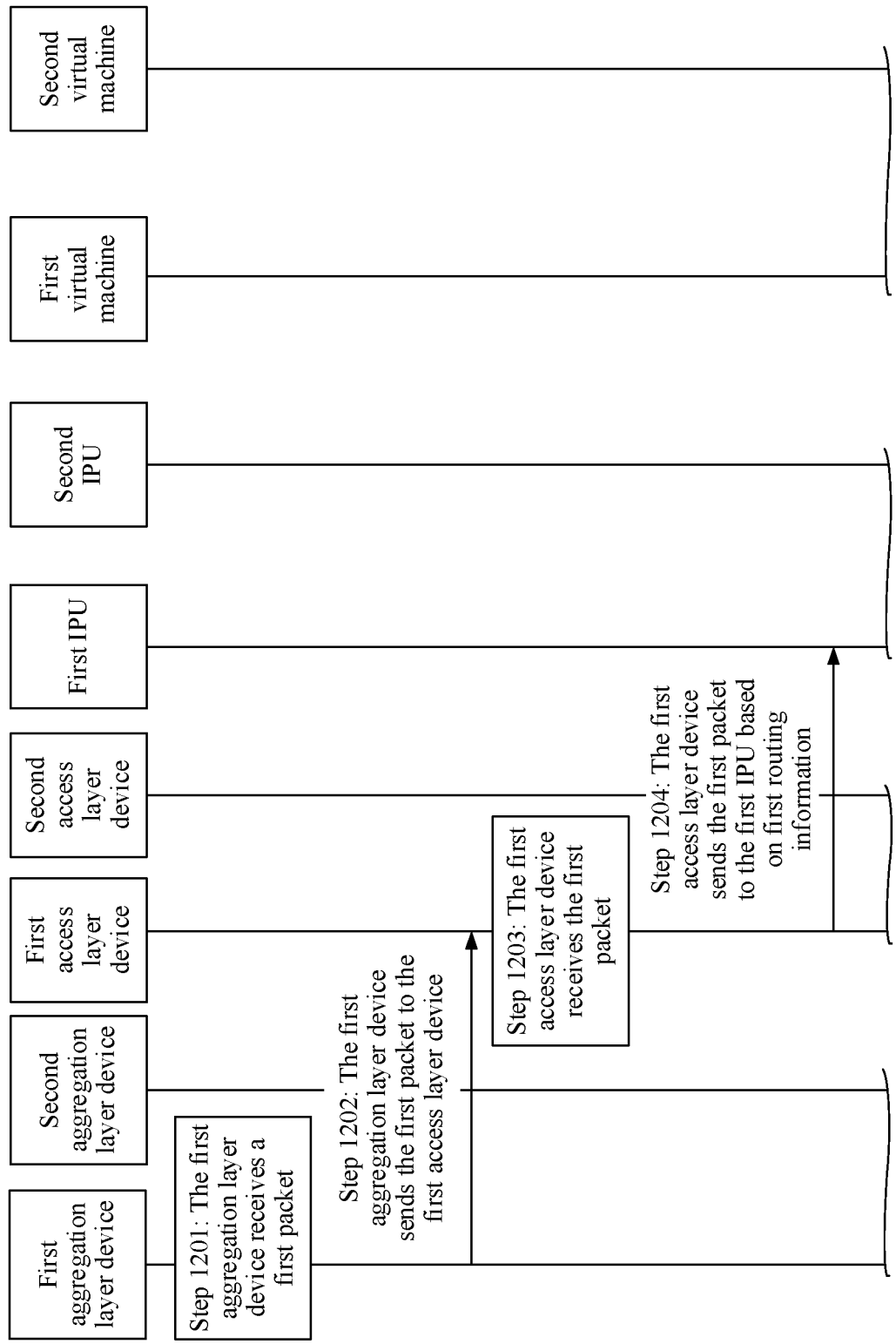

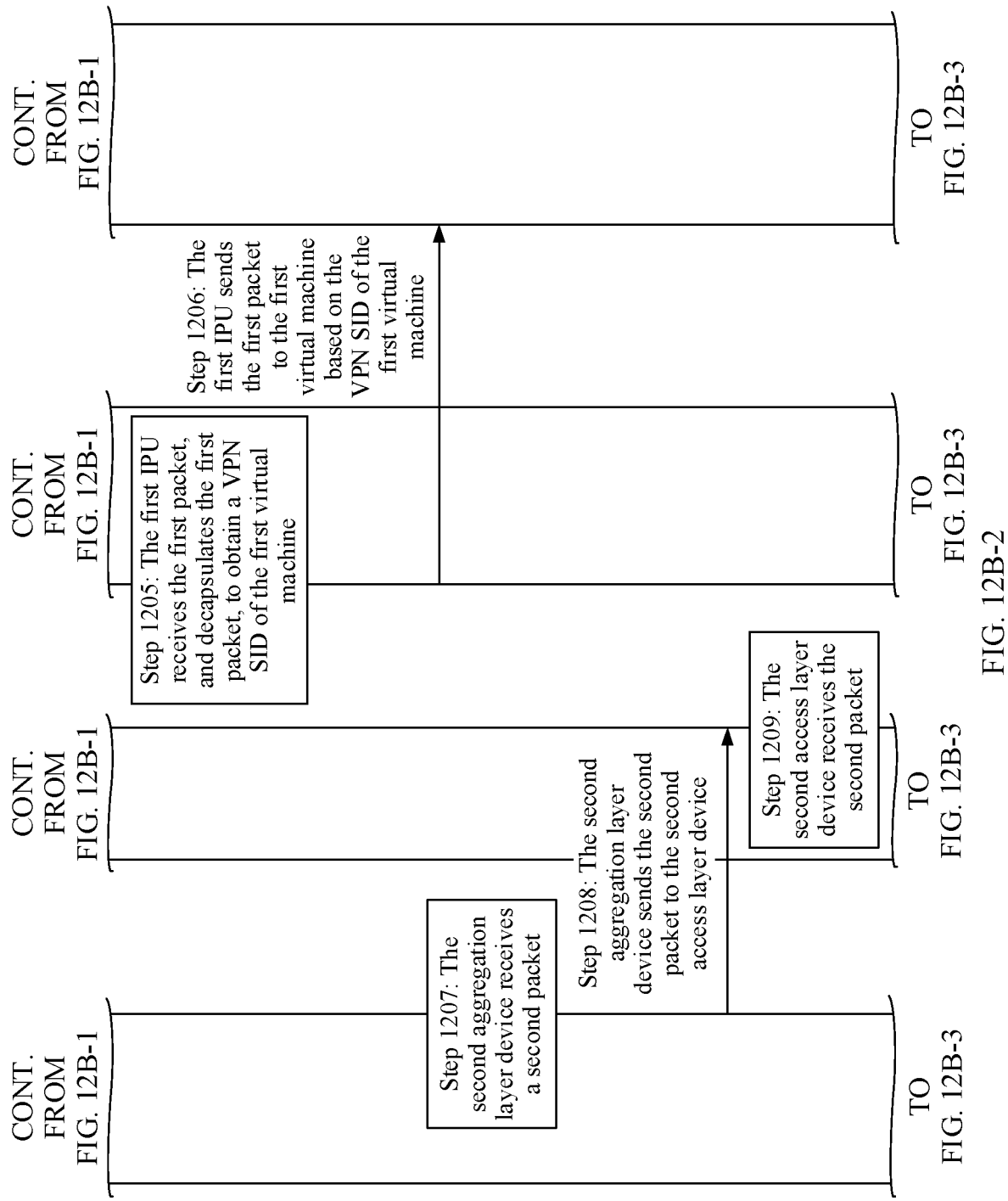

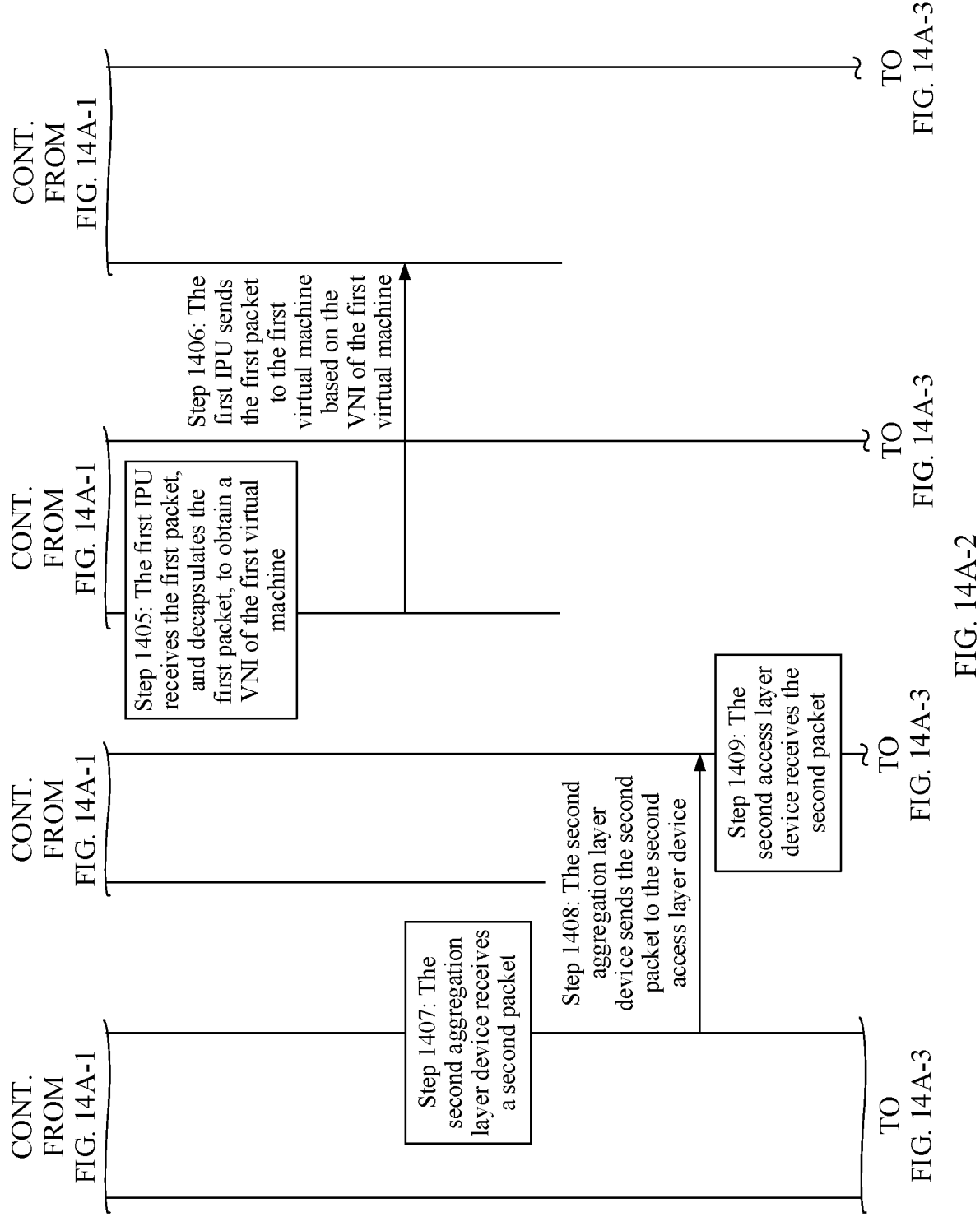

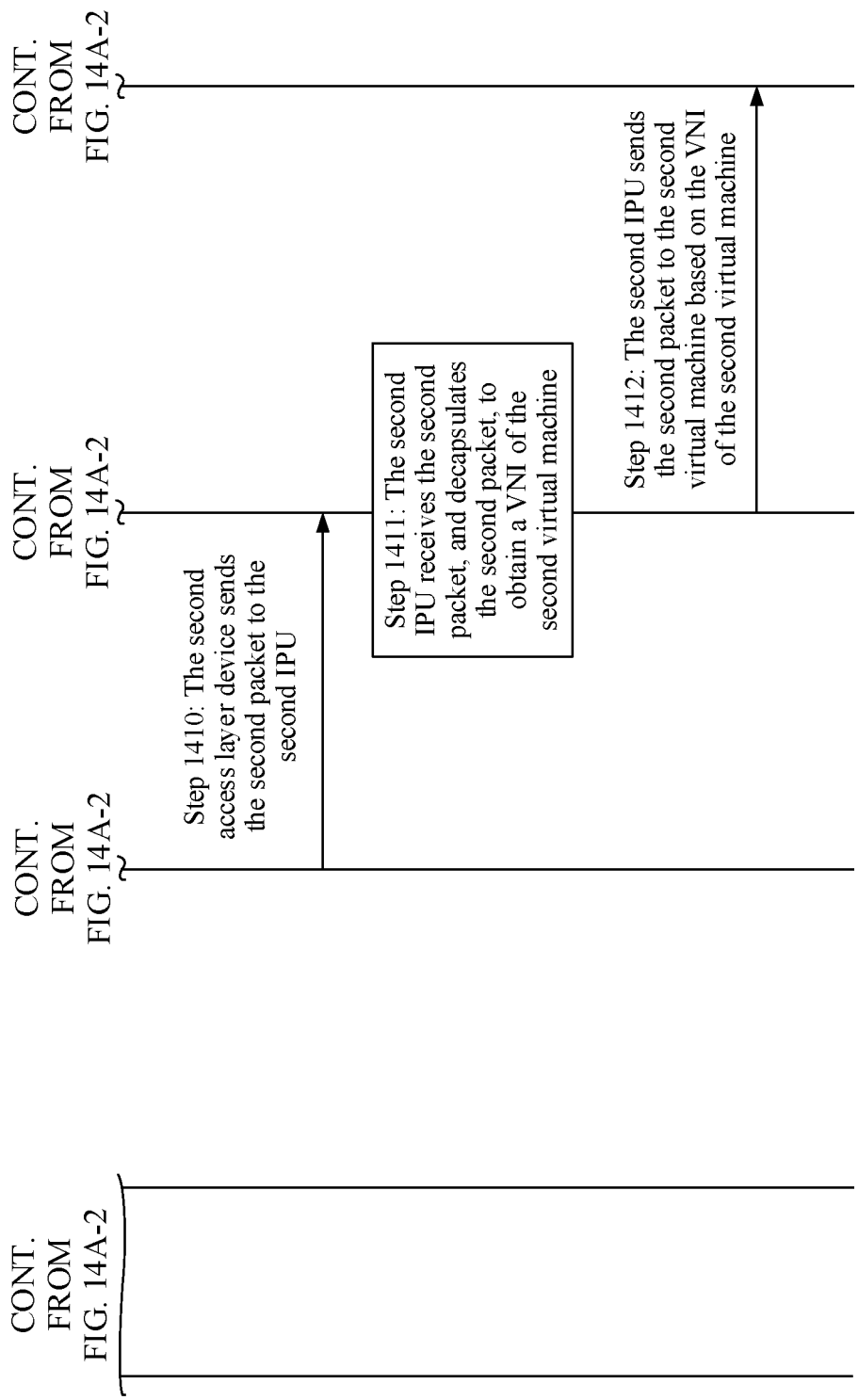

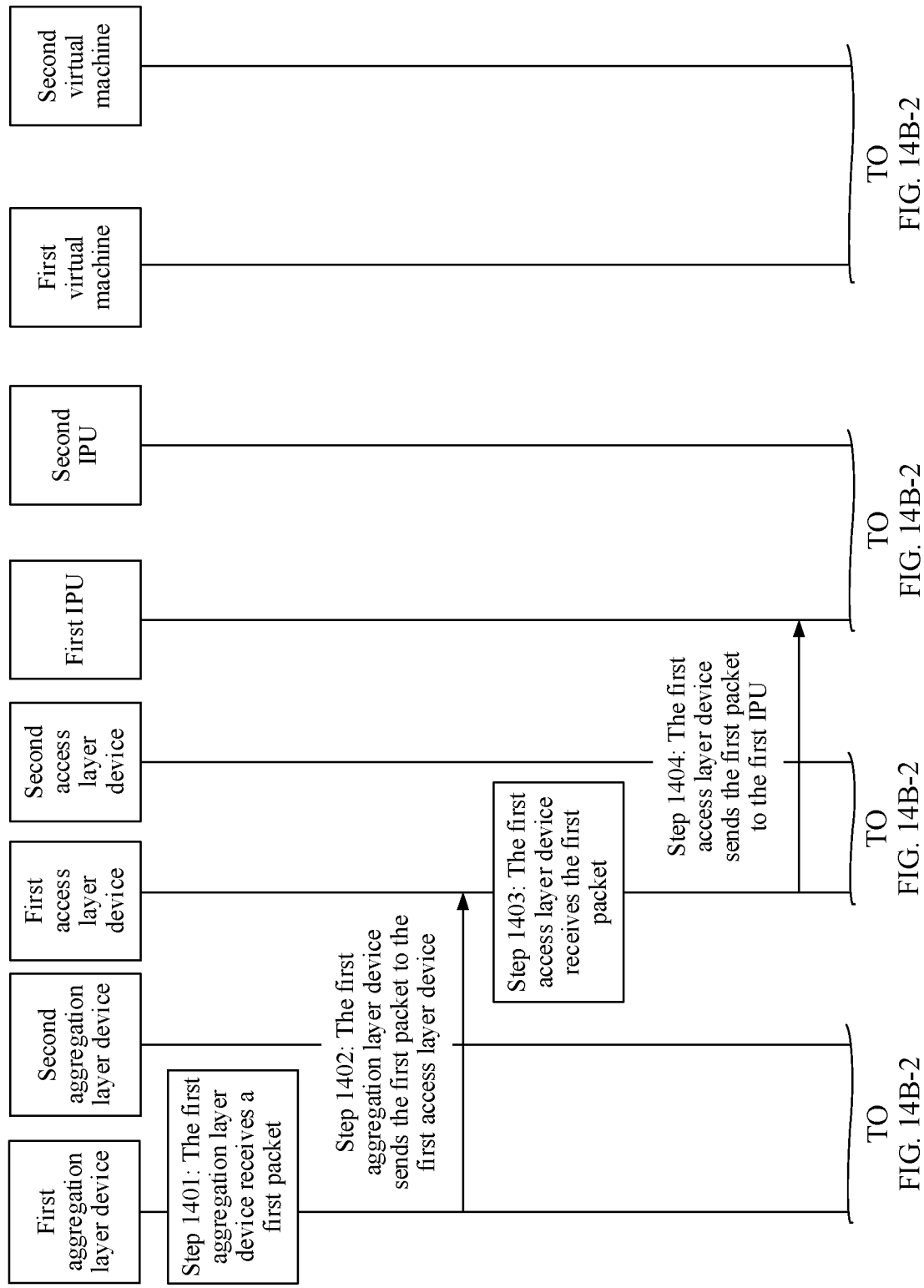

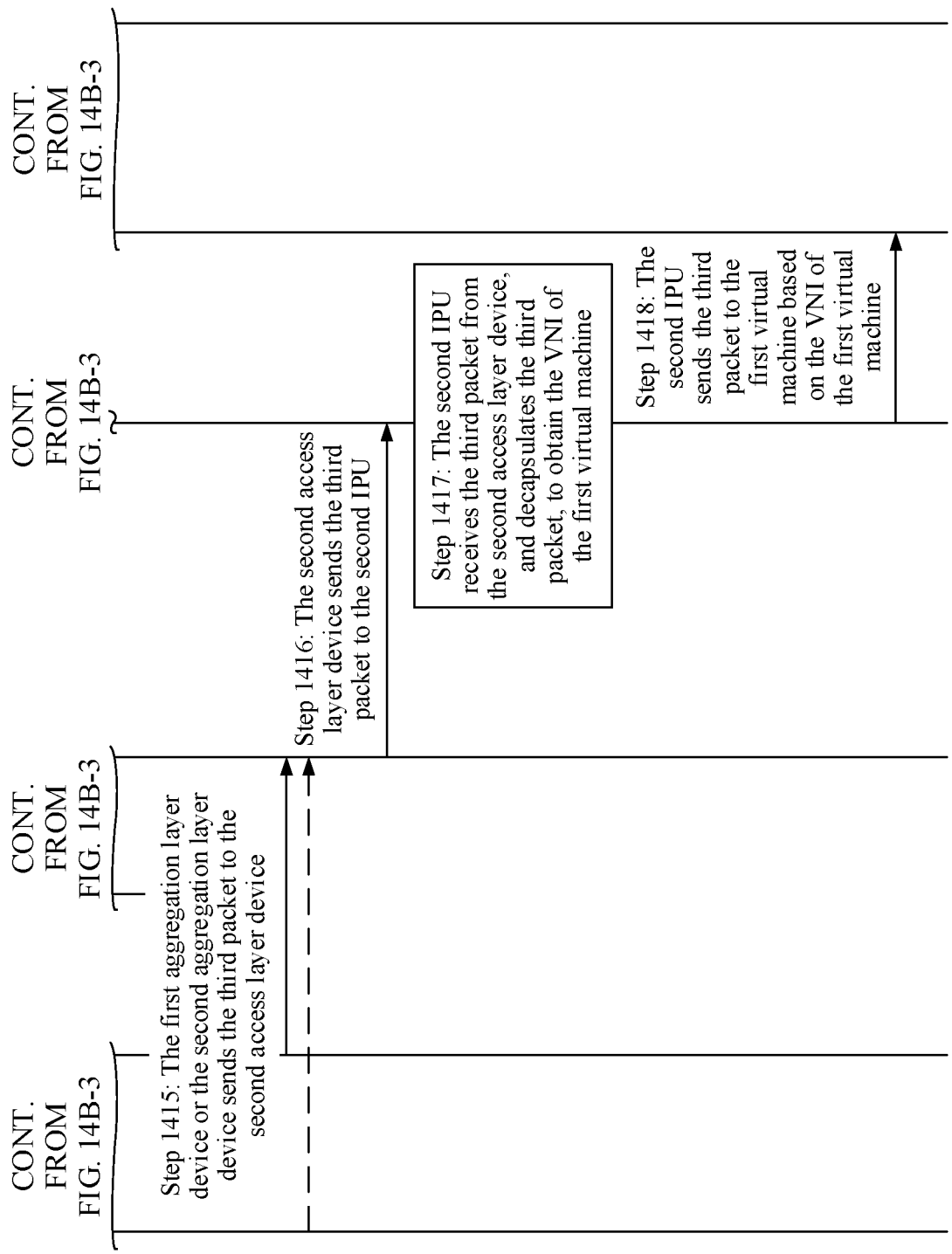

PACKET FORWARDING METHOD, ROUTE SENDING AND RECEIVING METHOD, AND APPARATUS

CROSS-REFERENCE TO RELATED APPLICATIONS

This application claims priority to Chinese Patent Application No. 202010650282.5, filed on Jul. 7, 2020, which is hereby incorporated by reference in its entirety.

TECHNICAL FIELD

Embodiments of this application relate to the field of communications technologies, and in particular, to a packet forwarding method, a route sending and receiving method, and related apparatus.

BACKGROUND

In a non-uniform memory access (NUMA) architecture, each NUMA node of a server corresponds to one memory, and a virtual machine and a virtual routing device are deployed on the server. One or more virtual machines may be created on each NUMA node, a virtual routing device is deployed on one NUMA node of the server, and the virtual machine communicates with the virtual routing device through memory sharing.

Packet forwarding is used as an example. It is assumed that a first virtual machine is created on a first NUMA node of a server, a second virtual machine is created on a second NUMA node of the server, and a virtual routing device is deployed on the first NUMA node. After the virtual routing device receives a packet from a network device, where a destination address of the packet is an address of the second virtual machine, the virtual routing device sends the packet to the second NUMA node, and caches the packet in a shared queue of a memory corresponding to the second NUMA node. The shared queue is a shared queue for the second virtual machine and the virtual routing device. The second virtual machine polls the shared queue to obtain the packet.

In the foregoing packet forwarding process, because the virtual routing device is deployed on the first virtual machine, the virtual routing device needs to send the packet to the second virtual machine across NUMA nodes. In the foregoing packet forwarding process, the virtual routing device needs to perform remote memory access. This causes packet transmission delay.

SUMMARY

Embodiments of this application provide a packet forwarding method, a route sending and receiving method, and an apparatus, to avoid remote memory access.

To achieve the foregoing objectives, the following technical solutions are used in the embodiments of this application.

According to a first aspect, an embodiment of this application provides a packet forwarding method. The method is applied to a data center in a NUMA architecture, the data center includes a server and a network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Based on the foregoing data center, the packet forwarding method provided in an embodiment of this application includes: The first IPU receives a first packet from the network device, where the first packet is a packet to be sent to the first virtual machine. The first IPU sends the first packet to the first virtual machine. The second IPU receives a second packet from the network device, where the second packet is a packet to be sent to the second virtual machine. The second IPU sends the second packet to the second virtual machine.

According to the packet forwarding method provided in some embodiments of this application, the first IPU of the virtual routing device receives, from the network device, a packet (that is, the first packet) to be sent to the first virtual machine, and the first IPU sends the first packet to the first virtual machine. Likewise, the virtual routing device receives, from the network device, a packet (that is, the second packet) to be sent to the second virtual machine, and the second IPU sends the second packet to the second virtual machine. Different IPUs are deployed on different NUMA nodes. Therefore, for a packet to be sent to a target virtual machine, the virtual routing device receives the packet by using an IPU on a NUMA node to which the target virtual machine belongs, and then the IPU sends the packet to the target virtual machine. That is, in the NUMA architecture, a packet is sent to a virtual machine on a local NUMA node by using an IPU on the local NUMA node, and there is no need to forward the packet across nodes, so that remote memory access can be avoided, thereby reducing a packet forwarding delay.

In a possible implementation, after a cloud management platform creates the first virtual machine on the first NUMA node of the server and creates the second virtual machine on the second NUMA node of the server based on a service requirement, the virtual routing device creates the first virtual port corresponding to the first IPU and the second virtual port corresponding to the second IPU, to implement communication between the virtual routing device and the virtual machine. The cloud management platform sends an invocation message to a virtual network interface agent (vRouter agent), where the invocation message is used to invoke the virtual network interface agent to initiate a virtual port creation procedure. The virtual network interface agent sends a port creation request message to a system management module of the virtual routing device.

The system management module of the virtual routing device sends a first virtual port creation request message to a virtual IO module of the first IPU, and the virtual IO module of the first IPU creates the first virtual port, and performs virtual IO protocol negotiation with the first virtual machine, to establish a data channel with the first virtual machine.

In addition, the system management module of the virtual routing device sends a second virtual port creation request message to a virtual IO module of the second IPU, and the virtual IO module of the second IPU creates the second virtual port, and performs virtual IO protocol negotiation with the second virtual machine, to establish a data channel with the second virtual machine.

In a possible implementation, when a communication fault occurs between the network device and the first IPU, the packet forwarding method provided in some embodiments of this application further includes: The second IPU receives a third packet from the network device, where the third packet is a packet to be sent to the first virtual machine. The second IPU sends the third packet to the first virtual machine.

In some embodiments of this application, the second IPU receives the third packet from the network device through the second physical port of the second IPU, and decapsulates the third packet. Then, the second IPU sends the third packet to the first IPU by using a virtual grid (vFabric) inside the virtual routing device, and the first IPU sends the third packet to the first virtual machine through the first virtual port of the first IPU.

When a communication fault occurs between the network device and the first IPU, the first IPU sends the received third packet (a packet to be sent to the first virtual machine) to the second IPU by using the network device, and the second IPU sends the third packet to the first virtual machine. Because the first virtual machine is located on the first NUMA node, and the second IPU is deployed on the second NUMA node, the virtual routing device performs remote memory access when a communication fault occurs, so as to ensure that the packet is successfully sent to the first virtual machine, thereby improving communication reliability.

In a possible implementation, when the data center is located in a segment routing over internet protocol version 6 (SRv6) network, an address of the IPU is an SRv6 locator, and a virtual private network identifier of the virtual machine is a VPN SID. That the first IPU sends the first packet to the first virtual machine includes: The first IPU decapsulates the first packet to obtain a VPN SID of the first virtual machine. The first IPU sends the first packet to the first virtual machine based on the VPN SID of the first virtual machine.

In a possible implementation, when the data center is located in a VxLAN network, an address of the IPU is a VxLAN tunnel endpoint (VTEP) address, where the VTEP address may be an IPv4 address or an IPv6 address, and a virtual private network identifier of the virtual machine is a virtual network identifier (VNI). That the first IPU sends the first packet to the first virtual machine includes: The first IPU decapsulates the first packet to obtain a VNI of the first virtual machine. The first IPU sends the first packet to the first virtual machine based on the VNI of the first virtual machine.

The packet forwarding method provided in the embodiments of this application may be applied to both the SRv6 network and the VxLAN network, and has relatively good applicability.

In a possible implementation, an address of the first IPU is different from an address of the second IPU. A virtual private network identifier of the first virtual machine is assigned based on the address of the first IPU, and a virtual private network identifier of the second virtual machine is assigned based on the address of the second IPU.

In some embodiments of this application, after the data center in the NUMA architecture is deployed, an administrator or a management device assigns a unique identifier to each IPU of the virtual routing device, where the unique identifier is used as an address of the IPU, and assigns, based on the identifier of the IPU, a virtual private network identifier to a virtual machine connected to the IPU. Optionally, the administrator may statically assign, based on the identifier of the IPU, a virtual private network identifier to the virtual machine connected to the IPU, or an MPU may dynamically assign, based on the identifier of the IPU, a virtual private network identifier to the virtual machine connected to the IPU.

According to a second aspect, an embodiment of this application provides a packet forwarding method. The method is applied to a data center in a NUMA architecture, the data center includes a server and a network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Based on the foregoing data center, the packet forwarding method provided in some embodiments of this application includes: The first IPU receives a first packet from the first virtual machine. The first IPU sends the first packet to the network device. The second IPU receives a second packet from the second virtual machine. The second IPU sends the second packet to the network device.

Specifically, the first IPU receives the first packet through the first virtual port of the first IPU, and encapsulates the first packet. Then, the first IPU determines, according to a local unit preference principle, to send the first packet to the network device through the first physical port of the first IPU. Likewise, the second IPU receives the second packet through the second virtual port of the second IPU, and encapsulates the second packet. Then, the second IPU determines, according to a local unit preference principle, to send the second packet to the network device through the second physical port of the second IPU.

The packet forwarding method provided in the embodiments of this application can be applied to the data center in the NUMA architecture. The first IPU of the virtual routing device receives the first packet from the first virtual machine, and sends the first packet to the network device by using the first IPU. Likewise, the second IPU of the virtual routing device receives the second packet from the second virtual machine, and sends the second packet to the network device by using the second IPU. Different IPUs are deployed on different NUMA nodes. Therefore, in the NUMA architecture, a packet sent by a virtual machine on a local NUMA node is forwarded by an IPU on the local NUMA node, and there is no need to forward the packet across nodes, so that remote memory access can be avoided, thereby reducing a packet forwarding delay.

In a possible implementation, when a communication fault occurs between the first IPU and the network device, the packet forwarding method provided in the embodiments of this application further includes: The first IPU receives a third packet from the first virtual machine. The first IPU sends the third packet to the second IPU. The second IPU sends the third packet to the network device.

Specifically, the first IPU receives the third packet from the first virtual port of the first IPU, and encapsulates the third packet. Then, the first IPU sends the third packet to the second IPU by using a virtual grid (vFabric) inside the virtual routing device.

When a communication fault occurs between the network device and the first IPU, a packet received by the first IPU of the virtual routing device from the first virtual machine is sent to the network device by using the second IPU of the virtual routing device. Because different IPUs are deployed on different NUMA nodes, the virtual routing device performs remote memory access when a communication fault occurs, so as to ensure that the packet is successfully sent to the first virtual machine, thereby improving communication reliability.

In a possible implementation, that the first IPU sends the first packet to the network device includes: The first IPU performs SRv6 encapsulation on the first packet, and sends the encapsulated first packet to the network device. Alternatively, the first IPU performs VxLAN encapsulation on the first packet, and sends the encapsulated first packet to the network device.

After receiving the first packet, the first IPU searches a private network routing table stored in the first IPU to obtain SRv6 encapsulation information of the first packet, and then encapsulates the first packet based on the SRv6 encapsulation information. Alternatively, after receiving the first packet, the first IPU searches a private network routing table stored in the first IPU to obtain VxLAN encapsulation information of the first packet, and then encapsulates the first packet based on the VxLAN encapsulation information.

According to a third aspect, an embodiment of this application provides a route sending method. The method is applied to a data center in a NUMA architecture, the data center includes a server and a network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Based on the foregoing data center, the route sending method provided in this embodiment of this application includes: The virtual routing device sends first routing information and second routing information to the network device, where the first routing information includes an address of the first IPU, and the second routing information includes an address of the second IPU. The first routing information is used to indicate to the network device to send a received first packet to the first IPU, and the first packet is a packet to be sent to the first virtual machine. The second routing information is used to indicate to the network device to send a received second packet to the second IPU, and the second packet is a packet to be sent to the second virtual machine.

According to the route sending method provided in this embodiment of this application, the virtual routing device sends the first routing information and the second routing information to the network device, and the network device may forward a packet based on the first routing information and the second routing information, so that an IPU on a local NUMA node can send the packet to a virtual machine on the local NUAM node, and there is no need to forward the packet across nodes. Therefore, remote memory access can be avoided, thereby reducing a packet forwarding delay.

In a possible implementation, that the virtual routing device sends first routing information and second routing information to the network device includes: The virtual routing device sends the first routing information to the network device by using the first IPU. The virtual routing device sends the second routing information to the network device by using the second IPU.

In a possible implementation, when the data center is located in an SRv6 network, an address of the IPU is an SRv6 locator, and a virtual private network identifier of the virtual machine is a VPN SID.

In a possible implementation, the route sending method provided in the embodiments of this application further includes: The virtual routing device sends third routing information to the network device, where the third routing information includes an address of the virtual routing device. The third routing information is used to indicate to the network device to send a received third packet to the second IPU when a communication fault occurs between the network device and the first IPU, where the third packet is a packet to be sent to the first virtual machine. Alternatively, the third routing information is used to indicate to the network device to send a received fourth packet to the first IPU when a communication fault occurs between the network device and the second IPU, where the fourth packet is a packet to be sent to the second virtual machine.

In some embodiments of this application, the virtual routing device sends the third routing information to the network device. In this way, when a communication fault occurs between the network device and the first IPU, the network device sends, to the first virtual machine based on the third routing information by using the second IPU, a received packet (for example, the third packet) to be sent to the first virtual machine. Because the first virtual machine is located on the first NUMA node, and the second IPU is deployed on the second NUMA node, the virtual routing device performs remote memory access when a communication fault occurs, so as to ensure that the packet is successfully sent to the first virtual machine, thereby improving communication reliability.

In a possible implementation, when the data center is located in a VxLAN network, an address of the IPU is a VxLAN tunnel endpoint (VTEP) address, and a virtual private network identifier of the virtual machine is a VNI.

In a possible implementation, the first routing information further includes the address of the second IPU, and a priority of the address of the first IPU in the first routing information is higher than a priority of the address of the first IPU in the second routing information.

In a possible implementation, the second routing information further includes the address of the first IPU, and a priority of the address of the second IPU in the second routing information is higher than a priority of the address of the second IPU in the first routing information.

In some embodiments of this application, the priority of the address of the first IPU in the first routing information is higher than the priority of the address of the first IPU in the second routing information. When a communication fault occurs between the network device and the first IPU, the network device sends, to the first IPU by using the second IPU, a received packet (for example, the third packet) to be sent to the first virtual machine, and the first IPU sends the third packet to the first virtual machine. Because the first virtual machine is located on the first NUMA node, and the second IPU is deployed on the second NUMA node, the virtual routing device performs remote memory access when a communication fault occurs, so as to ensure that the packet is successfully sent to the first virtual machine, thereby improving communication reliability.

Optionally, when sending the address of the first IPU and the address of the second IPU, the virtual routing device may carry priority indication information of the IPU. For example, the priority indication information of the IPU may be overhead information. When the virtual routing device sends the first routing information, overhead information corresponding to the address of the first IPU that is sent through the first physical port is low overheads, and overhead information corresponding to the address of the second IPU that is sent through the first physical port is high overheads. When the virtual routing device sends the second routing information, overhead information corresponding to the address of the second IPU that is sent through the second physical port is low overheads, and overhead information corresponding to the address of the first IPU that is sent through the second physical port is high overheads. In this case, the priority of the address of the first IPU in the first routing information is higher than the priority of the address of the first IPU in the second routing information, and the priority of the address of the second IPU in the second routing information is higher than the priority of the address of the second IPU in the first routing information.

The priority indication information of the IPU may alternatively be indication information in another form. For example, identification information is used to indicate the priority of the address of the IPU. This is specifically determined based on an actual situation. This is not limited in this embodiment of this application.

In a possible implementation, the route sending method provided in this application further includes: The virtual routing device receives fourth routing information from the network device, where the fourth routing information is used to indicate to the virtual routing device to send a packet whose destination address is the network device to the network device.

In a possible implementation, the virtual routing device further includes at least one MPU.

According to a fourth aspect, an embodiment of this application provides a packet forwarding method. The method is applied to a data center in a NUMA architecture, the data center includes a server and a network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Based on the foregoing data center, the packet forwarding method provided in this application includes: The network device receives a first packet, where the first packet is a packet to be sent to the first virtual machine. The network device sends the first packet to the first IPU. The network device receives a second packet, where the second packet is a packet to be sent to the second virtual machine. The network device sends the second packet to the second IPU.

According to the packet forwarding method provided in this application, the network device forwards, to the first IPU of the virtual routing device based on first routing information, a packet (that is, the first packet) to be sent to the first virtual machine, and the first IPU sends the first packet to the first virtual machine. Likewise, the network device forwards, to the second IPU of the virtual routing device based on second routing information, a packet (that is, the second packet) to be sent to the second virtual machine, and the second IPU sends the second packet to the second virtual machine. Different IPUs are deployed on different NUMA nodes. Therefore, for a packet to be sent to a target virtual machine, the virtual routing device receives the packet by using an IPU on a NUMA node to which the target virtual machine belongs, and then the IPU sends the packet to the target virtual machine. That is, in the NUMA architecture, a packet is sent to a virtual machine on a local NUMA node by using an IPU on the local NUMA node, and there is no need to forward the packet across nodes, so that remote memory access can be avoided, thereby reducing a packet forwarding delay.

In a possible implementation, the packet forwarding method provided in this embodiment of this application further includes: When a communication fault occurs between the network device and the first IPU, the network device sends a third packet to the second IPU, where the third packet is a packet to be sent to the first virtual machine.

When a communication fault occurs between the network device and the first IPU, the first IPU sends the received third packet (a packet to be sent to the first virtual machine) to the second IPU by using the network device, and the second IPU sends the third packet to the first virtual machine. Because the first virtual machine is located on the first NUMA node, and the second IPU is deployed on the second NUMA node, the virtual routing device performs remote memory access when a communication fault occurs, so as to ensure that the packet is successfully sent to the first virtual machine, thereby improving communication reliability.

In a possible implementation, the network device stores first routing information and second routing information. The first routing information includes an address of the first IPU, and the first routing information is used to indicate to the network device to send the received first packet to the first IPU. The second routing information includes an address of the second IPU, and the second routing information is used to indicate to the network device to send the received second packet to the second IPU.

In a possible implementation, the first routing information further includes the address of the second IPU, and a priority of the address of the first IPU in the first routing information is higher than a priority of the address of the first IPU in the second routing information.

In a possible implementation, the second routing information further includes the address of the first IPU, and a priority of the address of the second IPU in the second routing information is higher than a priority of the address of the second IPU in the first routing information.

According to a fifth aspect, an embodiment of this application provides a packet forwarding method. The method is applied to a data center in a NUMA architecture, the data center includes a server and a network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Based on the foregoing data center, the packet forwarding method provided in this embodiment of this application includes: The network device receives a first packet sent by the first IPU, where the first packet is received by the first IPU from the first virtual machine. The network device receives a second packet sent by the second IPU, where the second packet is received by the second IPU from the second virtual machine.

According to the packet forwarding method provided in this embodiment of this application, the network device receives the first packet that is from the first virtual machine and that is sent by the first IPU, and receives the second packet that is from the second virtual machine and that is sent by the second IPU. Different IPUs are deployed on different NUMA nodes. Therefore, in the NUMA architecture, a packet sent by a virtual machine on a local NUMA node is forwarded by an IPU on the local NUMA node, and there is no need to forward the packet across nodes, so that remote memory access can be avoided, thereby reducing a packet forwarding delay.

In a possible implementation, when a communication fault occurs between the network device and the first IPU, the packet forwarding method provided in this embodiment of this application further includes: The network device receives a third packet sent by the second IPU, where the third packet is received by the second IPU from the first IPU, and the third packet is received by the first IPU from the first virtual machine.

According to a sixth aspect, an embodiment of this application provides a route receiving method. The method is applied to a data center in a NUMA architecture, the data center includes a server and a network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Based on the foregoing packet forwarding method, the route receiving method provided in this application includes: The network device receives first routing information and second routing information from the virtual routing device, where the first routing information includes an address of the first IPU, and the second routing information includes an address of the second IPU. The first routing information is used to indicate to the network device to send a received first packet to the first IPU, and the first packet is a packet to be sent to the first virtual machine. The second routing information is used to indicate to the network device to send a received second packet to the second IPU, and the second packet is a packet to be sent to the second virtual machine.

In a possible implementation, that the network device receives first routing information and second routing information from the virtual routing device includes: The network device receives the first routing information from the first IPU of the virtual routing device. The network device receives the second routing information from the second IPU of the virtual routing device.

In a possible implementation, the route receiving method provided in this application further includes: The network device receives third routing information from the virtual routing device, where the third routing information includes an address of the virtual routing device. The third routing information is used to indicate to the network device to send a received third packet to the second IPU when a communication fault occurs between the network device and the first IPU, where the third packet is a packet to be sent to the first virtual machine. Alternatively, the third routing information is used to indicate to the network device to send a received fourth packet to the first IPU when a communication fault occurs between the network device and the second IPU, where the fourth packet is a packet to be sent to the second virtual machine.

In a possible implementation, the first routing information further includes the address of the second IPU, and a priority of the address of the first IPU in the first routing information is higher than a priority of the address of the first IPU in the second routing information.

In a possible implementation, the second routing information further includes the address of the first IPU, and a priority of the address of the second IPU in the second routing information is higher than a priority of the address of the second IPU in the first routing information.

With reference to the third aspect and the possible implementations of the third aspect and the sixth aspect and the possible implementations of the sixth aspect, in the foregoing route sending and receiving processes, a device (including the virtual routing device, the network device, or the like) in the data center may forward a packet based on routing information, to ensure that the packet is successfully forwarded.

According to a seventh aspect, an embodiment of this application provides a computer device. The computer device is applied to a virtual routing device, the virtual routing device is applied to a data center in a NUMA architecture, the data center includes a server and a network device, a virtual machine and the virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine.

The virtual routing device includes a first IPU, configured to: receive a first packet from the network device, where the first packet is a packet to be sent to the first virtual machine; and send the first packet to the first virtual machine. The first IPU is located on the first NUMA node, the first IPU includes a first virtual port and a first physical port, the first IPU is connected to the first virtual machine through the first virtual port, and the first IPU is connected to the network device through the first physical port.

The virtual routing device includes a second IPU, configured to: receive a second packet from the network device, where the second packet is a packet to be sent to the second virtual machine; and send the second packet to the second virtual machine. The second IPU is located on the second NUMA node, the second IPU includes a second virtual port and a second physical port, the second IPU is connected to the second virtual machine through the second virtual port, and the second IPU is connected to the network device through the second physical port.

In a possible implementation, the second IPU is further configured to: when a communication fault occurs between the network device and the first IPU, receive a third packet from the network device, where the third packet is a packet to be sent to the first virtual machine; and send the third packet to the first virtual machine.

In a possible implementation, when the data center is located in an SRv6 network, an address of the IPU is an SRv6 locator, and a virtual private network identifier of the virtual machine is a VPN SID. The first IPU is configured to: decapsulate the first packet to obtain a VPN SID of the first virtual machine; and send the first packet to the first virtual machine based on the VPN SID of the first virtual machine.

In a possible implementation, when the data center is located in a VxLAN network, an address of the IPU is a VxLAN tunnel endpoint (VTEP) address, and a virtual private network identifier of the virtual machine is a VNI. The first IPU is configured to: decapsulate the first packet to obtain a VNI of the first virtual machine; and send the first packet to the first virtual machine based on the VNI of the first virtual machine.

In a possible implementation, an address of the first IPU is different from an address of the second IPU. A virtual private network identifier of the first virtual machine is assigned based on the address of the first IPU, and a virtual private network identifier of the second virtual machine is assigned based on the address of the second IPU.

According to an eighth aspect, an embodiment of this application provides a computer device. The computer device is applied to a virtual routing device, the virtual routing device is applied to a data center in a NUMA architecture, the data center includes a server and a network device, a virtual machine and the virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine.

The virtual routing device includes a first IPU, configured to: receive a first packet from the first virtual machine; and send the first packet to the network device. The first IPU is located on the first NUMA node, the first IPU includes a first virtual port and a first physical port, the first IPU is connected to the first virtual machine through the first virtual port, and the first IPU is connected to the network device through the first physical port.

The virtual routing device includes a second IPU, configured to: receive a second packet from the second virtual machine; and send the second packet to the network device. The second IPU includes a second virtual port and a second physical port, the second IPU is connected to the second virtual machine through the second virtual port, and the second IPU is connected to the network device through the second physical port.

In a possible implementation, the first IPU is further configured to: when a communication fault occurs between the first IPU and the network device, receive a third packet from the first virtual machine; and send the third packet to the second IPU. The second IPU is further configured to send the third packet to the network device.

In a possible implementation, the first IPU is configured to: perform SRv6 encapsulation on the first packet, and send the encapsulated first packet to the network device. Alternatively, the first IPU is configured to: perform VxLAN encapsulation on the first packet, and send the encapsulated first packet to the network device.

According to a ninth aspect, an embodiment of this application provides a computer device. The computer device is applied to a virtual routing device, the virtual routing device is applied to a data center in a NUMA architecture, the data center includes a server and a network device, a virtual machine and the virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine.

The virtual routing device includes a first IPU, configured to send first routing information to the network device, where the first routing information includes an address of the first IPU, the first routing information is used to indicate to the network device to send a received first packet to the first IPU, and the first packet is a packet to be sent to the first virtual machine. The first IPU is located on the first NUMA node, the first IPU includes a first virtual port and a first physical port, the first IPU is connected to the first virtual machine through the first virtual port, and the first IPU is connected to the network device through the first physical port.

The virtual routing device includes a second IPU, configured to send second routing information to the network device, where the second routing information includes an address of the second IPU, the second routing information is used to indicate to the network device to send a received second packet to the second IPU, and the second packet is a packet to be sent to the second virtual machine. The second IPU is located on the second NUMA node, the second IPU includes a second virtual port and a second physical port, the second IPU is connected to the second virtual machine through the second virtual port, and the second IPU is connected to the network device through the second physical port.

In a possible implementation, when the data center is located in an SRv6 network, an address of the IPU is an SRv6 locator, and a virtual private network identifier of the virtual machine is a VPN SID.

In a possible implementation, the first IPU is further configured to send third routing information to the network device, where the third routing information includes an address of the virtual routing device. The third routing information is used to indicate to the network device to send a received third packet to the second IPU when a communication fault occurs between the network device and the first IPU, where the third packet is a packet to be sent to the first virtual machine. Alternatively, the second IPU of the virtual routing device is further configured to send third routing information to the network device, where the third routing information is used to indicate to the network device to send a received fourth packet to the first IPU when a communication fault occurs between the network device and the second IPU, where the fourth packet is a packet to be sent to the second virtual machine.

In a possible implementation, when the data center is located in a VxLAN network, an address of the IPU is a VxLAN tunnel endpoint (VTEP) address, and a virtual private network identifier of the virtual machine is a VNI.

In a possible implementation, the first routing information further includes the address of the second IPU, and a priority of the address of the first IPU in the first routing information is higher than a priority of the address of the first IPU in the second routing information.

In a possible implementation, the second routing information further includes the address of the first IPU, and a priority of the address of the second IPU in the second routing information is higher than a priority of the address of the second IPU in the first routing information.

In a possible implementation, the first IPU of the virtual routing device is further configured to receive fourth routing information from the network device, where the fourth routing information is used to indicate to the first IPU to send a packet whose destination address is the network device to the network device. Alternatively, the second IPU of the virtual routing device is further configured to receive fourth routing information from the network device, where the fourth routing information is used to indicate to the second IPU to send a packet whose destination address is the network device to the network device.

In a possible implementation, the virtual routing device further includes at least one main processing unit MPU.

According to a tenth aspect, an embodiment of this application provides a network device, including a receiving module and a sending module. The network device is applied to a data center in a NUMA architecture, the data center further includes a server, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

The receiving module is configured to receive a first packet, where the first packet is a packet to be sent to the first virtual machine. The sending module is configured to send the first packet to the first IPU. The receiving module is further configured to receive a second packet, where the second packet is a packet to be sent to the second virtual machine. The sending module is further configured to send the second packet to the second IPU.

In a possible implementation, the sending module is further configured to: when a communication fault occurs between the network device and the first IPU, send a third packet to the second IPU, where the third packet is a packet to be sent to the first virtual machine.

In a possible implementation, the network device provided in this application further includes a storage module. The storage module is configured to store first routing information and second routing information. The first routing information includes an address of the first IPU, and the first routing information is used to indicate to the network device to send the received first packet to the first IPU. The second routing information includes an address of the second IPU, and the second routing information is used to indicate to the network device to send the received second packet to the second IPU.

In a possible implementation, the first routing information further includes the address of the second IPU, and a priority of the address of the first IPU in the first routing information is higher than a priority of the address of the first IPU in the second routing information.

In a possible implementation, the second routing information further includes the address of the first IPU, and a priority of the address of the second IPU in the second routing information is higher than a priority of the address of the second IPU in the first routing information.

According to an eleventh aspect, an embodiment of this application provides a network device that includes a receiving module. The network device is applied to a data center in a NUMA architecture, the data center further includes a server, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

The receiving module is configured to: receive a first packet sent by the first IPU, where the first packet is received by the first IPU from the first virtual machine; and receive a second packet sent by the second IPU, where the second packet is received by the second IPU from the second virtual machine.

In a possible implementation, the receiving module is further configured to receive a third packet sent by the second IPU, where the third packet is received by the second IPU from the first IPU, and the third packet is received by the first IPU from the first virtual machine.

According to a twelfth aspect, an embodiment of this application provides a network device, including a receiving module. The network device is applied to a data center in a NUMA architecture, the data center further includes a server, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

The receiving module is configured to receive first routing information and second routing information from the virtual routing device, where the first routing information includes an address of the first IPU, and the second routing information includes an address of the second IPU. The first routing information is used to indicate to the network device to send a received first packet to the first IPU, and the first packet is a packet to be sent to the first virtual machine. The second routing information is used to indicate to the network device to send a received second packet to the second IPU, and the second packet is a packet to be sent to the second virtual machine.

In a possible implementation, the receiving module is configured to: receive the first routing information from the first IPU of the virtual routing device; and receive the second routing information from the second IPU of the virtual routing device.

In a possible implementation, the receiving module is further configured to receive third routing information from the virtual routing device, where the third routing information includes an address of the virtual routing device. The third routing information is used to indicate to the network device to send a received third packet to the second IPU when a communication fault occurs between the network device and the first IPU, where the third packet is a packet to be sent to the first virtual machine. Alternatively, the third routing information is used to indicate to the network device to send a received fourth packet to the first IPU when a communication fault occurs between the network device and the second IPU, where the fourth packet is a packet to be sent to the second virtual machine.

In a possible implementation, the first routing information further includes the address of the second IPU, and a priority of the address of the first IPU in the first routing information is higher than a priority of the address of the first IPU in the second routing information.

In a possible implementation, the second routing information further includes the address of the first IPU, and a priority of the address of the second IPU in the second routing information is higher than a priority of the address of the second IPU in the first routing information.

According to a thirteenth aspect, an embodiment of this application provides a computer device, including a memory and at least one processor connected to the memory. The memory is configured to store instructions, and after the instructions are read by the at least one processor, the method in any one of the first aspect, the second aspect, or the third aspect, or the possible implementations of the first aspect, the second aspect, or the third aspect is performed.

According to a fourteenth aspect, an embodiment of this application provides a computer-readable storage medium. The computer-readable storage medium includes a computer program, and when the computer program is run on a computer, the method in any one of the first aspect, the second aspect, or the third aspect, or the possible implementations of the first aspect, the second aspect, or the third aspect is performed.

According to a fifteenth aspect, an embodiment of this application provides a computer program product including instructions. When the computer program product is run on a computer, the computer is enabled to perform the method in any one of the first aspect, the second aspect, or the third aspect, or the possible implementations of the first aspect, the second aspect, or the third aspect.

According to a sixteenth aspect, an embodiment of this application provides a chip, including a memory and a processor. The memory is configured to store computer instructions. The processor is configured to invoke and run the computer instructions in the memory, to perform the method in any one of the first aspect, the second aspect, or the third aspect, or the possible implementations of the first aspect, the second aspect, or the third aspect.

According to a seventeenth aspect, an embodiment of this application provides a network device, including a memory and at least one processor connected to the memory. The memory is configured to store instructions, and after the instructions are read by the at least one processor, the method in any one of the fourth aspect, the fifth aspect, or the sixth aspect, or the possible implementations of the fourth aspect, the fifth aspect, or the sixth aspect is performed.

According to an eighteenth aspect, an embodiment of this application provides a computer-readable storage medium. The computer-readable storage medium includes a computer program, and when the computer program is run on a computer, the method in any one of the fourth aspect, the fifth aspect, or the sixth aspect, or the possible implementations of the fourth aspect, the fifth aspect, or the sixth aspect is performed.

According to a nineteenth aspect, an embodiment of this application provides a computer program product including instructions. When the computer program product is run on a computer, the computer is enabled to perform the method in any one of the fourth aspect, the fifth aspect, or the sixth aspect, or the possible implementations of the fourth aspect, the fifth aspect, or the sixth aspect.

According to a twentieth aspect, an embodiment of this application provides a chip, including a memory and a processor. The memory is configured to store computer instructions. The processor is configured to invoke and run the computer instructions in the memory, to perform the method in any one of the fourth aspect, the fifth aspect, or the sixth aspect, or the possible implementations of the fourth aspect, the fifth aspect, or the sixth aspect.

According to a twenty-first aspect, an embodiment of this application provides a data center, including a server and a network device. A virtual machine and a virtual routing device are deployed on the server, and the virtual machine communicates with the network device by using the virtual routing device. The server includes a first NUMA node and a second NUMA node, and the virtual machine includes a first virtual machine and a second virtual machine. The first NUMA node includes the first virtual machine, and the second NUMA node includes the second virtual machine. The virtual routing device includes a first IPU and a second IPU. The first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port. The virtual routing device is the computer device in any one of the seventh aspect, the eighth aspect, or the ninth aspect, or the possible implementations of the seventh aspect, the eighth aspect, or the ninth aspect, and the network device is the network device in any one of the tenth aspect, the eleventh aspect, or the twelfth aspect, or the possible implementations of the tenth aspect, the eleventh aspect, or the twelfth aspect.

It should be understood that, for beneficial effects achieved by the technical solutions in the seventh aspect to the twenty-first aspect and the corresponding possible implementations in the embodiments of this application, refer to the foregoing technical effects in the first aspect to the sixth aspect and the corresponding possible implementations. Details are not described herein again.

BRIEF DESCRIPTION OF DRAWINGS

FIG. 9B-1 and FIG. 9B-2 are a second schematic diagram of a packet forwarding method according to an embodiment of this application;

FIG. 12A-1 to FIG. 12A-3 are a fifth schematic diagram of a packet forwarding method according to an embodiment of this application;

FIG. 12B-1 to FIG. 12B-4 are a sixth schematic diagram of a packet forwarding method according to an embodiment of this application;

FIG. 13B-1 and FIG. 13B-2 are an eighth schematic diagram of a packet forwarding method according to an embodiment of this application;

FIG. 14A-1 to FIG. 14A-3 are a ninth schematic diagram of a packet forwarding method according to an embodiment of this application;

FIG. 14B-1 to FIG. 14B-4 are a tenth schematic diagram of a packet forwarding method according to an embodiment of this application;

FIG. 15B-1 and FIG. 15B-2 are a twelfth schematic diagram of a packet forwarding method according to an embodiment of this application;

DESCRIPTION OF EMBODIMENTS

The term "and/or" in this specification describes only an association relationship for describing associated objects and indicates that there may be three relationships. For example, A and/or B may represent the following three cases: Only A exists, both A and B exist, and only B exists.

In the specification and claims in the embodiments of this application, the terms such as "first" and "second" are intended to distinguish between different objects, but are not intended to describe a specific order of the objects. For example, a first NUMA node and a second NUMA node are intended to distinguish between different NUMA nodes, but are not intended to describe a specific order of the NUMA nodes, and a first IPU and a second IPU, and a first virtual machine and a second virtual machine have similar meanings; and a first packet and a second packet are intended to distinguish between different packets, but are not intended to describe a specific order of the packets, and first routing information, second routing information, third routing information and fourth routing information have similar meanings.

In the embodiments of this application, the words such as "example" or "for example" are used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a related concept in a specific manner.

In descriptions of the embodiments of this application, unless otherwise stated, "a plurality of" means two or more. For example, a plurality of network devices mean two or more network devices, and a plurality of NUMA nodes mean two or more NUMA nodes.

Some concepts and background information related to a packet forwarding method, a route sending and receiving method, and an apparatus provided in the embodiments of this application are first described.

Brief introduction to a NUMA architecture: In the NUMA architecture, a central processing unit (CPU) of a server in a data center includes a plurality of nodes (these nodes are collectively referred to as a NUMA node in the embodiments of this application), each NUMA node corresponds to one memory space and one memory controller, and different nodes are connected by using a bus.

Figure 1:
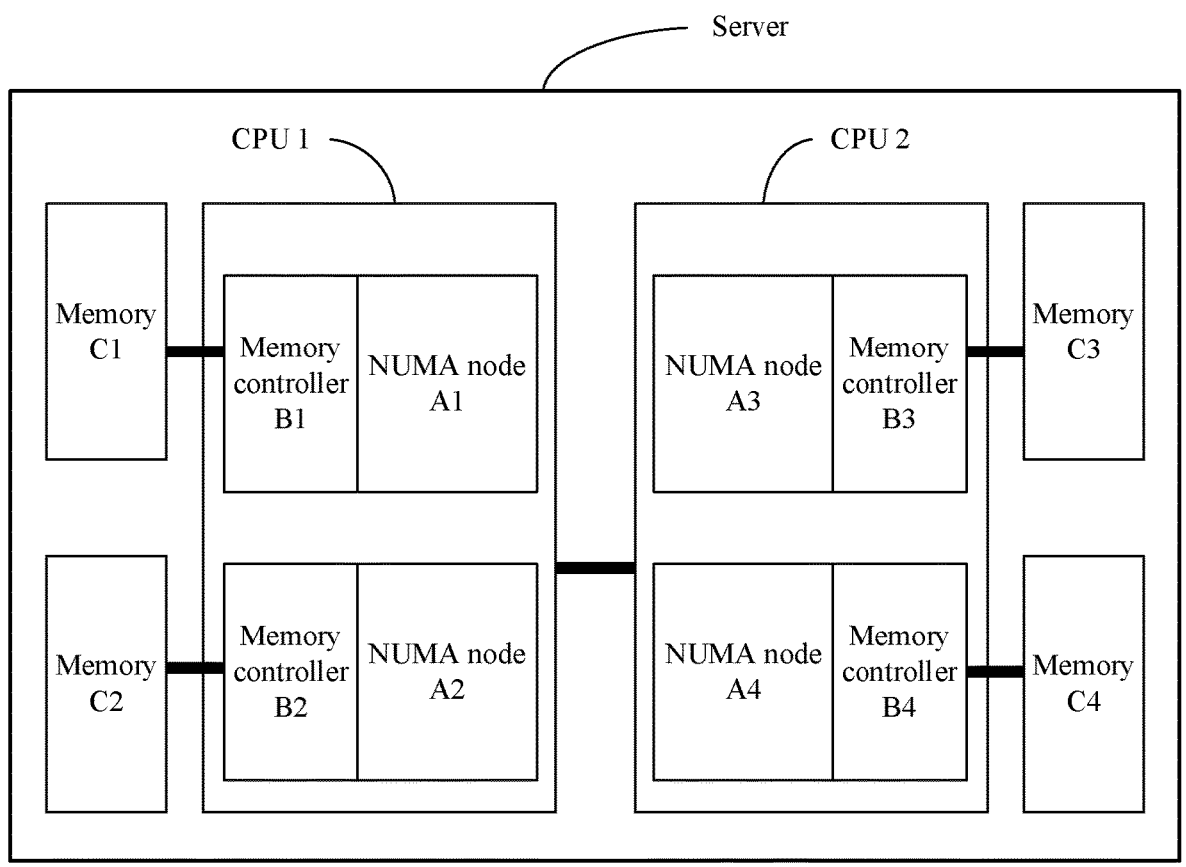
FIG. 1 is a first schematic structural diagram of a server according to an embodiment of this application.

As shown in FIG. 1, it is assumed that the foregoing server includes a CPU 1 and a CPU 2. The CPU 1 includes two NUMA nodes: a NUMA node A1 and a NUMA node A2. A memory space and a memory controller that correspond to the NUMA node A1 are respectively a memory B1 and a memory controller C1. A memory space and a memory controller that correspond to the NUMA node A2 are respectively a memory B2 and a memory controller C2. The CPU 2 includes two NUMA nodes: a NUMA node A3 and a NUMA node A4. A memory space and a memory controller that correspond to the NUMA node A3 are respectively a memory B3 and a memory controller C3. A memory space and a memory controller that correspond to the NUMA node A4 are respectively a memory B4 and a memory controller C4.

For example, when the NUMA node A1 needs to access the memory B1, the NUMA node A1 may access the memory B1 by using the memory controller C1 corresponding to the NUMA node A1. This memory access process is local memory access. For another example, when the NUMA node A1 needs to access the memory B3 corresponding to the NUMA node A3, the NUMA node A1 accesses the memory B3 by using a bus between the NUMA nodes. This memory access process is remote memory access. It should be understood that a delay of remote memory access is greater than a delay of local memory access. Therefore, the remote memory access possibly cannot meet a requirement of a delay-sensitive application or service.

Figure 2:
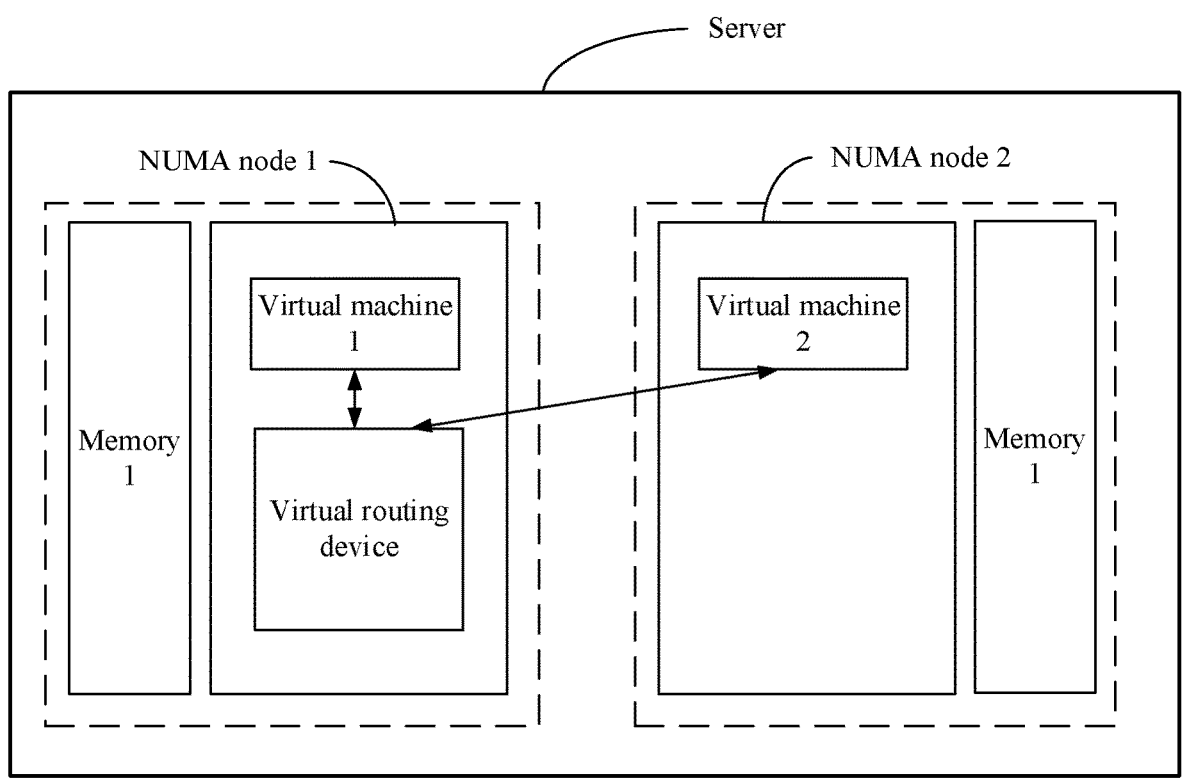
FIG. 2 is a second schematic structural diagram of a server according to an embodiment of this application.

For example, in a data transmission system (the data transmission system is briefly referred to as a data center below) in a NUMA architecture, as shown in FIG. 2, a server in the data center includes a NUMA node 1 and a NUMA node 2. A virtual machine 1 is created on the NUMA node 1, and a memory space corresponding to the NUMA node 1 is a memory 1. A virtual machine 2 is created on the NUMA node 2, a memory space corresponding to the NUMA node 2 is a memory 2. A virtual routing device is deployed on the NUMA node 1.

When the virtual routing device receives a packet 1 from a network device (for example, an access layer device), and a destination address of the packet 1 is an address of the virtual machine 1, the virtual routing device needs to send the packet 1 to the virtual machine 1. Specifically, after receiving the packet 1, the virtual routing device caches the packet 1 in a shared queue in the memory 1. The shared queue is a shared queue for the virtual machine 1 and the virtual routing device. Further, the virtual machine 1 polls the shared queue to obtain the packet 1. It can be learned that the packet 1 is forwarded from the virtual routing device to the virtual machine 1 in a local node (that is, the NUMA node 1). This may also be understood as that a forwarding process of the packet 1 is local forwarding, and the virtual routing device performs local memory access in the forwarding process of the packet 1.

When the virtual routing device receives a packet 2 from a network device (for example, an access layer device), and a destination address of the packet 2 is an address of the virtual machine 2, the virtual routing device needs to send the packet 2 to the virtual machine 2. Specifically, after receiving the packet 2, the virtual routing device sends the packet 2 to the second NUMA node, and caches the packet in a shared queue in the memory 2. The shared queue is a shared queue for the virtual machine 2 and the virtual routing device. Further, the virtual machine 2 polls the shared queue to obtain the packet 2. It can be learned that the packet 2 needs to be sent to the virtual machine 2 across nodes (that is, sent from the NUMA node 1 to the NUMA node 2). This may also be understood as that a forwarding process of the packet 2 is cross-node forwarding, and the virtual routing device performs remote memory access in the forwarding process of the packet 2.

To resolve the problem mentioned in the background, the embodiments of this application provide a packet forwarding method, a route sending and receiving method, and an apparatus, which are applied to a data center in a NUMA architecture, so as to avoid remote memory access in the NUMA architecture, thereby reducing a packet forwarding delay. The embodiments of this application mainly relate to the following three aspects of a data center.

A first aspect relates to deployment of a data center in a NUMA architecture, especially deployment of a virtual routing device in the data center.

A second aspect relates to configuration of routing information that is implemented based on the data center deployed in the NUMA architecture, where the configuration of the routing information includes generation, sending, and receiving of the routing information.

A third aspect relates to forwarding of a packet that is performed based on the data center deployed in the NUMA architecture and the configured routing information, where a packet forwarding process includes an uplink forwarding process and a downlink forwarding process.

The following describes in detail the packet forwarding method, the route sending and receiving method, and the apparatus provided in the embodiments of this application from the foregoing three aspects.

Figure 3:
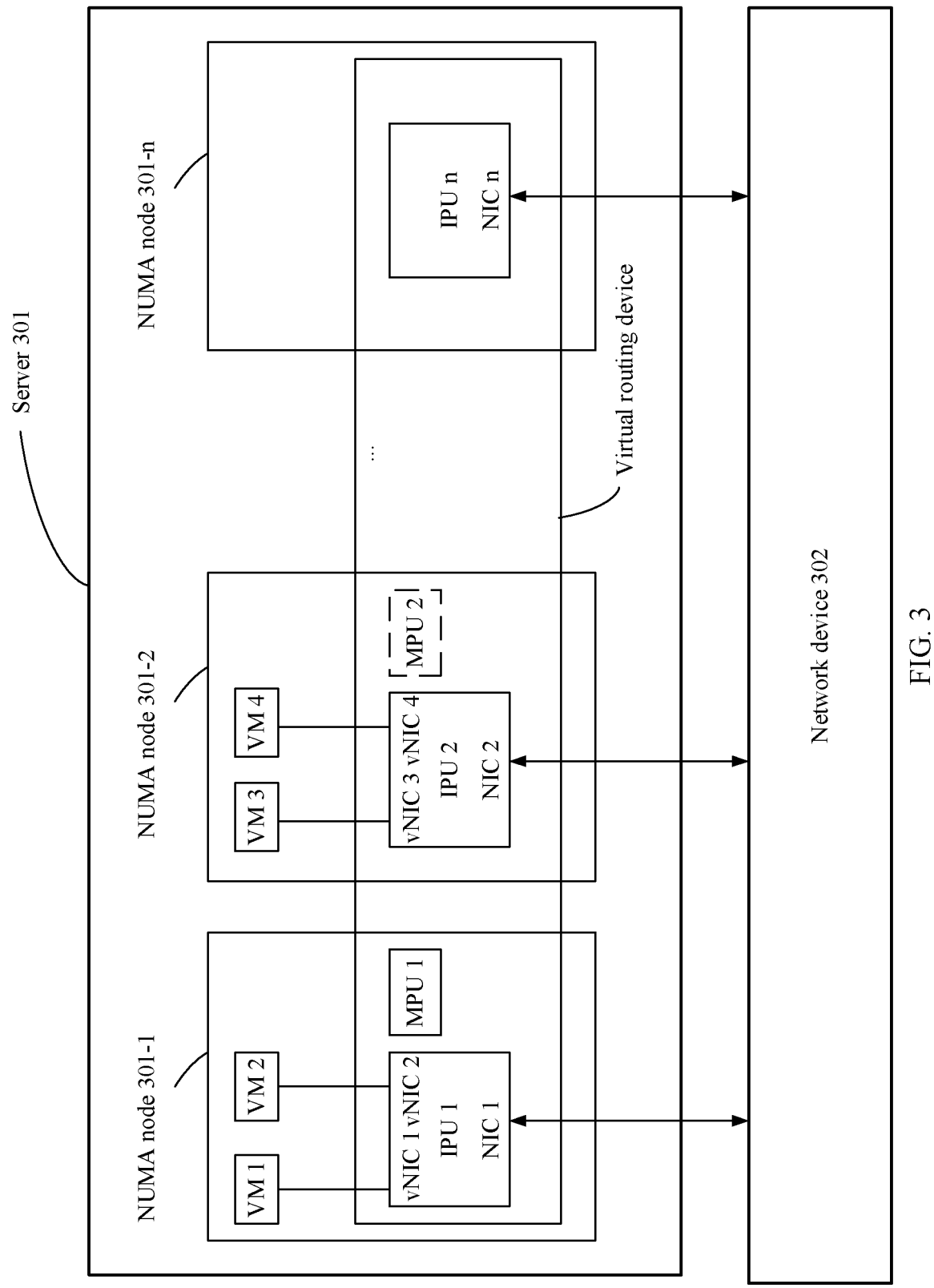
FIG. 3 is a first schematic architectural diagram of a data center according to an embodiment of this application.

The embodiments of this application provide a data transmission system (the data transmission system is briefly referred to as a data center in the following embodiments) in a NUMA architecture. As shown in FIG. 3, the data center includes a server 301 and a network device 302, the server 301 includes a virtual machine and a virtual routing device, and the virtual machine communicates with the network device by using the virtual routing device. The server 301 includes a plurality of NUMA nodes. In FIG. 3, the plurality of NUMA nodes are denoted as a NUMA node 301-1, a NUMA node 301-2, . . . , and a NUMA node 301-n, where n is a positive integer greater than or equal to 2. Both the virtual machine and the virtual routing device are deployed on the server 301. The virtual routing device includes at least one main processing unit (MPU) and a plurality of interface processing units (IPU). The MPU and the IPU are located on the NUMA node.

Optionally, a quantity of IPUs is less than or equal to a quantity of NUMA nodes. In addition, the quantity of IPUs is greater than or equal to 2. For example, the quantity of NUMA nodes may be equal to the quantity of IPUs, and one NUMA node corresponds to one IPU. In FIG. 3, there are two MPUs, which are denoted as an MPU 1 and an MPU 2, and the plurality of IPUs are an IPU 1, an IPU 2, . . . , and an IPU n. The two MPUs of the virtual routing device may be located on two NUMA nodes in the n NUMA nodes. For example, the MPU 1 is located on the NUMA node 301-1, and the MPU 2 is located on the NUMA node 301-2. Certainly, the two MPUs may alternatively be located on other two NUMA nodes. This is not limited in the embodiments of this application.

The virtual routing device is deployed in a separate deployment manner. To be specific, the virtual routing device includes at least one MPU and a plurality of IPUs, and the plurality of IPUs are located on different NUMA nodes.

In the embodiments of this application, a virtual machine (VM) or a container (Pod) is created on the server 301. The virtual machine or the container is created by a cloud management platform (for example, OpenStack) on different NUMA nodes of the server based on a service requirement. In the following embodiments, an example in which a virtual machine is created on a server is used to describe the technical solutions provided in the embodiments of this application. The virtual routing device deployed on the server 301 provides a virtual network service for the virtual machine. Specifically, each NUMA node includes one or more virtual machines. For example, in FIG. 3, the NUMA node 301-1 includes two virtual machines, which are denoted as a VM 1 and a VM 2. The NUMA node 301-2 also includes two virtual machines, which are denoted as a VM 3 and a VM 4.

It should be understood that each of the foregoing IPUs includes a virtual port and a physical port, the IPU is connected to the virtual machine through the virtual port for communication, and the IPU is connected to the network device through the physical port for communication. In FIG. 3, the virtual port is denoted as a vNIC, and the physical port is denoted as a NIC. Optionally, the IPU may include one or more virtual ports and one or more physical ports. A quantity of virtual ports and a quantity of physical ports may be set based on an actual requirement. This is not limited in the embodiments of this application. For example, in FIG. 3, the IPU 1 includes two virtual ports: a vNIC 1 and a vNIC 2, and the IPU 1 includes one physical port: a NIC 1; and the IPU 2 includes two virtual ports: a vNIC 3 and a vNIC 4, and the IPU 2 includes one physical port: a NIC 2.

In the embodiments of this application, the virtual routing device is deployed on the server 301. Therefore, when the cloud management platform creates the virtual machine on the server 301, a virtual network interface agent (module) on the server 301 drives the virtual routing device to create the foregoing virtual port. A virtual port creation process is described in detail in the following embodiments.

Optionally, the network device 302 is a router or a switch, the network device 302 may be a network device in a single-layer network, and there are one or more network devices 302. Alternatively, the network device 302 may be a network device in a multi-layer network, for example, includes an access layer device (a leaf device or a ToR device) and an aggregation layer device (a spine device or an EoR device). If the access layer device is a leaf device, the aggregation layer device is a spine device. If the access layer device is a ToR device, the aggregation layer device is an EoR device, and there are a plurality of network devices 302. A network in which the network device is located and a quantity of network devices are not limited in this application.

Figure 4:
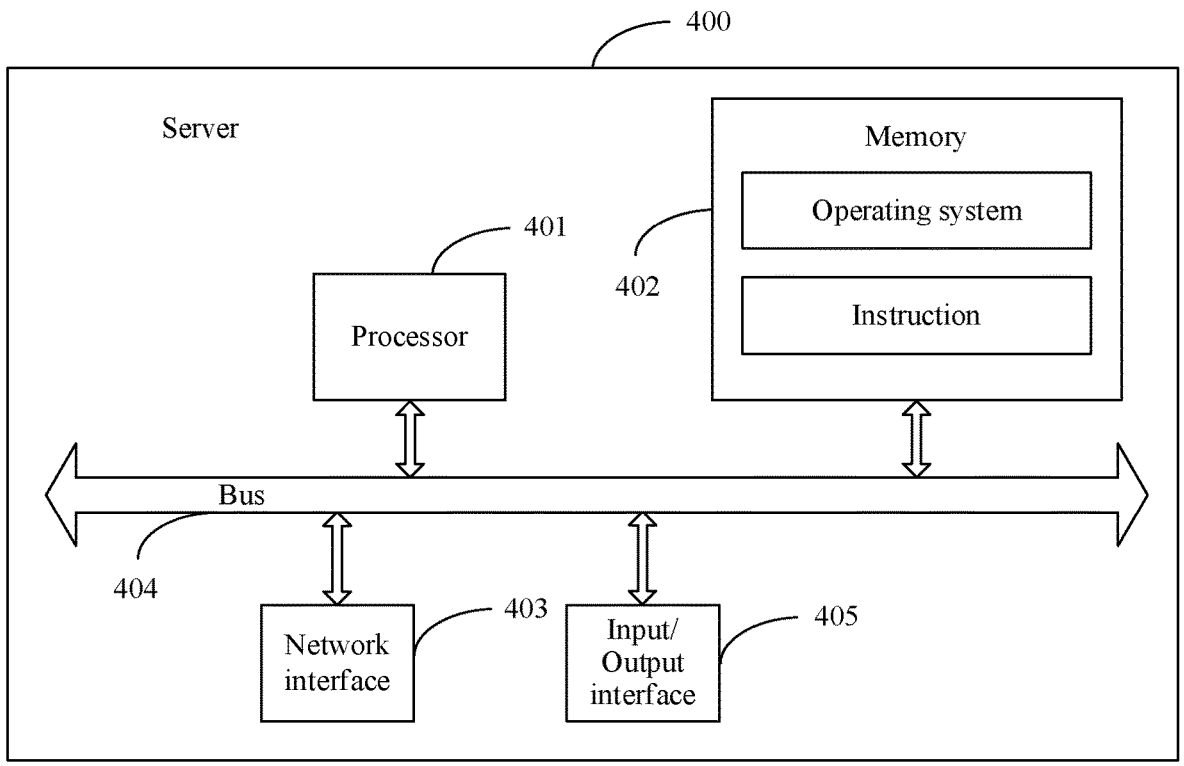
FIG. 4 is a schematic diagram of hardware of a server according to an embodiment of this application.

The embodiments of this application provide a server, applied to the data center in FIG. 3. FIG. 4 is a schematic structural diagram of the server. The server 400 includes at least one processor 401 and a memory 402.

The processor 401 includes one or more central processing units (CPU). The CPU is a single-core CPU (single-CPU) or a multi-core CPU (multi-CPU).

The memory 402 includes but is not limited to a random access memory (RAM), a read-only memory (ROM), an erasable programmable read-only memory (EPROM), a flash memory, an optical memory, or the like. The memory 402 stores code of an operating system and other instructions.

Optionally, the processor 401 implements some methods in the embodiments of this application by reading the instructions stored in the memory 402, or the processor 401 implements some methods in the embodiments of this application by using instructions stored in the processor 401. When the processor 401 implements the method in the embodiments of this application by reading the instructions stored in the memory 402, the memory 402 stores instructions for implementing the packet forwarding method and the route sending and receiving method provided in the embodiments of this application.

Optionally, the server 400 shown in FIG. 4 further includes a network interface 403. The network interface 403 is a wired interface, for example, a fiber distributed data interface (FDDI) or a gigabit c (GE) interface. Alternatively, the network interface 403 is a wireless interface. The network interface 403 is configured to receive a packet, or the network interface 403 is configured to send a packet to a network device in a network.

The memory 402 is configured to store the packet received by the network interface 403. Optionally, the memory 402 further stores a routing table (including routing information) used to indicate packet forwarding, and the like. The processor 401 further performs, based on the routing table stored in the memory 402, the packet forwarding method described in the embodiments of this application.

Optionally, the server 400 further includes a bus 404. The processor 401 and the memory 402 are usually connected to each other by using the bus 404 or in another manner.

Optionally, the server 400 further includes an input/output interface 405. The input/output interface 405 is configured to connect to an input device. The input device includes but is not limited to a keyboard, a touchscreen, a microphone, and the like. The input/output interface 405 is further configured to connect to an output device. The output device includes but is not limited to a display, a printer, and the like.

With reference to the description of the foregoing embodiment, it can be learned that the network device 302 may be a router or a switch. A hardware structure of the network device is similar to that of the foregoing server, and includes a processor, a memory, a network interface, and the like. For descriptions of the structure of the network device, refer to the foregoing related descriptions of the server. Details are not described herein again.

Figure 5:
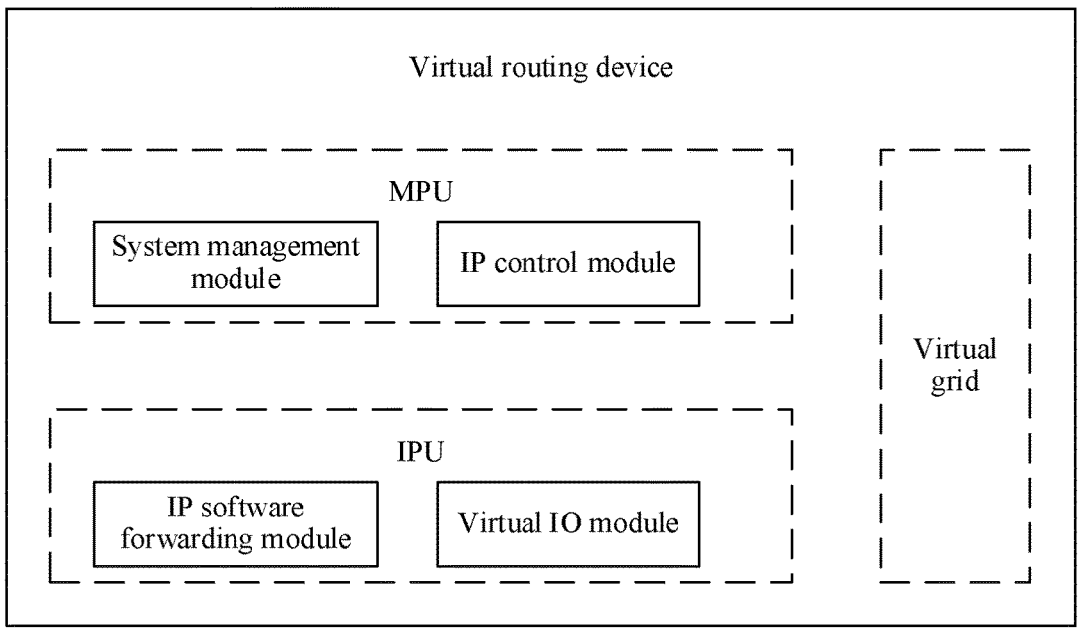
FIG. 5 is a schematic structural diagram of a virtual routing device according to an embodiment of this application.

A virtual routing device is deployed on the server provided in the embodiments of this application. As shown in FIG. 5, the virtual routing device includes three independently deployed process groups: an MPU, an IPU, and a virtual grid (vFabric). Optionally, the virtual routing device may include at least one MPU and a plurality of IPUs.

The MPU includes a system management module and an IP control module. The system management module is responsible for operating and maintaining the virtual routing device, and starting and monitoring a service process. The IP control module is responsible for managing a dynamic routing protocol, a protocol stack, a service level, or the like of the virtual routing device.

The IPU includes an IP software forwarding module and a virtual IO module. The IP software forwarding module is responsible for combining forwarding entries on a control plane, encapsulating and decapsulating a data packet, and performing table lookup-based forwarding. The virtual IO module is configured to manage a life cycle of a virtual interface of the virtual routing device. For example, on a control plane, the virtual IO module creates a virtual port under drive of a virtual network interface agent. On a data plane, the virtual IO module polls a shared queue to receive a packet, or adds, to a shared queue, a packet to be sent to another device (for example, a VM).

The virtual grid is responsible for communication between the at least one MPU and the plurality of IPUs.

Figure 6:
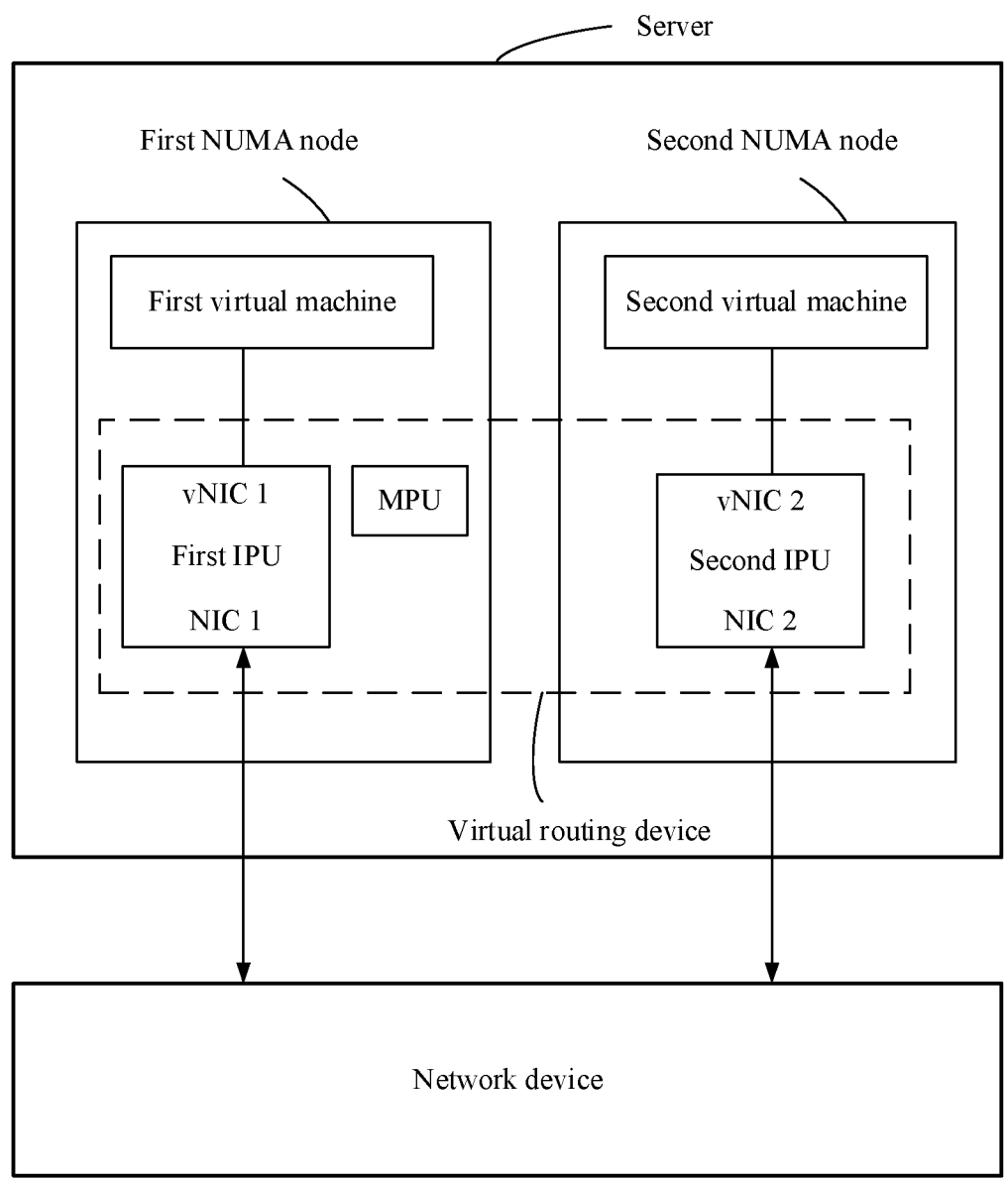
FIG. 6 is a second schematic architectural diagram of a data center according to an embodiment of this application.

With reference to the data center in the NUMA architecture shown in FIG. 3, in the embodiments of this application, the following data center shown in FIG. 6 is used as an example to describe the data packet forwarding method, the route sending and receiving method, and the apparatus provided in the embodiments of this application.

As shown in FIG. 6, the data center includes a server and a network device. A virtual machine and a virtual routing device are deployed on the server, and the virtual machine communicates with the network device by using the virtual routing device. The server includes a first NUMA node and a second NUMA node, and the virtual machine includes a first virtual machine and a second virtual machine. The first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port (a vNIC 1) and a first physical port (a NIC 1), the first IPU is connected to the first virtual machine through the first virtual port, and the first IPU is connected to the network device through the first physical port. The second IPU includes a second virtual port (a vNIC 2) and a second physical port (a NIC 2), the second IPU is connected to the second virtual machine through the second virtual port, and the second IPU is connected to the network device through the second physical port.

Figure 7A:
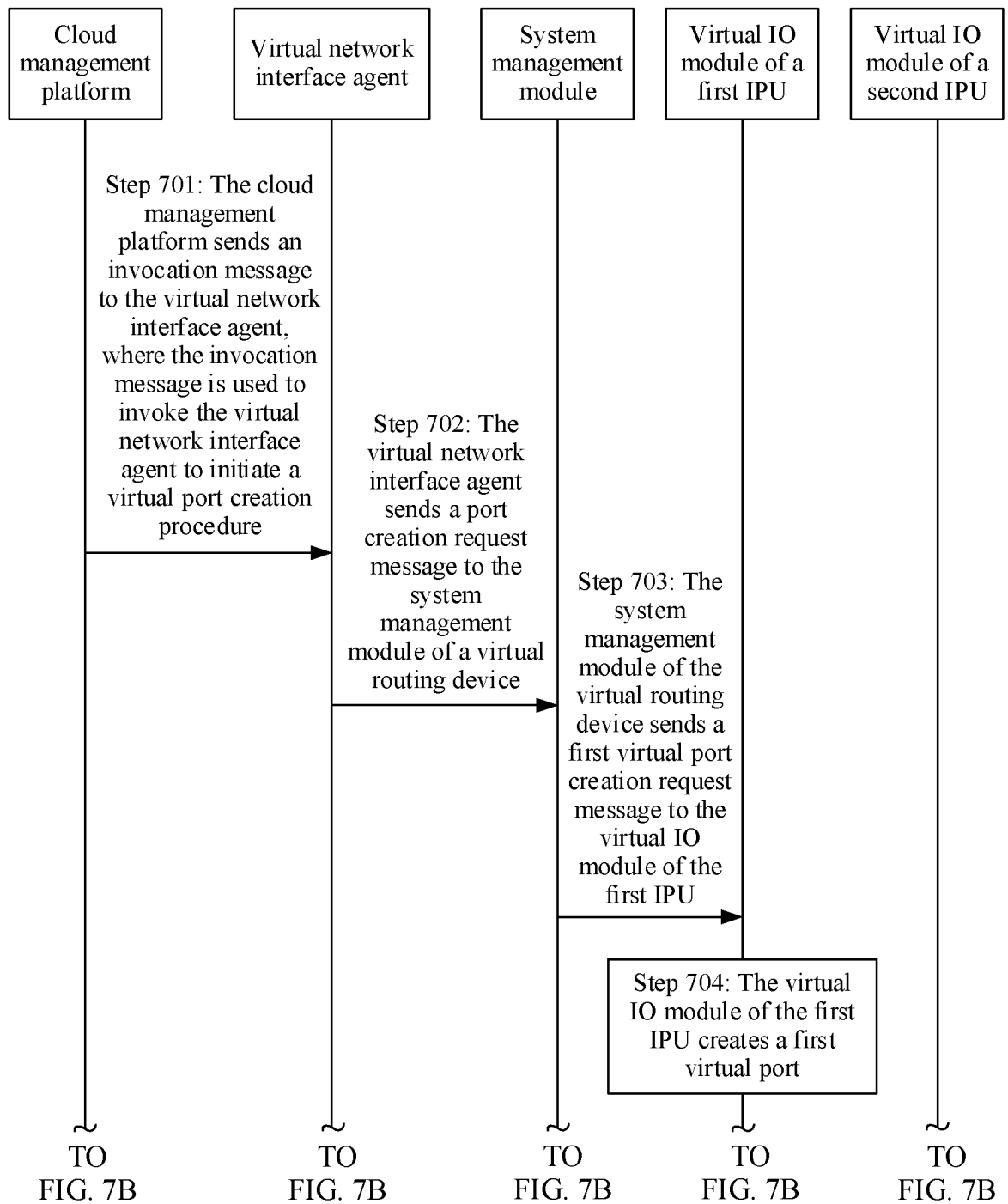
FIG. 7A and FIG. 7B are a schematic diagram of a virtual interface creation procedure according to an embodiment of this application.
Figure 7B:
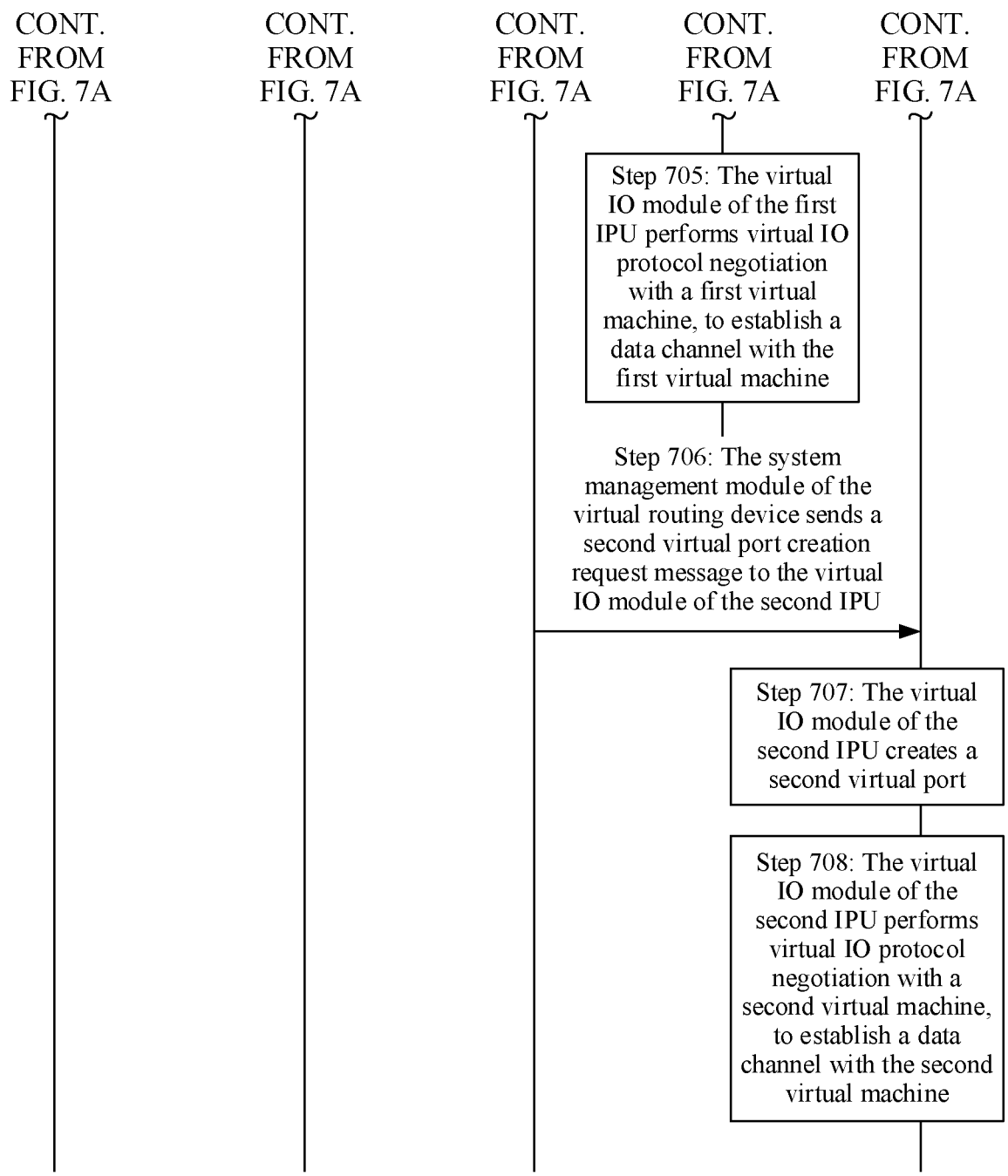

In the embodiments of this application, after a cloud management platform creates the first virtual machine on the first NUMA node of the server and creates the second virtual machine on the second NUMA node of the server based on a service requirement, the virtual routing device creates the first virtual port corresponding to the first IPU and the second virtual port corresponding to the second IPU, to implement communication between the virtual routing device and the virtual machine. As shown in FIG. 7A and FIG. 7B, specific steps include step 701 to step 708.

Step 701: The cloud management platform sends an invocation message to a virtual network interface agent (vRouter agent), where the invocation message is used to invoke the virtual network interface agent to initiate a virtual port creation procedure.

Specifically, the invocation message is used to initiate a procedure of creating the first virtual port and the second virtual port, and the invocation message includes a first parameter group and a second parameter group. It should be understood that a parameter in the first parameter group is a parameter of the to-be-created first virtual port, and a parameter in the second parameter group is a parameter of the to-be-created second virtual port. The first parameter group includes an ID of the first NUMA node, a type of the first virtual port, and other parameters, and the second parameter group includes an ID of the second NUMA node, a type of the second virtual port, and other parameters.

Optionally, the cloud management platform may separately send invocation messages to the virtual network interface agent, for example, a first invocation message and a second invocation message. The first invocation message is used to initiate a procedure of creating the first virtual port, and the second invocation message is used to initiate a procedure of creating the second virtual port. This is not limited in the embodiments of this application.

Step 702: The virtual network interface agent sends a port creation request message to a system management module of the virtual routing device.

The port creation request message carries the first parameter group (including the ID of the first NUMA node, the type of the first virtual port, and other parameters) and the second parameter group (including the ID of the second NUMA node, the type of the second virtual port, and other parameters).

Step 703: The system management module of the virtual routing device sends a first virtual port creation request message to a virtual IO module of the first IPU.

Step 704: The virtual IO module of the first IPU creates the first virtual port.

In the embodiments of this application, the system management module sends, based on the ID of the first NUMA node in the port creation request message received by the system management module, the first virtual port creation request message to the first IPU deployed on the first NUMA node, to request to create, on the first IPU, a first virtual interface that meets a parameter requirement (that is, the type of the port and other parameters).

Step 705: The virtual IO module of the first IPU performs virtual IO protocol negotiation with the first virtual machine, to establish a data channel with the first virtual machine.

Step 706: The system management module of the virtual routing device sends a second virtual port creation request message to a virtual IO module of the second IPU.

Step 707: The virtual IO module of the second IPU creates the second virtual port.

In the embodiments of this application, the system management module sends, based on the ID of the second NUMA node in the port creation request message received by the system management module, the second virtual port creation request message to the second IPU deployed on the second NUMA node, to request to create, on the second IPU, a second virtual interface that meets a parameter requirement (that is, the type of the port and other parameters).

It should be understood that, after a virtual port is created, a virtual IO module of an IPU is responsible for managing the virtual port of the IPU, and polling a shared queue for the IPU and a corresponding virtual machine, to receive a packet. For example, the virtual IO module of the first IPU is only responsible for managing the first virtual port, and the virtual IO module of the second IPU is only responsible for managing the second virtual port.

Step 708: The virtual IO module of the second IPU performs virtual IO protocol negotiation with the second virtual machine, to establish a data channel with the second virtual machine.

After the data center in the NUMA architecture is deployed, an administrator or a management device assigns a unique identifier to each IPU of the virtual routing device, where the unique identifier is used as an address of the IPU, and assigns, based on the identifier of the IPU, a virtual private network identifier to a virtual machine connected to the IPU. Optionally, the administrator may statically assign, based on the identifier of the IPU, a virtual private network identifier to the virtual machine connected to the IPU, or an MPU may dynamically assign, based on the identifier of the IPU, a virtual private network identifier to the virtual machine connected to the IPU.

Figure 8A:
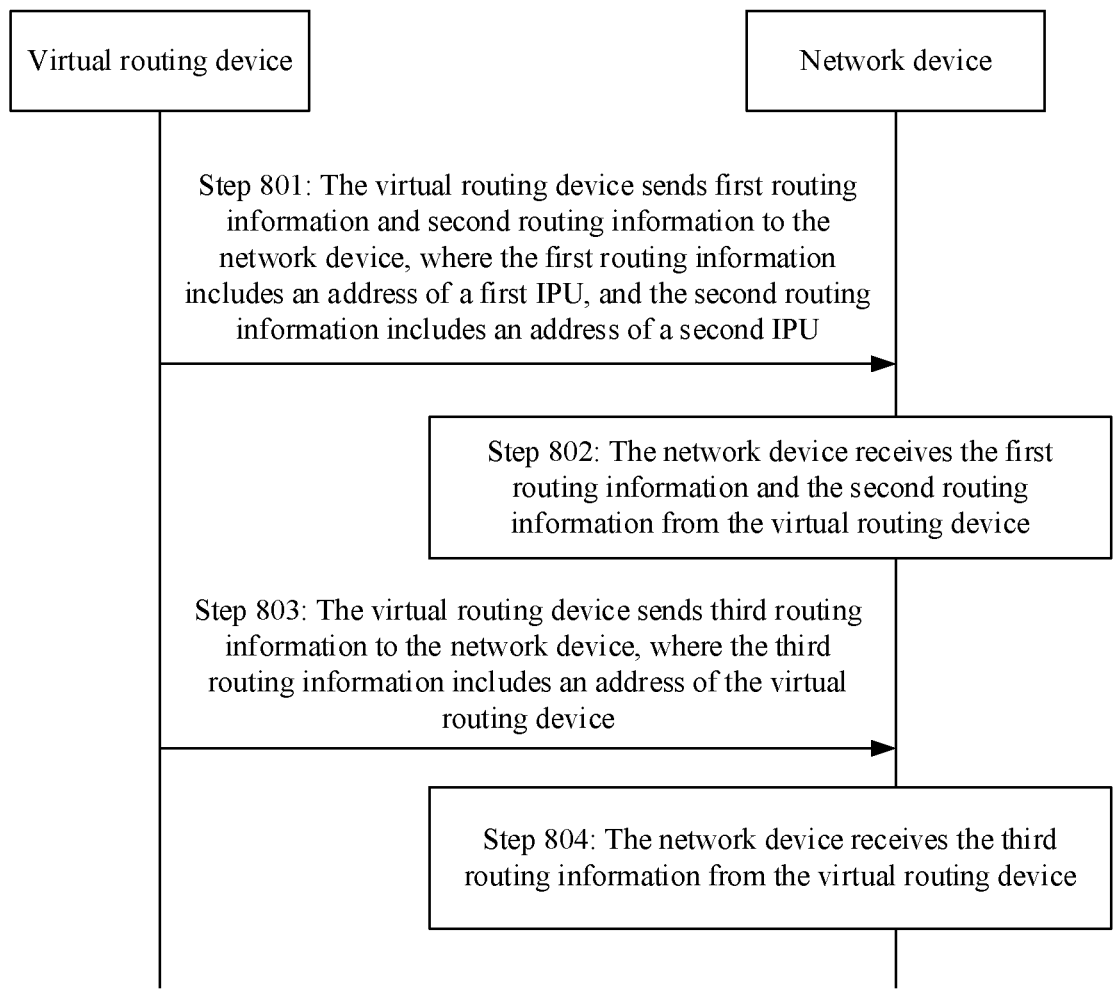
FIG. 8A is a first schematic diagram of a route sending and receiving method according to an embodiment of this application.

Based on the data center in the NUMA architecture shown in FIG. 6, the embodiments of this application provide a route sending and receiving method. As shown in FIG. 8A, in an implementation, a route sending and receiving process includes step 801 to step 804.

Step 801: The virtual routing device sends first routing information and second routing information to the network device, where the first routing information includes an address of the first IPU, and the second routing information includes an address of the second IPU.

The first routing information is used to indicate to the network device to send a received first packet to the first IPU, and the first packet is a packet to be sent to the first virtual machine. The second routing information is used to indicate to the network device to send a received second packet to the second IPU, and the second packet is a packet to be sent to the second virtual machine.

It may be understood that the address of the first IPU is different from the address of the second IPU. A virtual private network identifier of the first virtual machine is assigned based on the address of the first IPU, and a virtual private network identifier of the second virtual machine is assigned based on the address of the second IPU.

Optionally, when the data center is located in a segment routing over internet protocol version 6 (SRv6) network, an address of the IPU is an SRv6 locator (that is, an SRv6 locator, IPU locator for short), and a virtual private network identifier of the virtual machine is a virtual private network segment identifier (VPN SID). When the data center is located in a virtual extensible local area network (VxLAN) network, an address of the IPU is a VxLAN tunnel endpoint (VTEP) address, and a virtual private network identifier of the virtual machine is a virtual network identifier (VNI). The VTEP address may be an IPv4 address, or may be an IPv6 address. This is not limited in the embodiments of this application.

Step 802: The network device receives the first routing information and the second routing information from the virtual routing device.

In the embodiments of this application, after receiving the first routing information and the second routing information, the network device stores the first routing information and the second routing information in the network device, and the virtual routing device subsequently forwards a packet based on the stored routing information.

Step 803: The virtual routing device sends third routing information to the network device, where the third routing information includes an address of the virtual routing device.

The third routing information is used to indicate to the network device to send a received third packet to the second IPU when a communication fault occurs between the network device and the first IPU, where the third packet is a packet to be sent to the first virtual machine. Alternatively, the third routing information is used to indicate to the network device to send a received fourth packet to the first IPU when a communication fault occurs between the network device and the second IPU, where the fourth packet is a packet to be sent to the second virtual machine.

Optionally, the address of the virtual routing device is assigned by an administrator or a management device to the virtual routing device, and uniquely indicates the virtual routing device. The address of the virtual routing device may be an SRv6 locator (vRouter locator for short).

Step 804: The network device receives the third routing information from the virtual routing device.

Figure 8B:
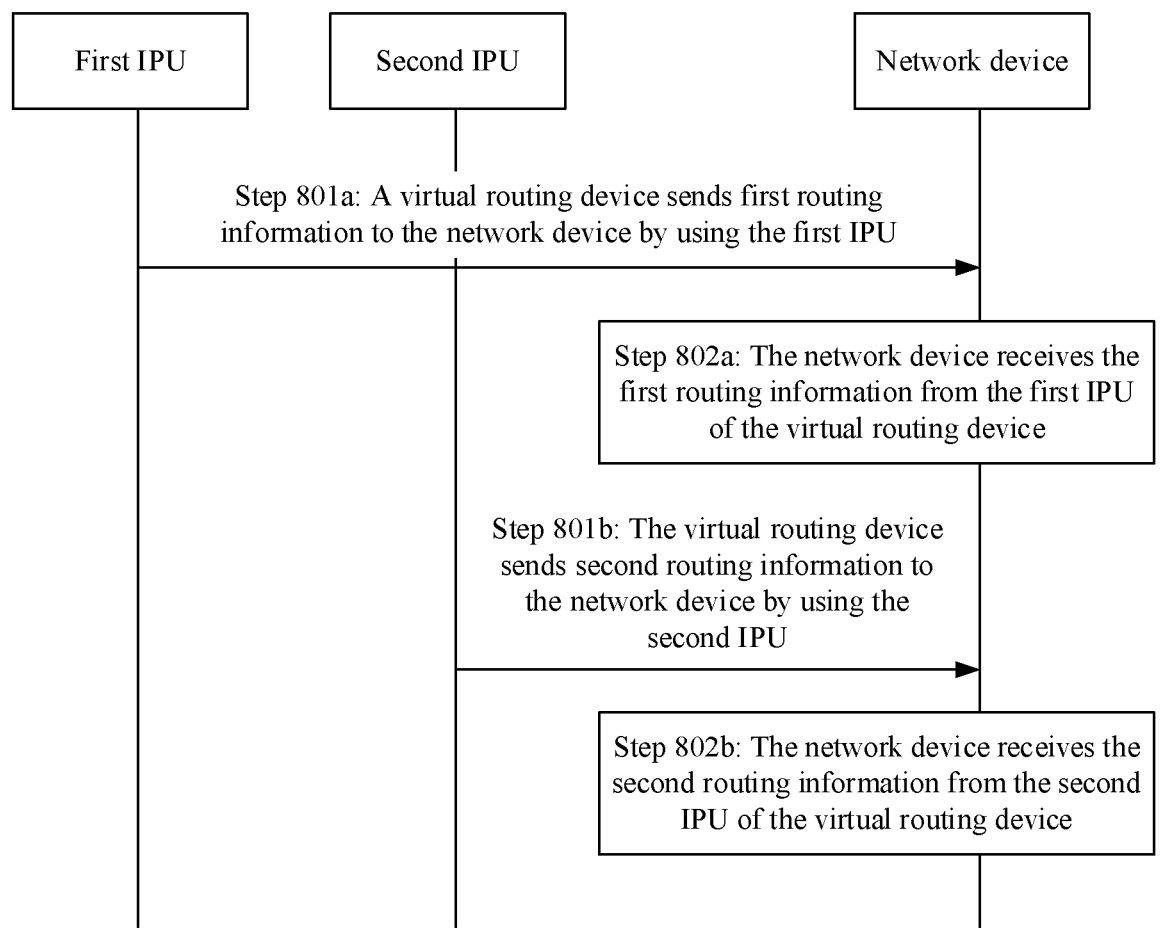
FIG. 8B is a second schematic diagram of a route sending and receiving method according to an embodiment of this application.

Optionally, as shown in FIG. 8B, step 801 includes step 801*a* and step 801*b*.

Step 801*a*: The virtual routing device sends the first routing information to the network device by using the first IPU.

Step 801*b*: The virtual routing device sends the second routing information to the network device by using the second IPU.

Specifically, the virtual routing device sends the first routing information to the network device through the first physical port of the first IPU, and sends the second routing information to the network device through the second physical port of the second IPU.

Optionally, the virtual routing device releases the first routing information and the second routing information based on a border gateway protocol (BGP) or an interior gateway protocol (IGP).

Correspondingly, step 802 includes step 802*a* and step 802*b*.

Step 802*a*: The network device receives the first routing information from the first IPU of the virtual routing device.

Step 802*b*: The network device receives the second routing information from the second IPU of the virtual routing device.

Figure 8C:
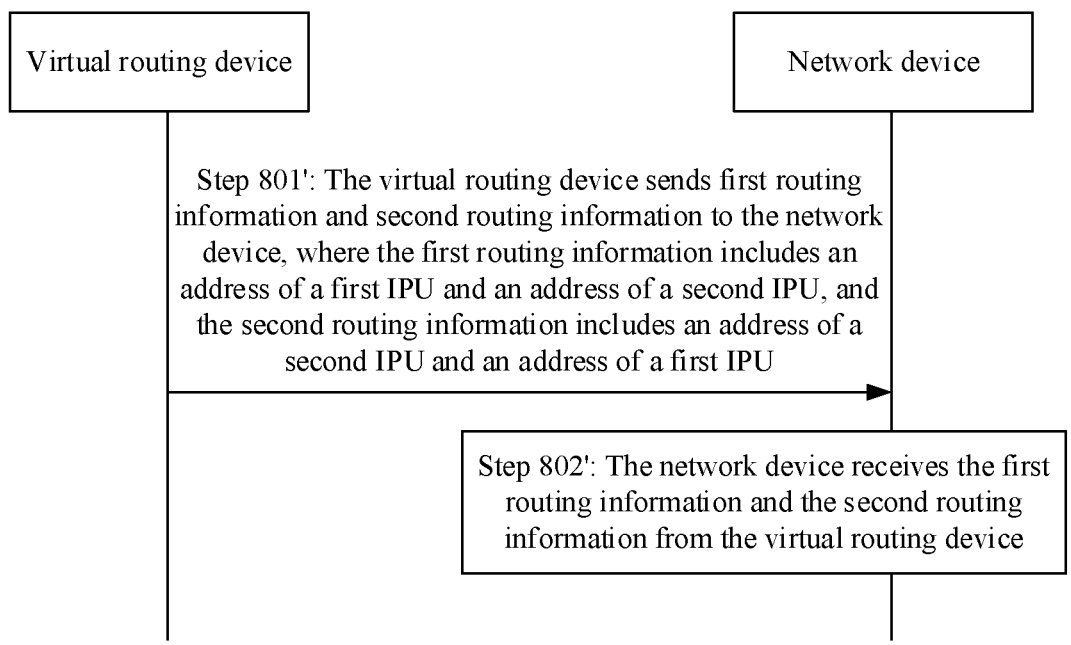
FIG. 8C is a third schematic diagram of a route sending and receiving method according to an embodiment of this application.

In another implementation, as shown in FIG. 8C, a route sending and receiving process includes step 801' and step 802'.

Step 801': The virtual routing device sends first routing information and second routing information to the network device, where the first routing information includes an address of the first IPU and an address of the second IPU, and the second routing information includes the address of the second IPU and the address of the first IPU.

A priority of the address of the first IPU in the first routing information is higher than a priority of the address of the first IPU in the second routing information, and a priority of the address of the second IPU in the second routing information is higher than a priority of the address of the second IPU in the first routing information.

Optionally, when sending the address of the first IPU and the address of the second IPU, the virtual routing device may carry priority indication information of the IPU. For example, the priority indication information of the IPU may be overhead information. When the virtual routing device sends the first routing information, overhead information corresponding to the address of the first IPU that is sent through the first physical port is low overheads, and overhead information corresponding to the address of the second IPU that is sent through the first physical port is high overheads. When the virtual routing device sends the second routing information, overhead information corresponding to the address of the second IPU that is sent through the second physical port is low overheads, and overhead information corresponding to the address of the first IPU that is sent through the second physical port is high overheads. In this case, the priority of the address of the first IPU in the first routing information is higher than the priority of the address of the first IPU in the second routing information, and the priority of the address of the second IPU in the second routing information is higher than the priority of the address of the second IPU in the first routing information.

It should be noted that, in the embodiments of this application, the priority indication information of the IPU may alternatively be indication information in another form. For example, identification information is used to indicate the priority of the address of the IPU. This is specifically determined based on an actual situation. This is not limited in the embodiments of this application.

Step 802': The network device receives the first routing information and the second routing information from the virtual routing device.

In the embodiments of this application, a routing information releasing and receiving process is a routing learning process. It should be understood that the virtual routing device may further send the first routing information and the second routing information to another routing device that communicates with the virtual routing device. In addition, the virtual routing device may further receive routing information released by the network device (for example, a ToR device or an EoR device) or another device. For example, the virtual routing device receives fourth routing information from the network device, where the fourth routing information includes the address of the network device.

In conclusion, routing information may be configured in two manners. In a first manner, the routing information is configured by performing step 801 to step 804. In a second manner, the routing information is configured by performing step 801' and step 802'. Then, the network device and the virtual routing device in the data center may forward a packet based on the configured routing information. In the embodiments of this application, the virtual routing device receives a packet from the network device, and forwards the packet to a corresponding virtual machine.

It should be noted that the packet received by the network device may be a packet to be sent to the first virtual machine, or may be a packet to be sent to the second virtual machine. In the following embodiments, there are two types of packets: a packet whose destination device is the first virtual machine, and a packet whose destination device is the second virtual machine. It may be understood that a function of the foregoing routing information (including the first routing information and the second routing information) is to indicate to the network device to send received packets of a same type to a corresponding IPU. For example, in the following embodiment, if both the first packet and the third packet are packets sent to the first virtual machine, the first routing information may indicate to the network device to send the received first packet or the received third packet to the first IPU; or if both the second packet and the fourth packet are packets sent to the second virtual machine, the second routing information may indicate to the network device to send the received second packet or the received fourth packet to the second IPU.

In the embodiments of this application, a packet forwarding process includes downlink forwarding and uplink forwarding. Downlink forwarding means that a network device sends a received packet to a virtual machine by using a virtual routing device, that is, the packet enters the virtual machine. Uplink forwarding means that a virtual machine sends a packet to a network device by using a virtual routing device, that is, the packet leaves the virtual machine. In the following embodiments, a packet forwarding method is separately described from a perspective of a case in which a packet enters a virtual machine and from a perspective of a case in which a packet leaves a virtual machine.

Figure 9A:
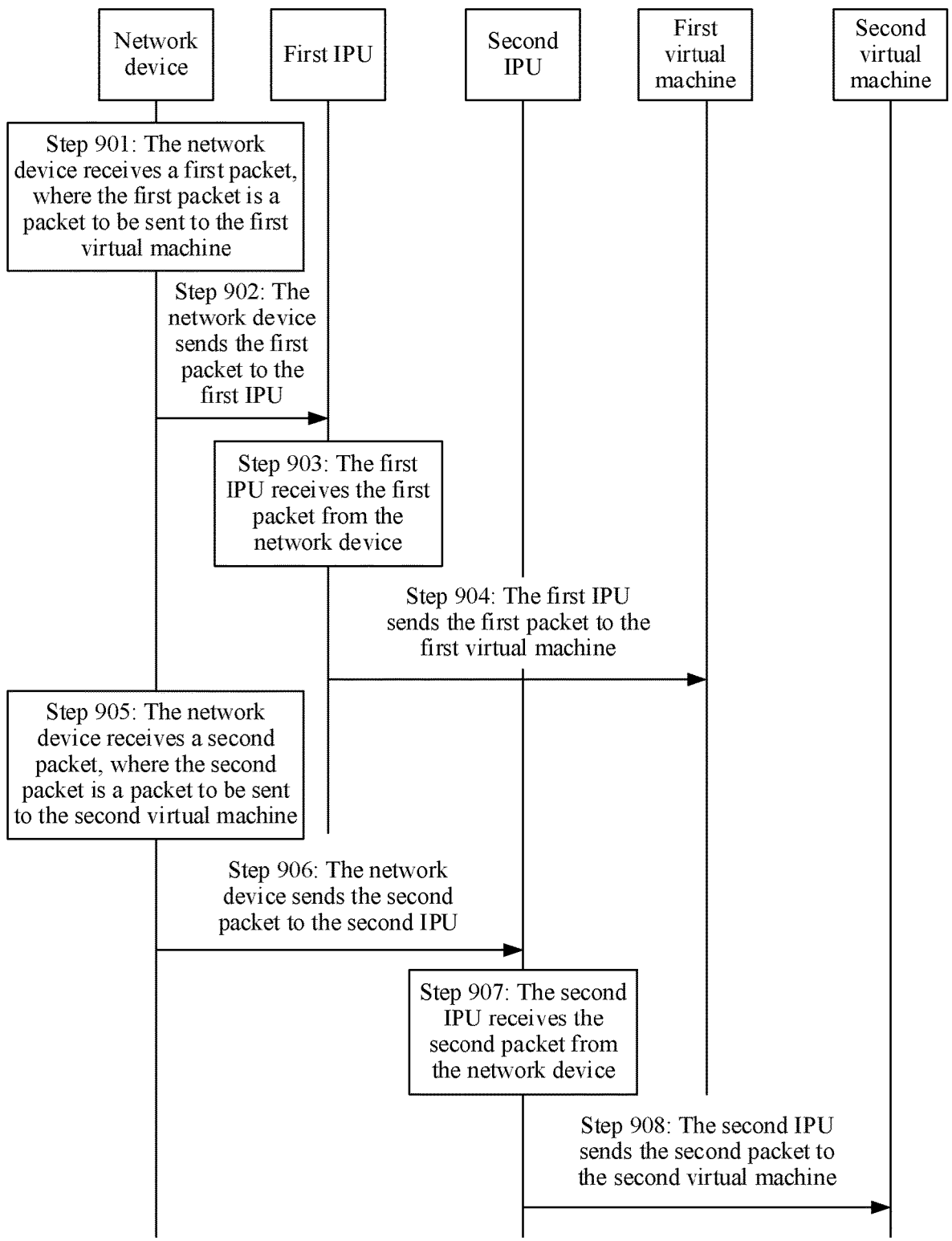
FIG. 9A is a first schematic diagram of a packet forwarding method according to an embodiment of this application.

As shown in FIG. 9A, in a process in which a packet enters a virtual machine, the packet forwarding method provided in the embodiments of this application includes step 901 to step 908.

Step 901: The network device receives a first packet, where the first packet is a packet to be sent to the first virtual machine.

Step 902: The network device sends the first packet to the first IPU.

Specifically, the network device sends the first packet to the first IPU through the first physical port.

With reference to the description in the foregoing embodiment, it can be learned that the network device stores first routing information, and the first routing information includes an address of the first IPU. The network device sends the first packet to the first IPU according to an indication of the first routing information.

Step 903: The first IPU receives the first packet from the network device.

Specifically, the first IPU receives the first packet from the network device through the first physical port.

Step 904: The first IPU sends the first packet to the first virtual machine.

Specifically, the first IPU sends the first packet to the first virtual machine through the first virtual port.

In the embodiments of this application, after receiving the first packet, the first IPU decapsulates the first packet to obtain a destination address of the first packet (that is, a service address of the first virtual machine), and the first IPU sends the first packet to the first virtual machine.

Step 905: The network device receives a second packet, where the second packet is a packet to be sent to the second virtual machine.

Step 906: The network device sends the second packet to the second IPU.

Specifically, the network device sends the second packet to the second IPU through the second physical port.

Likewise, the network device stores second routing information, and the second routing information includes an address of the second IPU. The network device sends the second packet to the second IPU according to an indication of the second routing information.

Step 907: The second IPU receives the second packet from the network device.

Specifically, the second IPU receives the second packet from the network device through the second physical port.

Step 908: The second IPU sends the second packet to the second virtual machine.

Specifically, the second IPU sends the second packet to the second virtual machine through the second virtual port.

Likewise, after receiving the second packet, the second IPU decapsulates the second packet to obtain a destination address of the second packet (that is, a service address of the second virtual machine), and the second IPU sends the second packet to the second virtual machine.

The packet forwarding method provided in the embodiments of this application is applied to the data center in the NUMA architecture. The network device forwards, to the first IPU of the virtual routing device based on the first routing information, a packet (that is, the first packet) to be sent to the first virtual machine, and the first IPU sends the first packet to the first virtual machine. Likewise, the network device forwards, to the second IPU of the virtual routing device based on the second routing information, a packet (that is, the second packet) to be sent to the second virtual machine, and the second IPU sends the second packet to the second virtual machine. Different IPUs are deployed on different NUMA nodes. Therefore, for a packet to be sent to a target virtual machine, the virtual routing device receives the packet by using an IPU on a NUMA node to which the target virtual machine belongs, and then the IPU sends the packet to the target virtual machine. That is, in the NUMA architecture, a packet is sent to a virtual machine on a local NUMA node by using an IPU on the local NUMA node, and there is no need to forward the packet across nodes, so that remote memory access can be avoided, thereby reducing a packet forwarding delay.

Figures 1, 9B:
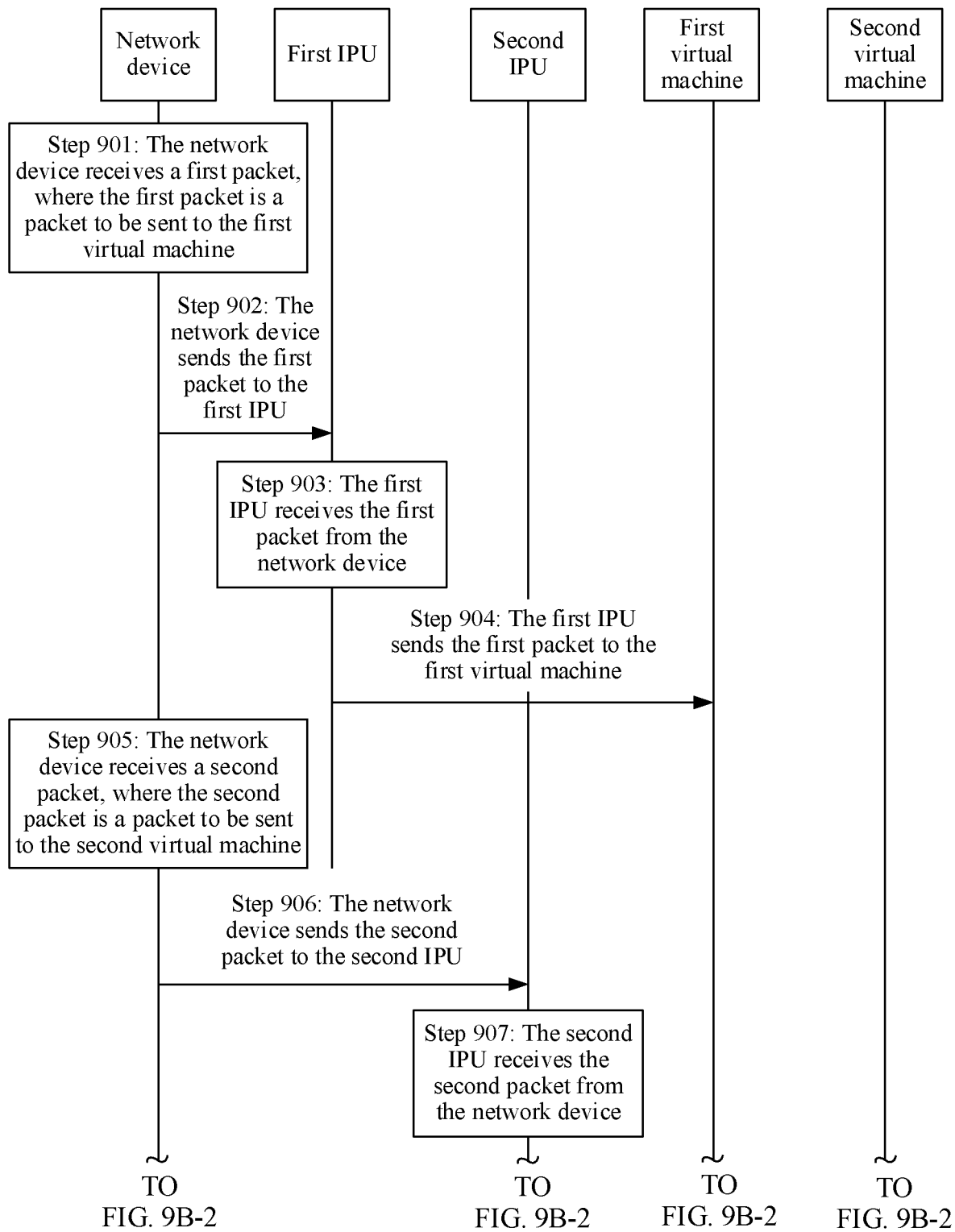
Figures 2, 9B:
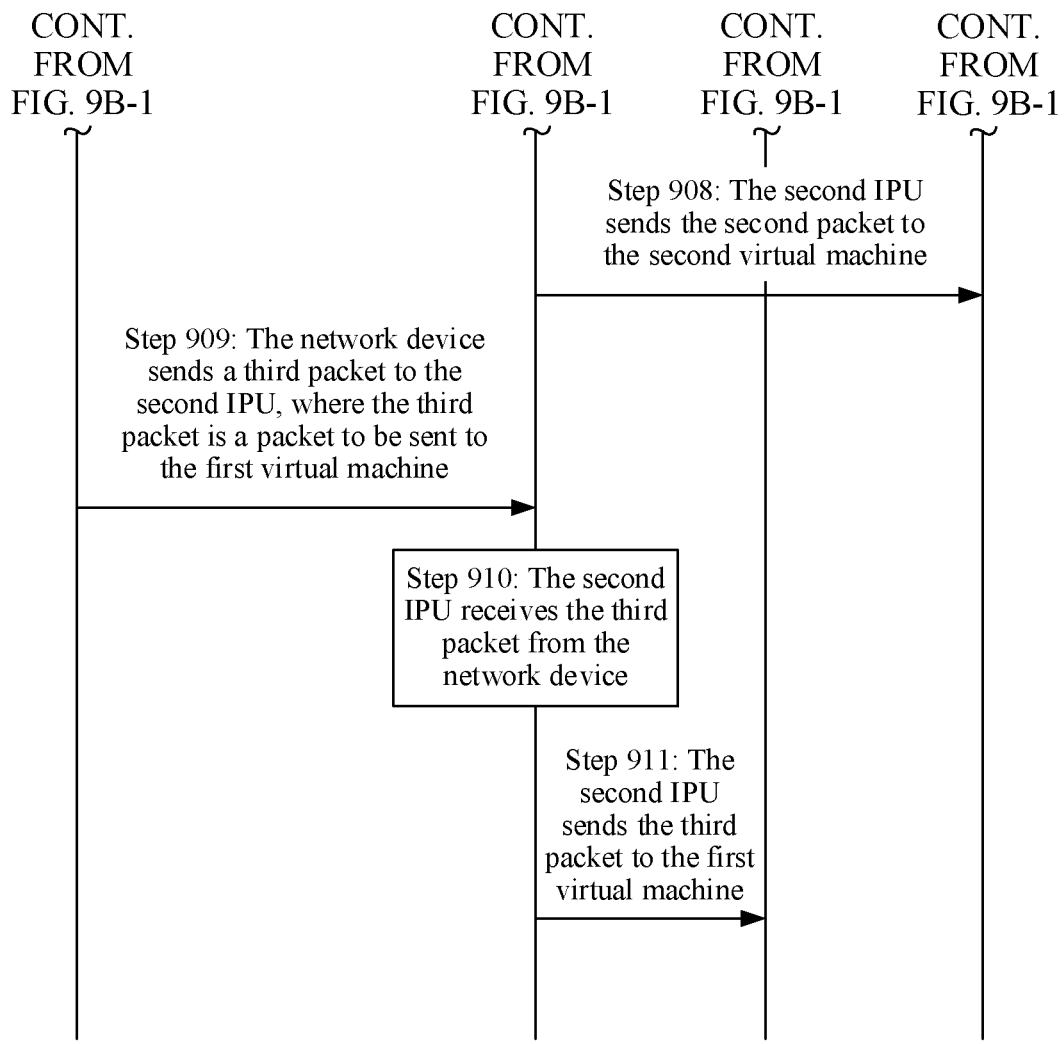

Optionally, with reference to FIG. 9A, as shown in FIG. 9B-1 and FIG. 9B-2, when a communication fault occurs between the network device and the first IPU, the packet forwarding method provided in the embodiments of this application may further include step 909 to step 911.

It should be understood that, that a communication fault occurs between the network device and the first IPU includes that a fault occurs on a link between the network device and the first IPU, or that a fault occurs on ports at two ends of the link. For example, a fault may occur on the first physical port.

Step 909: The network device sends a third packet to the second IPU, where the third packet is a packet to be sent to the first virtual machine.

Step 910: The second IPU receives the third packet from the network device.

Step 911: The second IPU sends the third packet to the first virtual machine.

Specifically, the second IPU receives the third packet from the network device through the second physical port of the second IPU, and decapsulates the third packet. Then, the second IPU sends the third packet to the first IPU by using a virtual grid (vFabric) inside the virtual routing device, and the first IPU sends the third packet to the first virtual machine through the first virtual port of the first IPU.

In the embodiments of this application, when a communication fault occurs between the network device and the first IPU, the network device sends, to the first virtual machine, a received packet (for example, the third packet) to be sent to the first virtual machine. Because the first virtual machine is located on the first NUMA node, and the second IPU is deployed on the second NUMA node, the virtual routing device performs remote memory access when a communication fault occurs, so as to ensure that the packet is successfully sent to the first virtual machine, thereby improving communication reliability.

Figure 10A:
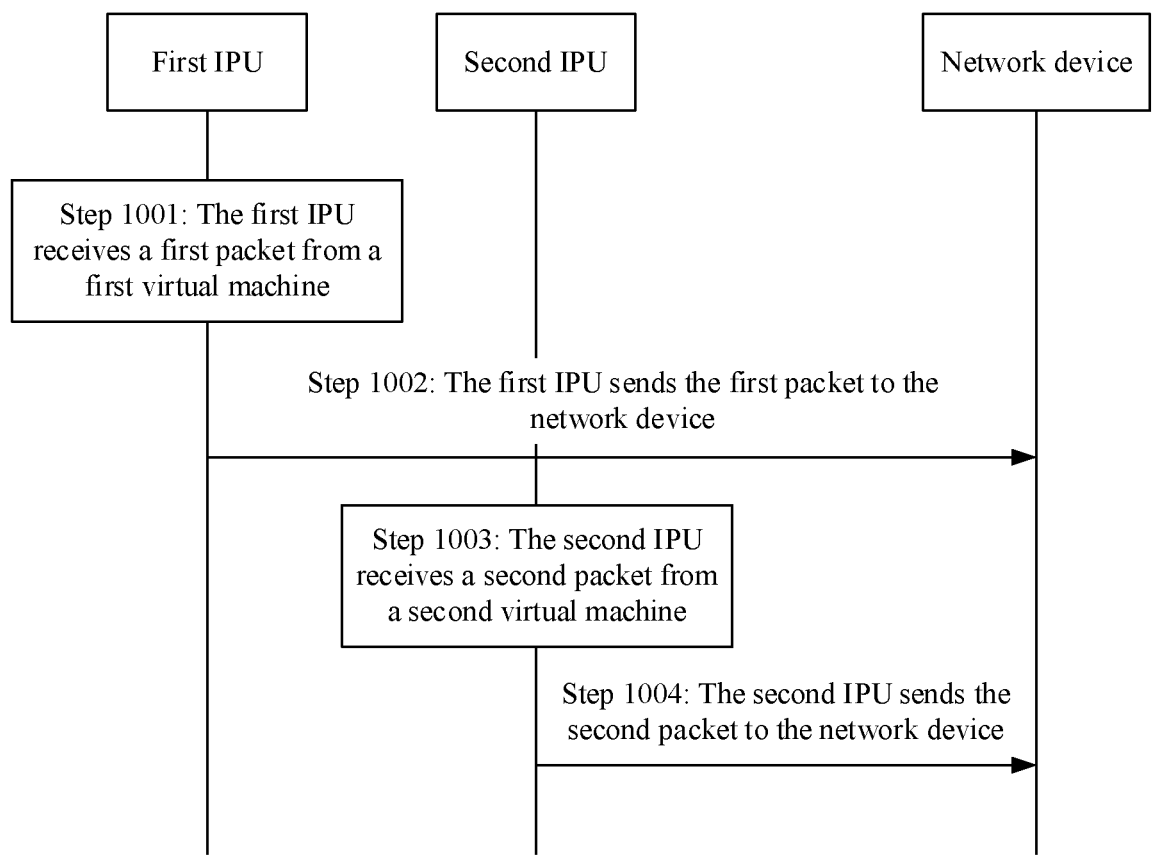
FIG. 10A is a third schematic diagram of a packet forwarding method according to an embodiment of this application.

As shown in FIG. 10A, in a process in which a packet leaves a virtual machine, the packet forwarding method provided in the embodiments of this application includes step 1001 to step 1004.

Step 1001: The first IPU receives a first packet from the first virtual machine.

Step 1002: The first IPU sends the first packet to the network device.

Specifically, the first IPU receives the first packet through the first virtual port of the first IPU, and encapsulates the first packet. Then, the first IPU determines, according to a local unit preference principle, to send the first packet to the network device through the first physical port of the first IPU.

Step 1003: The second IPU receives a second packet from the second virtual machine.

Step 1004: The second IPU sends the second packet to the network device.

Specifically, the second IPU receives the second packet through the second virtual port of the second IPU, and encapsulates the second packet. Then, the second IPU determines, according to a local unit preference principle, to send the second packet to the network device through the second physical port of the second IPU.

The packet forwarding method provided in the embodiments of this application is applied to the data center in the NUMA architecture. The first IPU of the virtual routing device receives the first packet from the first virtual machine, and sends the first packet to the network device by using the first IPU. Likewise, the second IPU of the virtual routing device receives the second packet from the second virtual machine, and sends the second packet to the network device by using the second IPU. Different IPUs are deployed on different NUMA nodes. Therefore, in the NUMA architecture, a packet sent by a virtual machine on a local NUMA node is forwarded by an IPU on the local NUMA node, and there is no need to forward the packet across nodes, so that remote memory access can be avoided, thereby reducing a packet forwarding delay.

Figure 10B:
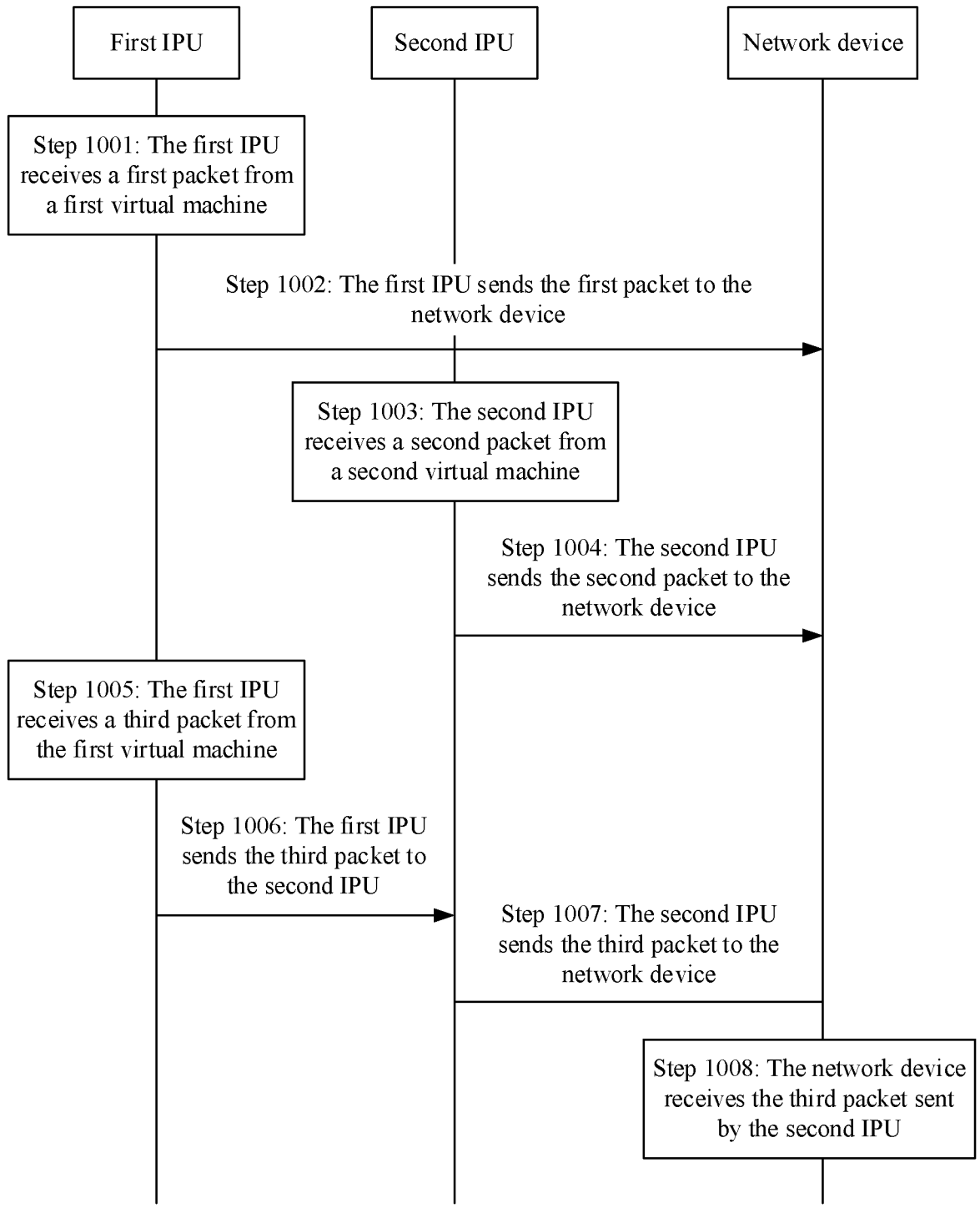
FIG. 10B is a fourth schematic diagram of a packet forwarding method according to an embodiment of this application.

With reference to FIG. 10A, as shown in FIG. 10B, when a communication fault occurs between the network device and the first IPU, the packet forwarding method provided in the embodiments of this application may further include step 1005 to step 1008.

Step 1005: The first IPU receives a third packet from the first virtual machine.

Step 1006: The first IPU sends the third packet to the second IPU.

Specifically, the first IPU receives the third packet from the first virtual port of the first IPU, and encapsulates the third packet. Then, the first IPU sends the third packet to the second IPU by using a virtual grid (vFabric) inside the virtual routing device.

Step 1007: The second IPU sends the third packet to the network device.

In the embodiments of this application, the second IPU receives the third packet from the first IPU, and sends the third packet to the network device through the second physical port of the second IPU.

Step 1008: The network device receives the third packet sent by the second IPU.

The third packet is received by the second IPU from the first IPU, and the third packet is received by the first IPU from the first virtual machine.

In the embodiments of this application, when a communication fault occurs between the network device and the first IPU, a packet received by the first IPU of the virtual routing device from the first virtual machine is sent to the network device by using the second IPU of the virtual routing device. Because different IPUs are deployed on different NUMA nodes, the virtual routing device performs remote memory access when a communication fault occurs, so as to ensure that the packet is successfully sent to the first virtual machine, thereby improving communication reliability.

Figure 11A:
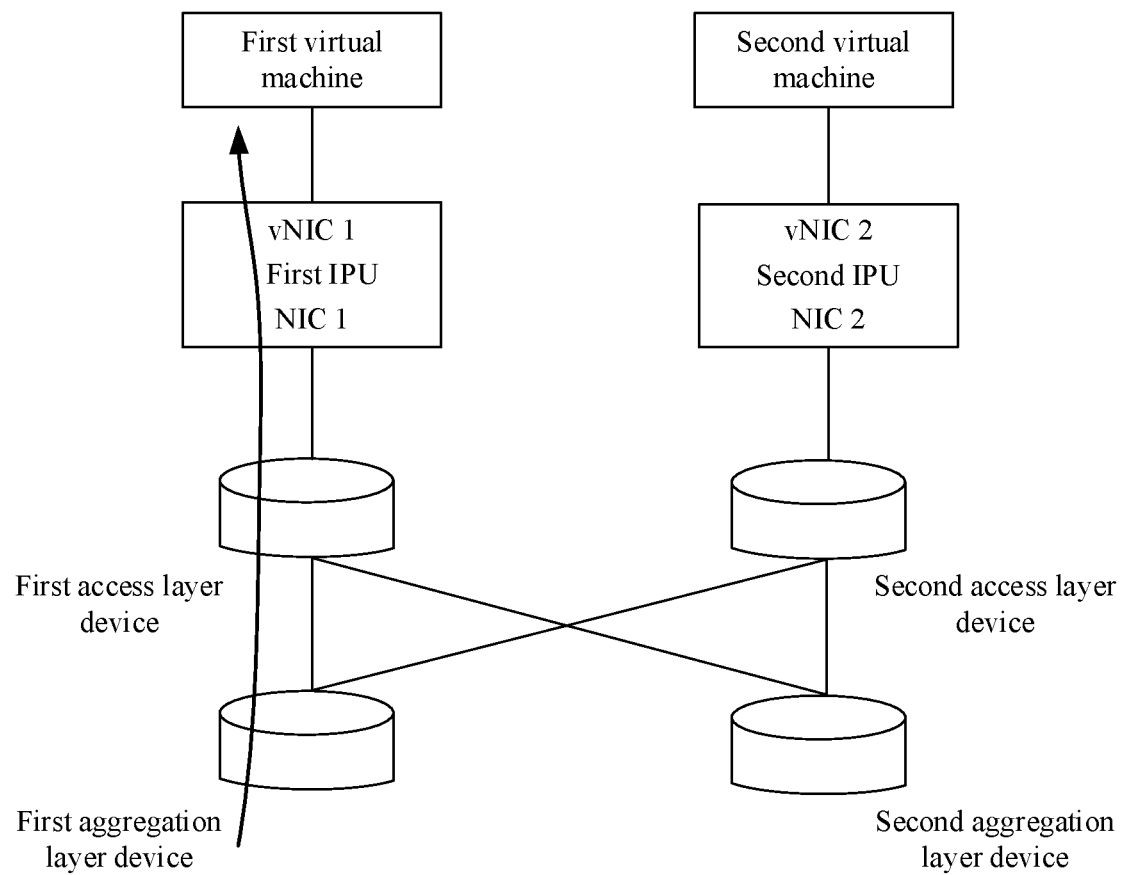
FIG. 11A is a first schematic diagram of a packet forwarding path according to an embodiment of this application.

With reference to the foregoing embodiment, it can be learned that the network device in the data center may be a device in a single-layer network or a device in a multi-layer network. In the following embodiment, a packet forwarding process is described by using an example in which a network device is a device in a multi-layer network and the network device includes an aggregation layer device and an access layer device. As shown in FIG. 11A, a first access layer device is connected to the first IPU, a second access layer device is connected to the second IPU, a first aggregation layer device is connected to the first access layer device and the second access layer device, and a second aggregation layer device is connected to the first access layer device and the second access layer device. For a specific connection relationship, refer to FIG. 11A.

With reference to the data center shown in FIG. 11A, in the routing information configuration process described above, the first access layer device receives first routing information from the virtual routing device, and sends the first routing information to the first aggregation layer device and the second aggregation layer device. The second access layer device receives second routing information from the virtual routing device, and sends the second routing information to the first aggregation layer device and the second aggregation layer device. Likewise, the first access layer device or the second access layer device receives third routing information from the virtual routing device, and sends the third routing information to the first aggregation layer device and the second aggregation layer device. It should be understood that each access layer device and each aggregation layer device generate a forwarding entry (that is, a routing table) based on received routing information, store the routing table, and update the routing table based on an actual situation.

When the routing information is configured in the first manner (that is, the routing information is configured by performing step 801 to step 804), the packet forwarding method provided in the embodiments of this application may be applied to a data center in an SRv6 network. For example, in the data center in the SRv6 network, an address of the first IPU is A1:B1:C1:D1:1::/68, an address of the second IPU is A1:B1:C1:D1:1::/64, an address of the virtual routing device is A1:B1:C1:D1::/64, a VPN SID of the first virtual machine is A1:B1:C1:D1:1::1, and a VPN SID of the second virtual machine is A1:B1:C1:D1:2::1.

Figures 2, 12A:
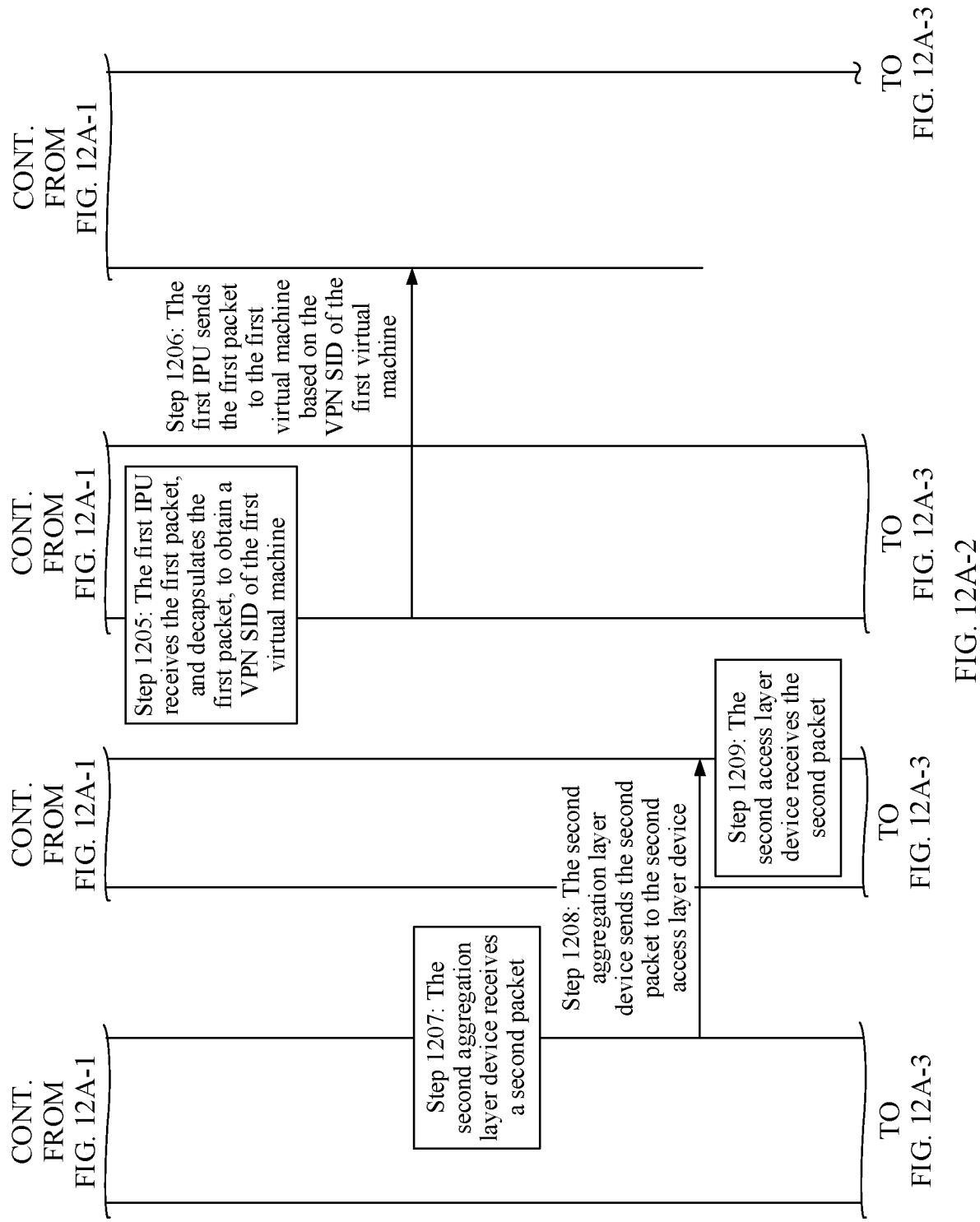
Figures 3, 12A:
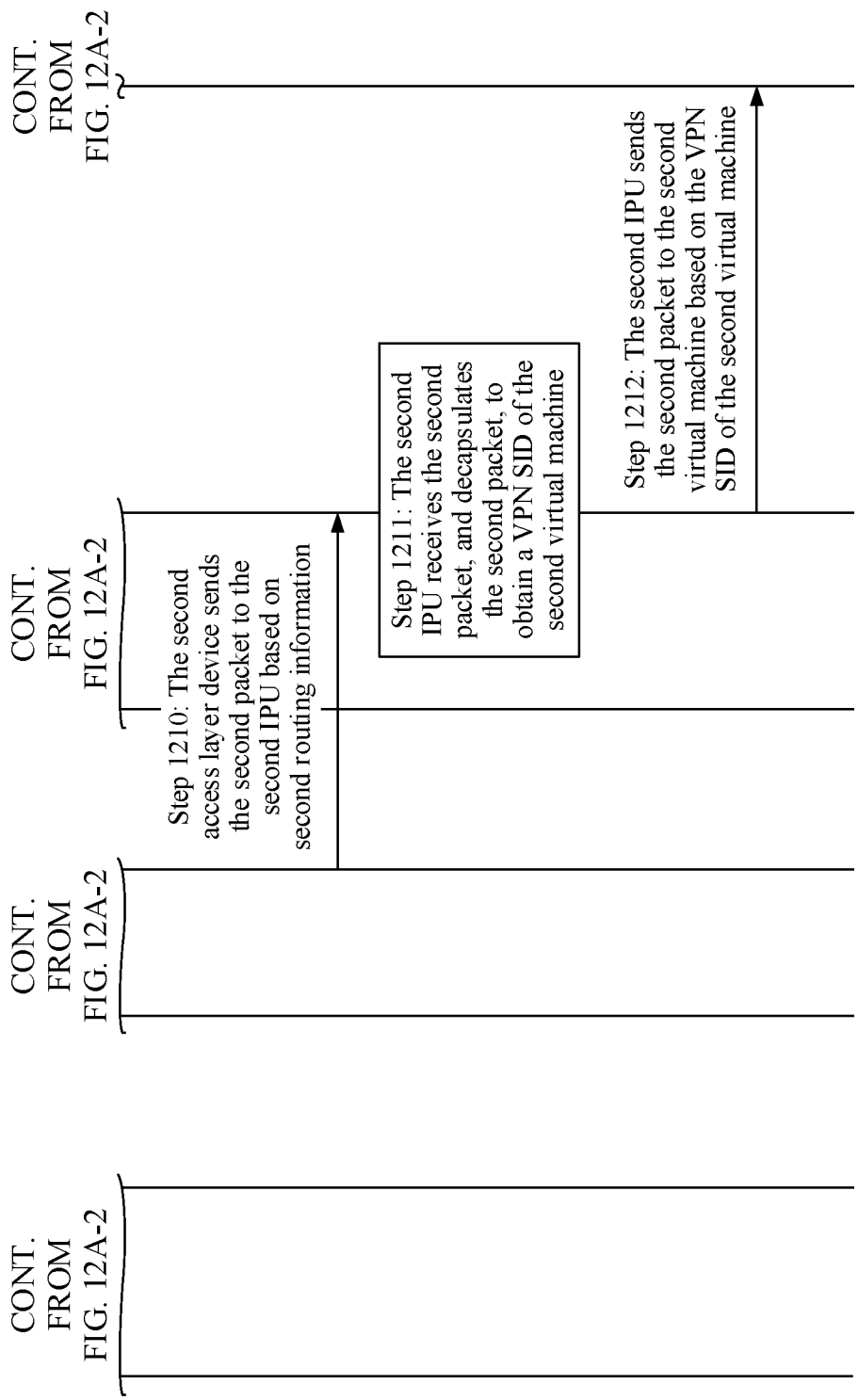

As shown in FIG. 12A-1 to FIG. 12A-3, in a process in which a packet enters a virtual machine, the packet forwarding method provided in the embodiments of this application includes step 1201 to step 1212.

Step 1201: The first aggregation layer device receives a first packet.

The first packet is a packet to be sent to the first virtual machine. It should be understood that, for the aggregation layer device, a destination address of the first packet (referred to as an outer destination address of the first packet) is a VPN SID of the first virtual machine, that is, A1:B1:C1:D1:1::1.

Step 1202: The first aggregation layer device sends the first packet to the first access layer device.

Table 1 is an example of some content of a routing table stored in the first aggregation layer device. With reference to Table 1, the first aggregation layer device matches the outer destination address A1:B1:C1:D1:1::1 of the first packet against an entry in the routing table by using a longest match method, and determines that a next-hop device of the first packet is the first access layer device (that is, the ToR 1), and the first aggregation layer device sends the first packet to the first access layer device.

TABLE 1

| dest/mask | next-hop | out-intf |
| --- | --- | --- |
| A1:B1:C1:D1:1::/68 | IP-ToR 1 | intf to ToR 1 |
| FRR | IP-ToR 2 | intf to ToR 2 |

Step 1203: The first access layer device receives the first packet.

Step 1204: The first access layer device sends the first packet to the first IPU based on first routing information.

In the embodiments of this application, after receiving the first routing information, the first access layer device generates a forwarding entry and stores the forwarding entry in a routing table. Table 2 is an example of some content of the routing table stored in the first access layer device. With reference to Table 2, the first access layer device matches the outer destination address A1:B1:C1:D1:1::1 of the first packet against an entry in the routing table by using a longest match method, and determines that a next-hop device of the first packet is the first IPU (a port corresponding to the first IPU is a NIC 1), and the first access layer device sends the first packet to the first IPU.

TABLE 2

| Destination dest/mask | Next-hop next-hop | Outbound interface out-intf |
| --- | --- | --- |
| A1:B1:C1:D1:1::/68 | IP-NIC 1 | intf to NIC 1 |
| A1:B1:C1:D1:1::/64 | IP-NIC 1 | intf to NIC 1 |
| Ti-LFA | IP-EoR 2/IP-EoR 1 | intf to EoR 2/EoR 1 |

Step 1205: The first IPU receives the first packet, and decapsulates the first packet, to obtain the VPN SID of the first virtual machine.

The first IPU receives the first packet from the first physical port (that is, the NIC 1) of the first IPU, and decapsulates the first packet, to obtain the outer destination address of the first packet (that is, the VPN SID of the first virtual machine) from an SRv6 header of the first packet.

Step 1206: The first IPU sends the first packet to the first virtual machine based on the VPN SID of the first virtual machine.

Table 3 is an example of some content of a local SID table of the first IPU. After the first IPU decapsulates the first packet to obtain the outer destination address of the first packet, the first IPU searches the SID table locally stored in the first IPU for an entry corresponding to the outer destination address A1:B1:C1:D1:1::1, determines that an outbound interface of the first packet is the first virtual port (that is, the vNIC 1) of the first IPU, and sends the first packet to the first virtual machine through the first virtual port.

TABLE 3

| Local SID | Type | out-intf |
|---|---|---|
| A1:B1:C1:D1:1::1 | End.DX | vNIC 1 |
| A1:B1:C1:D1:2::1 | End.DX | vNIC 2 |

A curve in FIG. 11A shows a forwarding path of the first packet.

Step 1207: The second aggregation layer device receives a second packet.

The second packet is a packet to be sent to the second virtual machine. Likewise, for the aggregation layer device, a destination address of the second packet (referred to as an outer destination address of the second packet) is a VPN SID of the second virtual machine, that is, A1:B1:C1:D1:2::1.

Step 1208: The second aggregation layer device sends the second packet to the second access layer device.

Step 1209: The second access layer device receives the second packet.

Step 1210: The second access layer device sends the second packet to the second IPU based on second routing information.

Step 1211: The second IPU receives the second packet, and decapsulates the second packet, to obtain the VPN SID of the second virtual machine.

Step 1212: The second IPU sends the second packet to the second virtual machine based on the VPN SID of the second virtual machine.

In the embodiments of this application, a downlink forwarding process of the second packet is similar to the downlink forwarding process of the first packet. For related descriptions of step 1207 to step 1212, refer to the descriptions of step 1201 to step 1206. Details are not described herein again.

Figures 3, 12B:
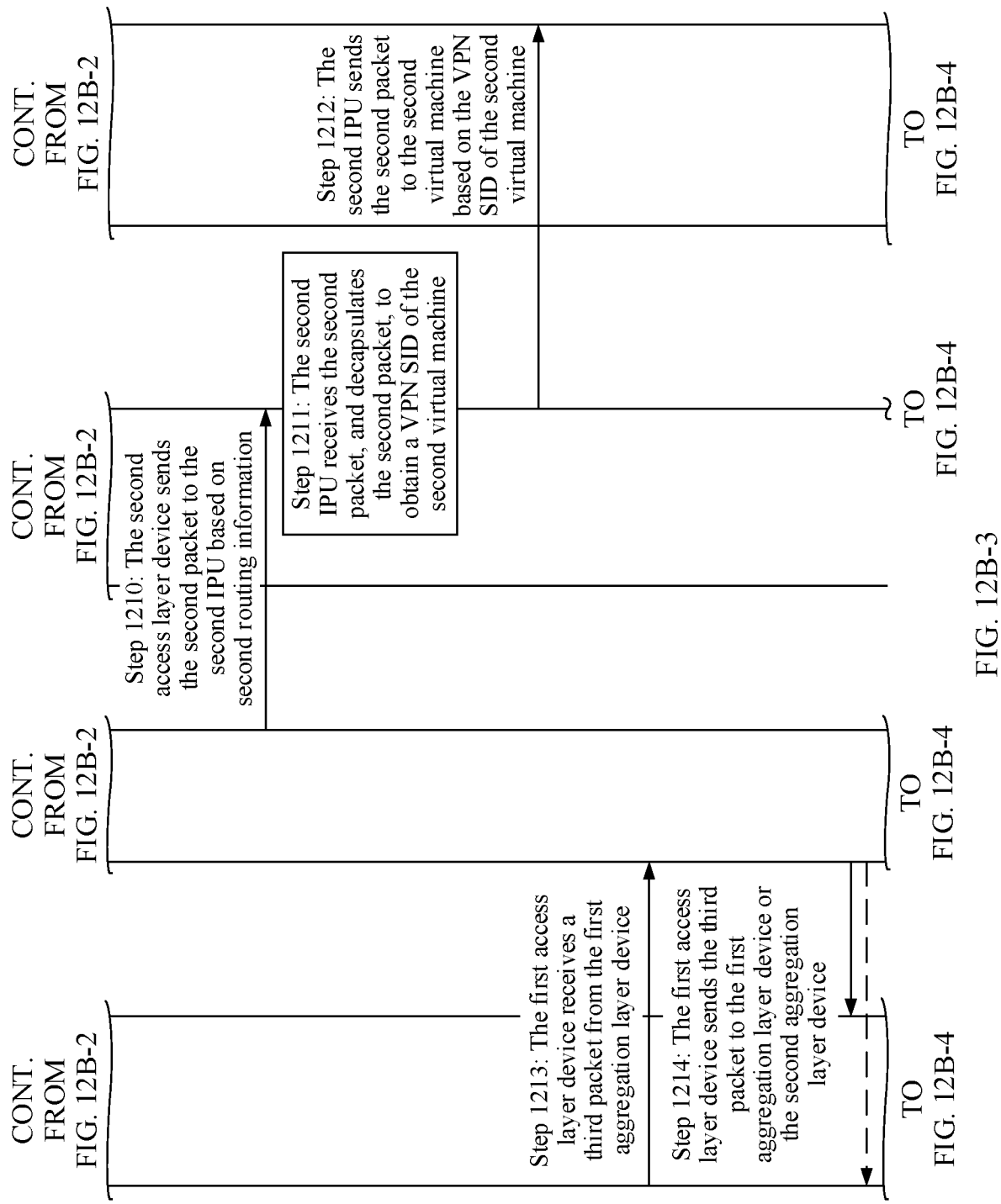
Figures 4, 12B:
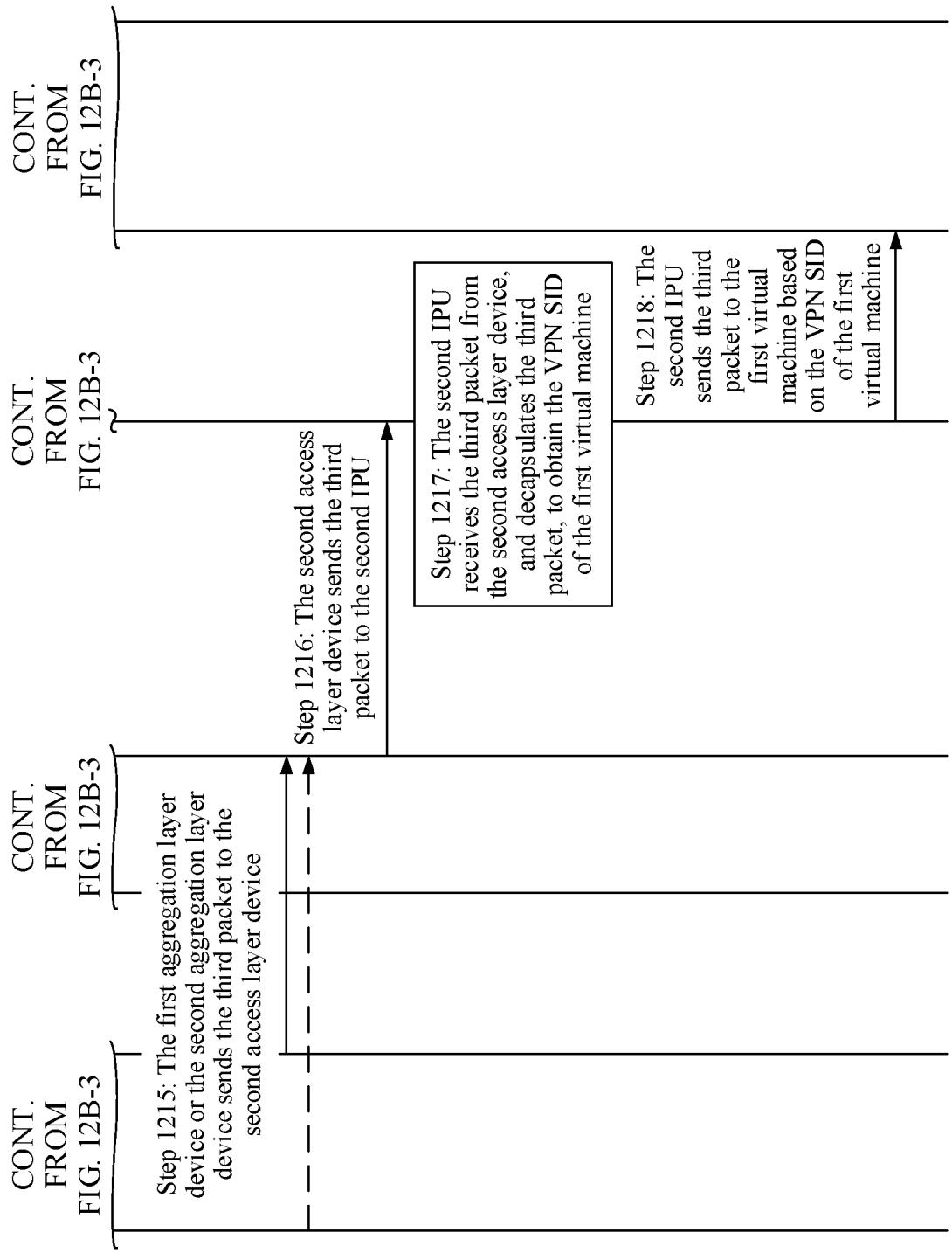

With reference to FIG. 12A-1 to FIG. 12A-3, as shown in FIG. 12B-1 to FIG. 12B-4, when a communication fault occurs between the first access layer device and the first IPU, the packet forwarding method provided in the embodiments of this application further includes step 1213 to step 1218.

Step 1213: The first access layer device receives a third packet from the first aggregation layer device.

The third packet is a packet to be sent to the first virtual machine, and an outer destination address of the third packet is the VPN SID of the first virtual machine, that is, A1:B1:C1:D1:1::1.

Step 1214: The first access layer device sends the third packet to the first aggregation layer device or the second aggregation layer device.

In the embodiments of this application, with reference to Table 2, when a communication fault occurs between the first access layer device and the first IPU, the first access layer device may detect the fault, and determine that the foregoing longest match entry (that is, the entry corresponding to A1:B1:C1:D1:1::/68 in Table 2) is unavailable. Therefore, the first access layer device selects an entry corresponding to a normal outbound interface to forward the third packet. This process may be understood as that the first access layer device performs topology-independent loop-free alternate (Ti-LFA) fast switching, that is, performs forwarding path switching, and forwards a packet by using the entry corresponding to Ti-LFA in Table 2. Specifically, the first access layer device modifies the outer destination address of the third packet, and then the first access layer device sends the third packet to the first aggregation layer device (that is, the EoR 1) or the second aggregation layer device (that is, the EoR 2).

Step 1215: The first aggregation layer device or the second aggregation layer device sends the third packet to the second access layer device.

In an implementation, if the first access layer device sends the third packet to the first aggregation layer device, after the first aggregation layer device receives the third packet, the first aggregation layer device determines, by using the longest match method with reference to the routing table stored in the first aggregation layer device shown in Table 1, that the outer destination address of the third packet matches the entry corresponding to A1:B1:C1:D1:1::/64 in Table 1, and therefore determines that a next-hop device of the third packet is the second access layer device. The first aggregation layer device sends the third packet to the second access layer device (that is, the ToR 2).

In another implementation, if the first access layer device sends the third packet to the second aggregation layer device, after the second aggregation layer device receives the third packet, the second aggregation layer device determines, by using a longest match method with reference to a routing table stored in the second aggregation layer device shown in Table 4, that the outer destination address of the third packet matches an entry corresponding to A1:B1:C1:D1:1::/64 in Table 4, and therefore determines that a next-hop device of the third packet is the second access layer device (that is, the ToR 2). The second aggregation layer device sends the third packet to the second access layer device.

TABLE 4

| dest/mask | next-hop | out-intf |
|---|---|---|
| A1:B1:C1:D1:1::/64 | IP-ToR 2 | intf to ToR 2 |

Step 1216: The second access layer device sends the third packet to the second IPU.

In the embodiments of this application, after receiving the third packet, the second access layer device matches, by using a longest match method, the outer destination address of the third packet against an entry in a routing table stored in the second access layer device shown in Table 5, and determines that a next-hop device of the third packet is the second IPU (a port corresponding to the second IPU is a NIC 2). The second access layer device sends the third packet to the second IPU.

TABLE 5

| Destination dest/mask | Next-hop next-hop | Outbound interface out-intf |
|---|---|---|
| A1:B1:C1:D1:1::/64 | IP-NIC 2 | intf to NIC 2 |
| FRR | IP-EoR 1/IP-EoR 2 | intf to EoR 1/EoR 2 |

Step 1217: The second IPU receives the third packet from the second access layer device, and decapsulates the third packet, to obtain the VPN SID of the first virtual machine.

The second IPU receives the third packet from the second physical port (that is, the NIC 2) of the second IPU, and decapsulates the third packet, to obtain the VPN SID of the third packet from an SRv6 header of the third packet, that is, A1:B1:C1:D1:1::1.

Step 1218: The second IPU sends the third packet to the first virtual machine based on the VPN SID of the first virtual machine.

Table 6 is an example of some content of a local SID table of the second IPU. After the second IPU obtains the outer destination address of the third packet, that is, the VPN SID of the first virtual machine, the second IPU searches the SID table locally stored in the second IPU for an entry corresponding to the outer destination address, determines that an outbound interface of the third packet is the first virtual port (that is, the vNIC 1) of the first IPU, and sends the third packet to the first virtual machine through the first virtual port.

TABLE 6

| Local SID | Type | out-intf |
|---|---|---|
| A1:B1:C1:D1:2::1 | End.DX | vNIC 2 |
| A1:B1:C1:D1:1::1 | End.DX | vNIC 1 |

Figure 11B:
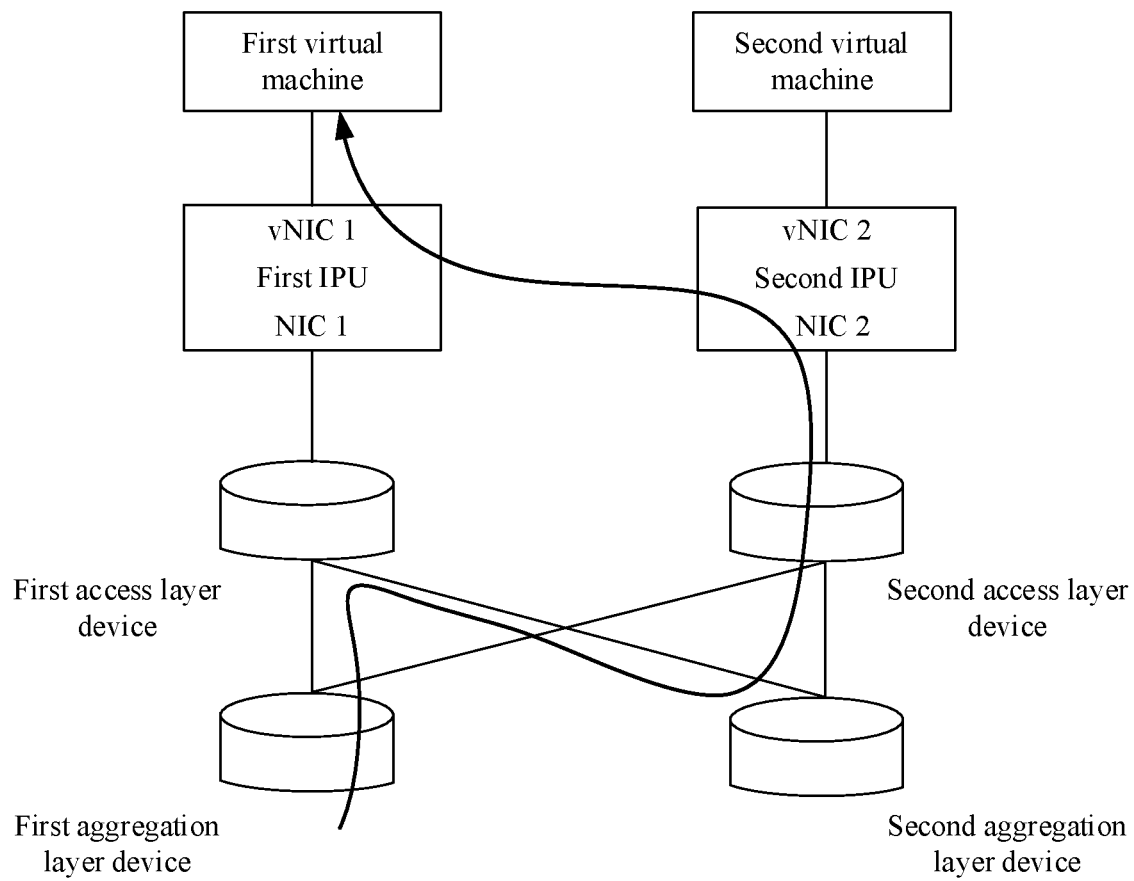
FIG. 11B is a second schematic diagram of a packet forwarding path according to an embodiment of this application.

A solid curve in FIG. 11B shows a forwarding path of the third packet when a communication fault occurs between the first access layer device and the first IPU (it should be noted that, on the forwarding path, the first access layer device sends the third packet to the second aggregation layer device).

Figure 11C:
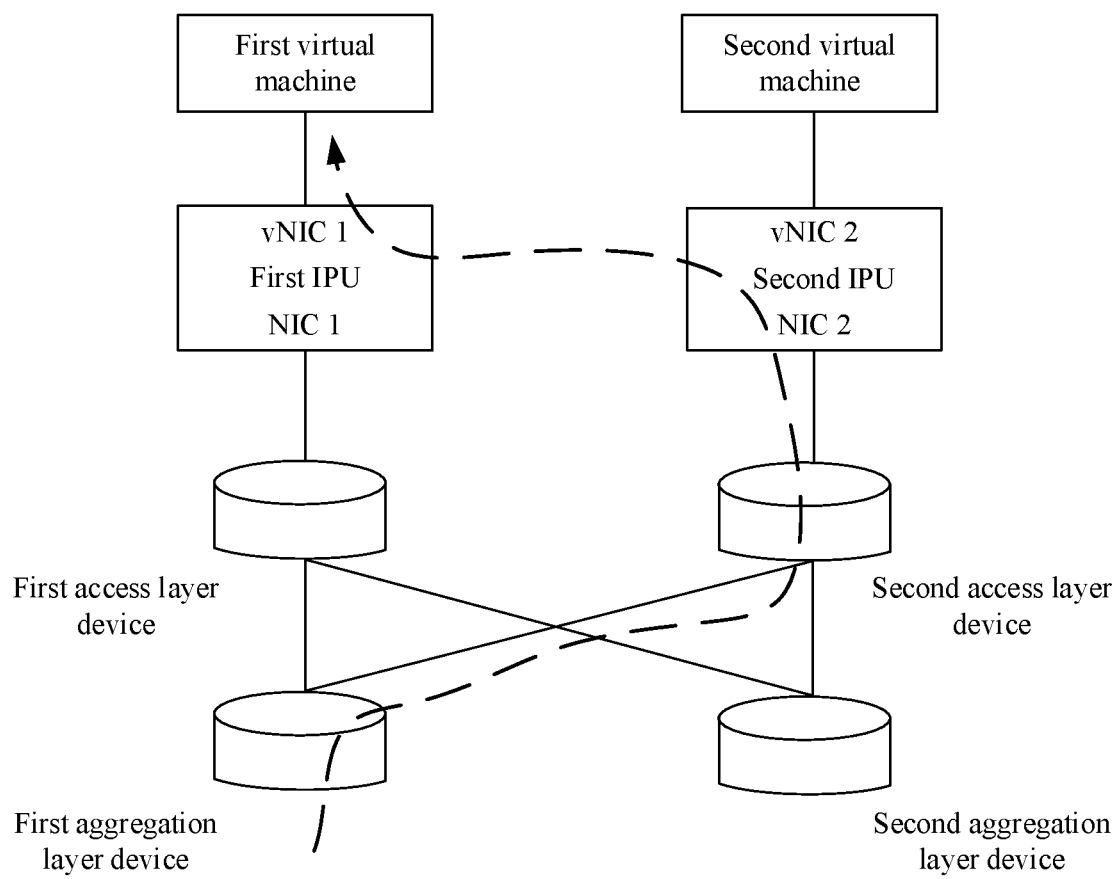
FIG. 11C is a third schematic diagram of a packet forwarding path according to an embodiment of this application.

It should be noted that, in the embodiments of this application, after a communication fault occurs between the first access layer device and the first IPU, the first access layer device and the first aggregation layer device update respective routing tables, and cancel respective forwarding entries generated based on the first routing information. For example, the entry corresponding to A1:B1:C1:D1:1::/68 in Table 2 and the entry corresponding to A1:B1:C1:D1:1::/68 in Table 1 are deleted. After the routing table of the first aggregation layer device is converged (that is, is updated), the first aggregation layer device receives a packet (the packet is referred to as a fifth packet). If the fifth packet is a packet to be sent to a service address of the first virtual machine, the first aggregation layer device sends the fifth packet to the second access layer device based on a new routing table obtained by the first aggregation layer device. Then, the second access layer device sends the fifth packet to the second IPU, and the second IPU sends the fifth packet to the first virtual machine. A dashed curve in FIG. 11C shows a forwarding path of the fifth packet when a communication fault occurs between the first access layer device and the first IPU.

In conclusion, it may be understood that, after a communication fault occurs between the first access layer device and the first IPU, a packet (for example, the third packet or the fifth packet) to be sent to the service address of the first virtual machine is sent to the first virtual machine by using the second IPU. Because the first virtual machine is located on the first NUMA node, and the second IPU is located on the second NUMA node, the packet is forwarded across nodes, that is, the virtual routing device performs remote memory access when a communication fault occurs, so as to ensure that the packet is successfully sent to the first virtual machine, thereby improving communication reliability.

Referring to step 1213 to step 1218 and the related descriptions, likewise, when a communication fault occurs between the second access layer device and the second IPU, after the second access layer device receives a fourth packet (the fourth packet is a packet to be sent to the second virtual machine), the second access layer device sends the fourth packet to the first aggregation layer device or the second aggregation layer device. Then, the first aggregation layer device or the second aggregation layer device sends the fourth packet to the first access layer device, and the first access layer device sends the fourth packet to the first IPU. Finally, the first IPU sends the fourth packet to the second virtual machine through the second virtual port of the second virtual machine. In addition, after a communication fault occurs between the second access layer device and the second IPU, the second access layer device and the second aggregation layer device update respective routing tables, and cancel respective forwarding entries generated based on the second routing information. For details, refer to the related descriptions in the scenario in which a communication fault occurs between the first access layer device and the first IPU. Details are not described herein again.

Figure 13A:
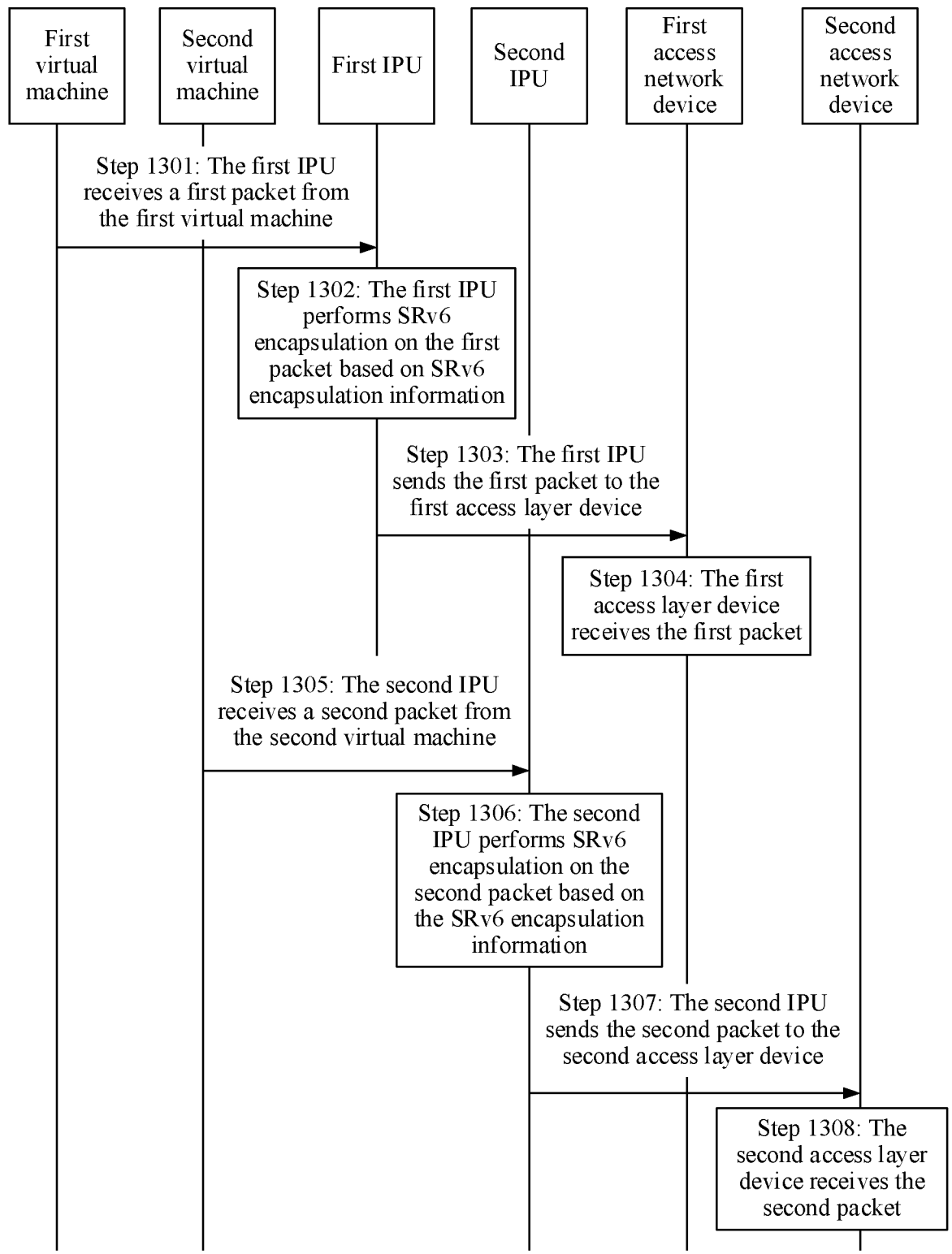
FIG. 13A is a seventh schematic diagram of a packet forwarding method according to an embodiment of this application.

When the routing information is configured in the first manner (that is, the routing information is configured by performing step 801 to step 804), the packet forwarding method provided in the embodiments of this application may be applied to a data center in an SRv6 network. As shown in FIG. 13A, in a process in which a packet leaves a virtual machine, the packet forwarding method provided in the embodiments of this application includes step 1301 to step 1308.

Step 1301: The first IPU receives a first packet from the first virtual machine.

The first packet is a packet to be sent to an edge node on a network side, and a destination address of the first packet is (denoted as a PE address 1).

Step 1302: The first IPU performs SRv6 encapsulation on the first packet based on SRv6 encapsulation information.

In the embodiments of this application, after receiving the first packet, the first IPU searches a private network routing table stored in the first IPU for the SRv6 encapsulation information for the first packet, and then encapsulates the first packet based on the SRv6 encapsulation information.

Step 1303: The first IPU sends the first packet to the first access layer device.

Table 7 is an example of some content of a routing table stored in the first IPU. The routing table includes load sharing entries of the first physical port (NIC 1) and the second physical port (NIC 2). The first IPU searches the routing table to determine that a next-hop device of the first packet is the first access layer device (that is, the ToR 1), and then determines, according to a local unit preference principle, to send the first packet through the first physical port of the first IPU.

TABLE 7

| Destination dest/mask | Next-hop next-hop | Outbound interface out-intf |
|---|---|---|
| PE Address 1 | IP-ToR 1 | NIC 1 |
| PE Address 1 | IP-ToR 2 | NIC 2 |

Step 1304: The first access layer device receives the first packet.

Figure 11D:
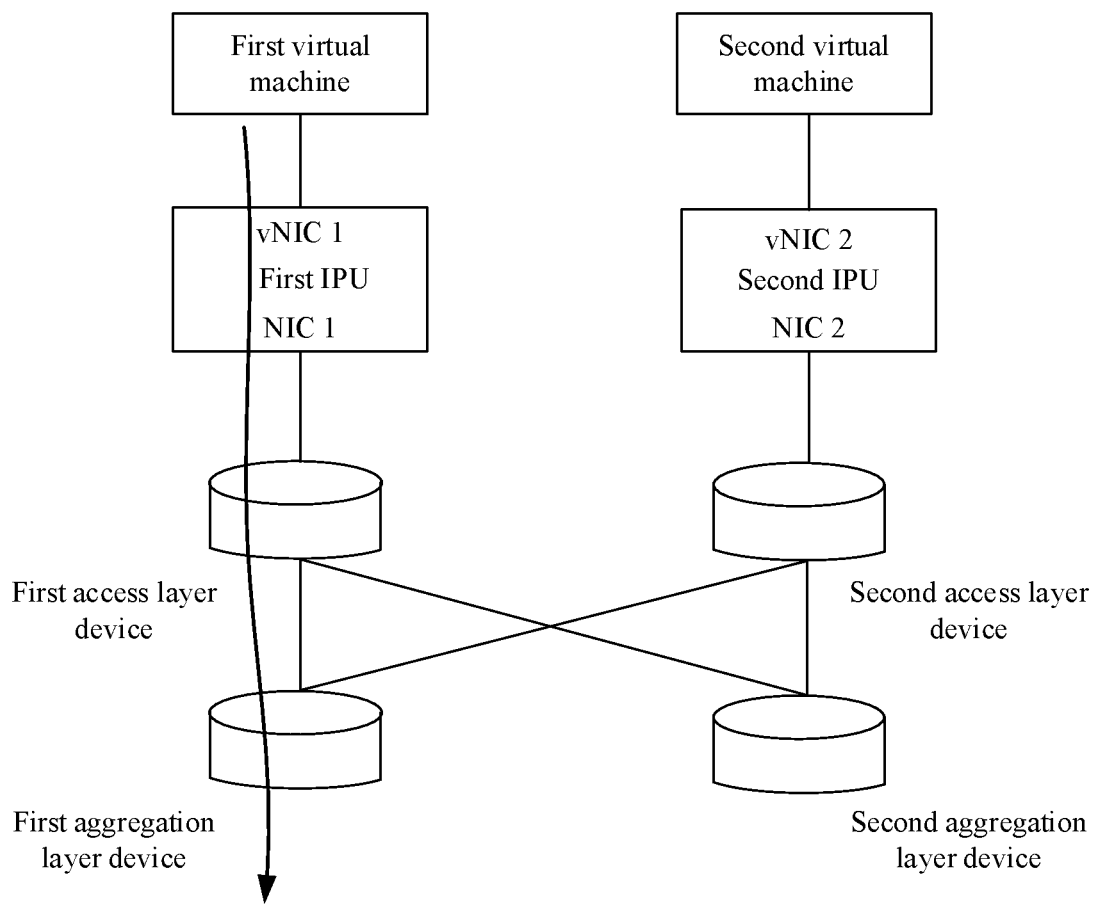
FIG. 11D is a fourth schematic diagram of a packet forwarding path according to an embodiment of this application.

Subsequently, the first access layer device, the first aggregation layer device, or the like forwards the packet to a device corresponding to the destination address of the packet. A curve in FIG. 11D shows a forwarding path of the first packet.

Step 1305: The second IPU receives a second packet from the second virtual machine.

Step 1306: The second IPU performs SRv6 encapsulation on the second packet based on the SRv6 encapsulation information.

Step 1307: The second IPU sends the second packet to the second access layer device.

Step 1308: The second access layer device receives the second packet.

In the embodiments of this application, an uplink forwarding process of the second packet is similar to the uplink forwarding process of the first packet. For related descriptions of step 1305 to step 1308, refer to the descriptions of step 1301 to step 1304. Details are not described herein again.

Figures 1, 13B:
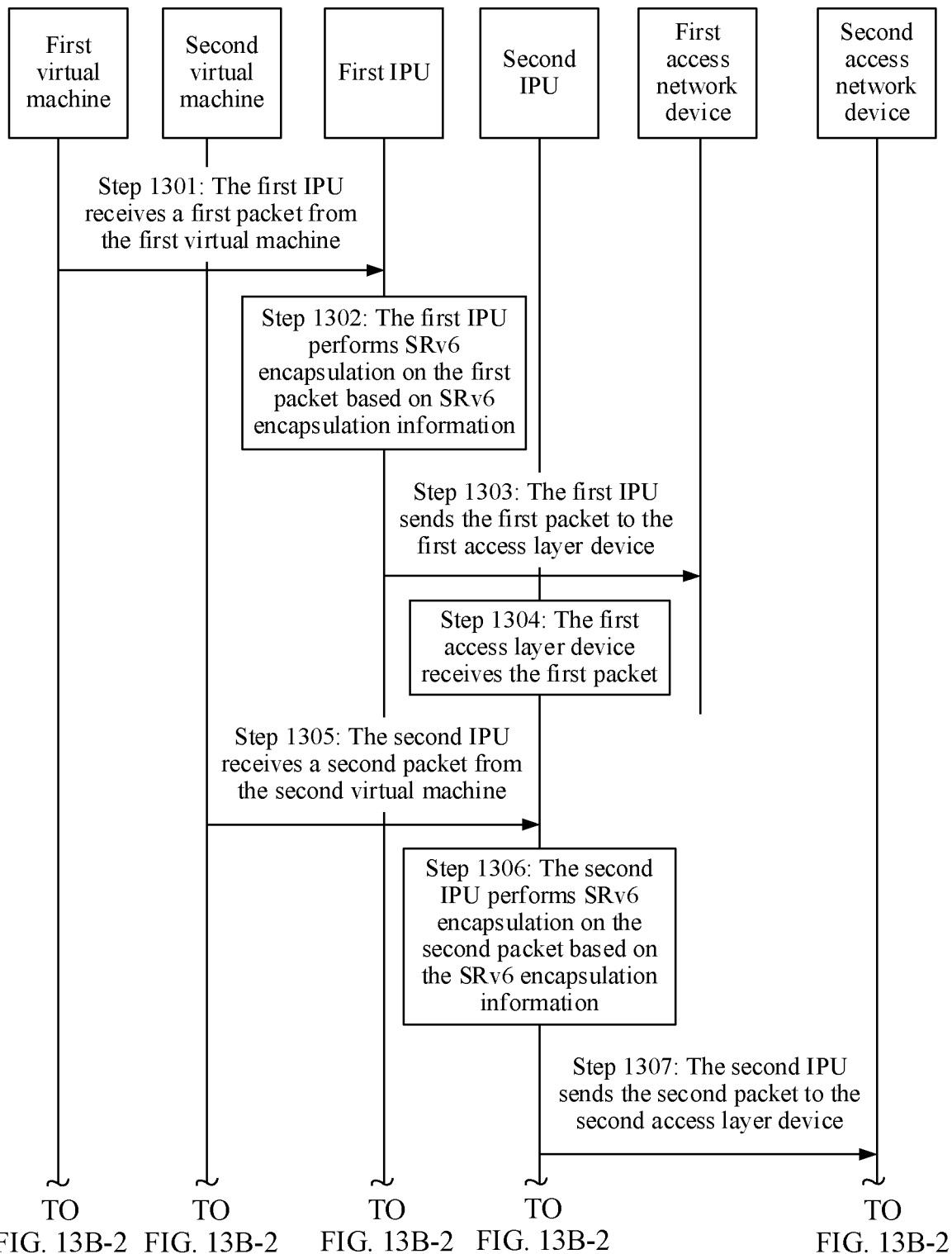
Figures 2, 13B:
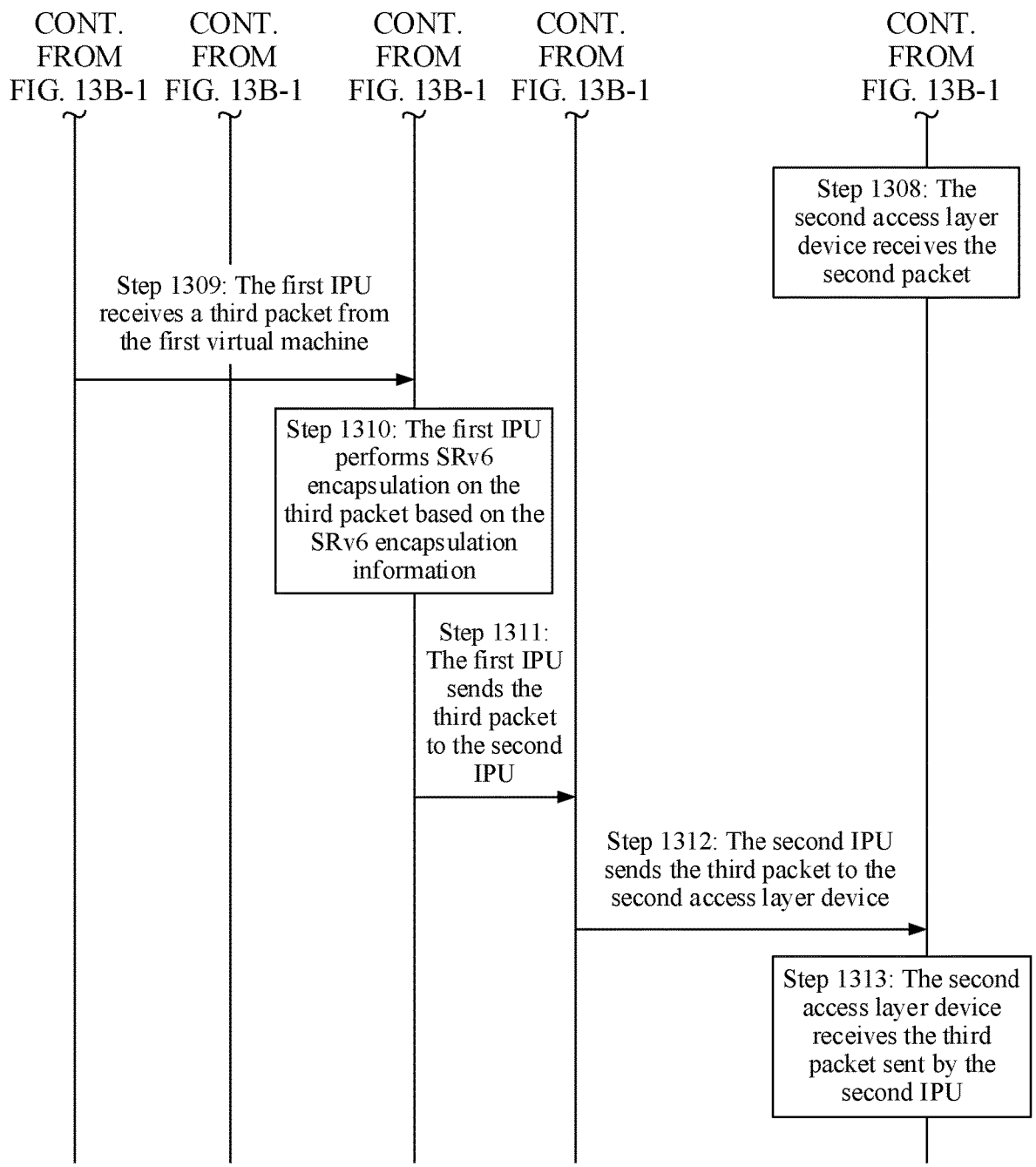

With reference to FIG. 13A, as shown in FIG. 13B-1 and FIG. 13B-2, when a communication fault occurs between the first access layer device and the first IPU, the packet forwarding method provided in the embodiments of this application further includes step 1309 to step 1313.

Step 1309: The first IPU receives a third packet from the first virtual machine.

The third packet is a packet to be sent to an edge node on the network side, and a destination address (denoted as a PE Address) of the third packet is the same as the destination address of the first packet.

Step 1310: The first IPU performs SRv6 encapsulation on the third packet based on the SRv6 encapsulation information.

Step 1311: The first IPU sends the third packet to the second IPU.

In the embodiments of this application, the first IPU detects that a communication fault occurs between the first IPU and the first access network device (for example, a fault occurs on the first physical port). In this case, the first IPU sends the third packet to another IPU (for example, the second IPU), so that the third packet is forwarded through a port of the other IPU.

Step 1312: The second IPU sends the third packet to the second access layer device.

Step 1313: The second access layer device receives the third packet sent by the second IPU.

Figure 11E:
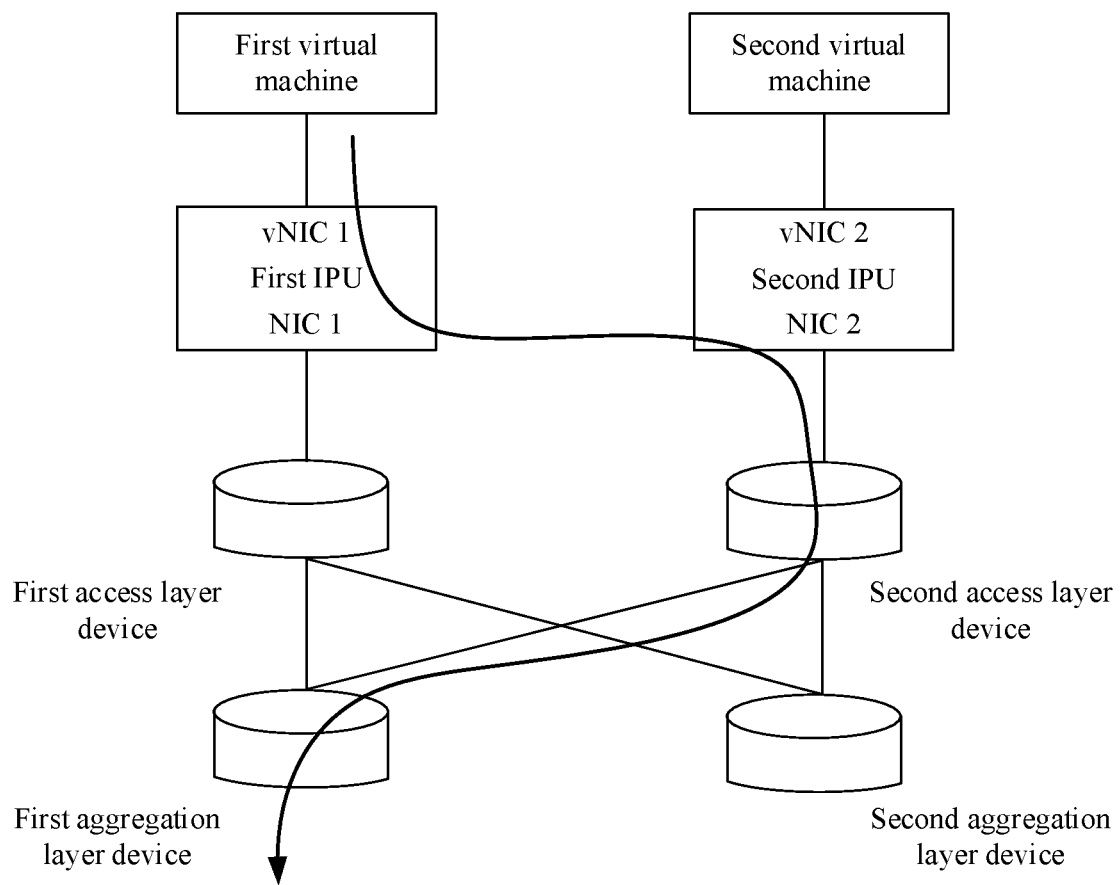
FIG. 11E is a fifth schematic diagram of a packet forwarding path according to an embodiment of this application.

Subsequently, the second access layer device sends the third packet to the first aggregation layer device, so that the third packet is forwarded to a device corresponding to the destination address of the third packet. A curve in FIG. 11E shows a forwarding path of the third packet. It can be learned that, in this case, a packet is forwarded across nodes, that is, the virtual routing device performs remote memory access when a communication fault occurs, so as to ensure that the packet is successfully sent to the network device, thereby improving communication reliability.

With reference to FIG. 11A, when the routing information is configured in the second manner (that is, the routing information is configured by performing step 801' and step 802'), the packet forwarding method provided in the embodiments of this application may be applied to a data center in an SRv6 network or a data center in a VxLAN network. The following uses the data center in the VxLAN network as an example. In the VxLAN network, an address of an IPU is a VTEP address. For example, an address of the first IPU is 100.100.100.101/32, an address of the second IPU is 100.100.100.102/32, a VNI assigned to the first virtual machine based on the address of the first IPU is 100, and a VNI assigned to the second virtual machine based on the address of the second IPU is 101.

Figures 1, 14A:
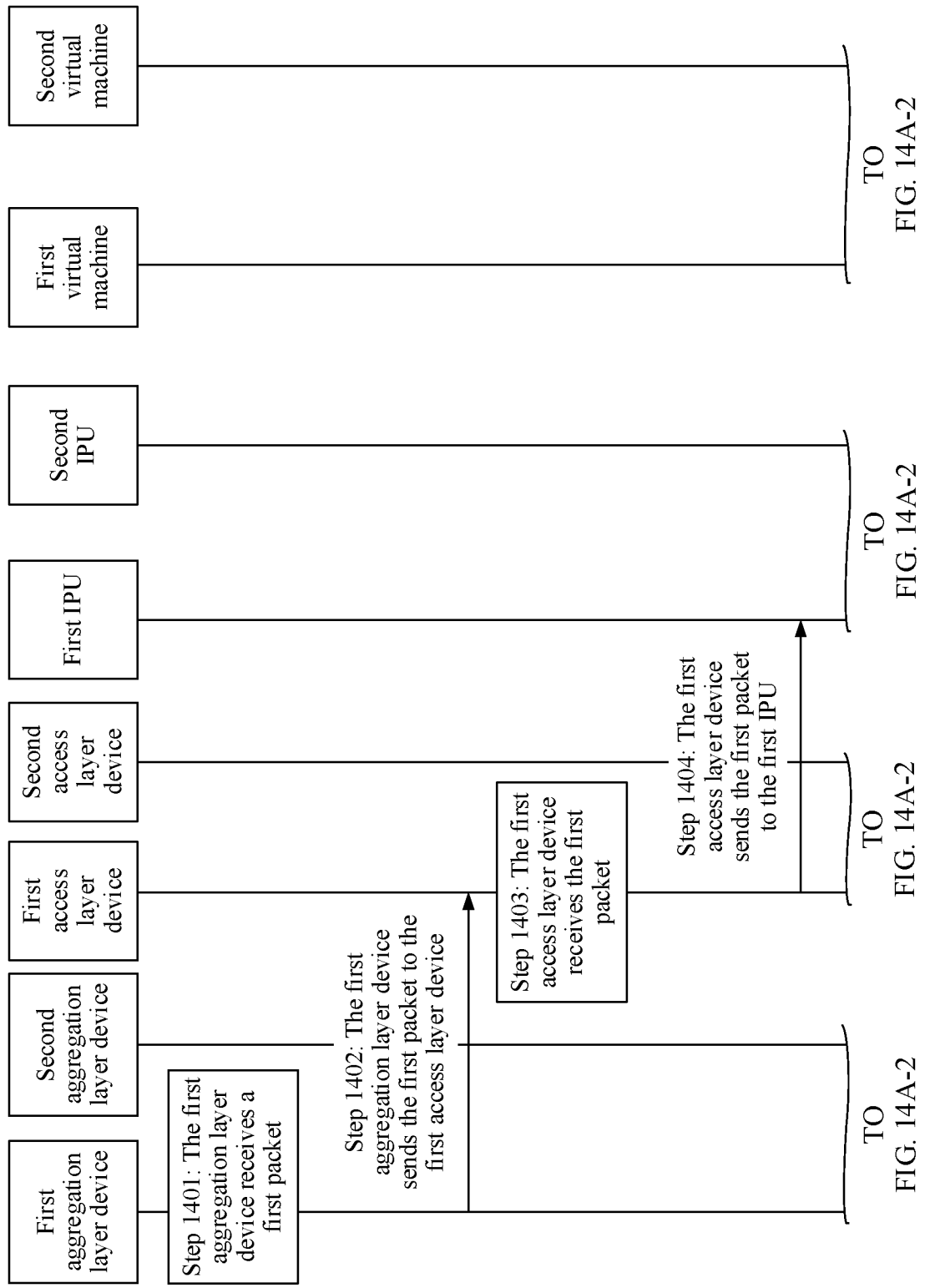

As shown in FIG. 14A-1 to FIG. 14A-3, in a process in which a packet enters a virtual machine, the packet forwarding method provided in the embodiments of this application includes step 1401 to step 1412.

Step 1401: The first aggregation layer device receives a first packet.

The first packet is a packet to be sent to the first virtual machine. It should be understood that, for the aggregation layer device, a destination address of the first packet (referred to as an outer destination address of the first packet) is a VTEP address of the first virtual machine, that is, 100.100.100.101/32.

Step 1402: The first aggregation layer device sends the first packet to the first access layer device.

It should be understood that the first aggregation layer device may receive first routing information from the first access layer device, receive second routing information from the second access layer device, and generate a forwarding entry. The first routing information includes an address of the first IPU and an address of the second IPU, and the second routing information includes the address of the second IPU and the address of the first IPU.

Table 8 is an example of some content of a routing table stored in the first aggregation layer device. With reference to Table 8, the first aggregation layer device matches the outer destination address 100.100.100.101/32 of the first packet against an entry in Table 8 by using a longest match method, and determines that a next-hop device of the first packet is the first access layer device (that is, the ToR 1), and the first aggregation layer device sends the first packet to the first access layer device.

TABLE 8

| dest/mask | next-hop | out-intf |
| --- | --- | --- |
| 100.100.100.101/32 | IP-ToR 1 | intf to ToR 1 |
| FRR | IP-ToR 2 | intf to ToR 2 |

Step 1403: The first access layer device receives the first packet.

Step 1404: The first access layer device sends the first packet to the first IPU.

Table 9 is an example of some content of a routing table stored in the first access layer device. With reference to Table 9, the first access layer device matches the outer destination address 100.100.100.101/32 of the first packet against an entry in Table 9 by using a longest match method, and determines that a next-hop device of the first packet is the first IPU (a port corresponding to the first IPU is a NIC 1), and the first access layer device sends the first packet to the first IPU.

TABLE 9

| Destination dest/mask | Next-hop next-hop | Outbound interface out-intf |
| --- | --- | --- |
| 100.100.100.101/32 | IP-NIC 1 | intf to NIC 1 |
| FRR | IP-EoR 2/IP-EoR 1 | intf to EoR 2/EoR 1 |

Step 1405: The first IPU receives the first packet, and decapsulates the first packet, to obtain a VNI of the first virtual machine.

The first IPU receives the first packet from the first physical port (that is, the NIC 1) of the first IPU, and decapsulates the first packet, to obtain a VNI from a VxLAN header of the first packet. The VNI is the VNI of the first virtual machine.

Step 1406: The first IPU sends the first packet to the first virtual machine based on the VNI of the first virtual machine.

The first IPU may further obtain an inner destination address of the first packet (that is, a service address of the first virtual machine) by decapsulating the first packet based on the VNI obtained through decapsulation, and then determine, based on the VNI, a private network routing table corresponding to the VNI. Based on the private network routing table, the first IPU matches the inner destination address of the first packet against an entry in the private network routing table by using a longest match method, determines that a next-hop device of the first packet is the first virtual machine, and sends the first packet to the first virtual machine through the first virtual port (that is, the vNIC 1) of the first IPU.

It may be understood that, for a forwarding path of the first packet, refer to FIG. 11A.

Step 1407: The second aggregation layer device receives a second packet.

The second packet is a packet to be sent to the second virtual machine. Likewise, for the aggregation layer device, a destination address of the second packet (referred to as an outer destination address of the second packet) is a VTEP address of the second IPU, that is, 100.100.100.102/32.

Step 1408: The second aggregation layer device sends the second packet to the second access layer device.

Step 1409: The second access layer device receives the second packet.

Step 1410: The second access layer device sends the second packet to the second IPU.

Step 1411: The second IPU receives the second packet, and decapsulates the second packet, to obtain a VNI of the second virtual machine.

Step 1412: The second IPU sends the second packet to the second virtual machine based on the VNI of the second virtual machine.

In the embodiments of this application, a downlink forwarding process of the second packet is similar to the downlink forwarding process of the first packet. For related descriptions of step 1407 to step 1412, refer to the descriptions of step 1401 to step 1406. Details are not described herein again.

Figures 2, 14B:
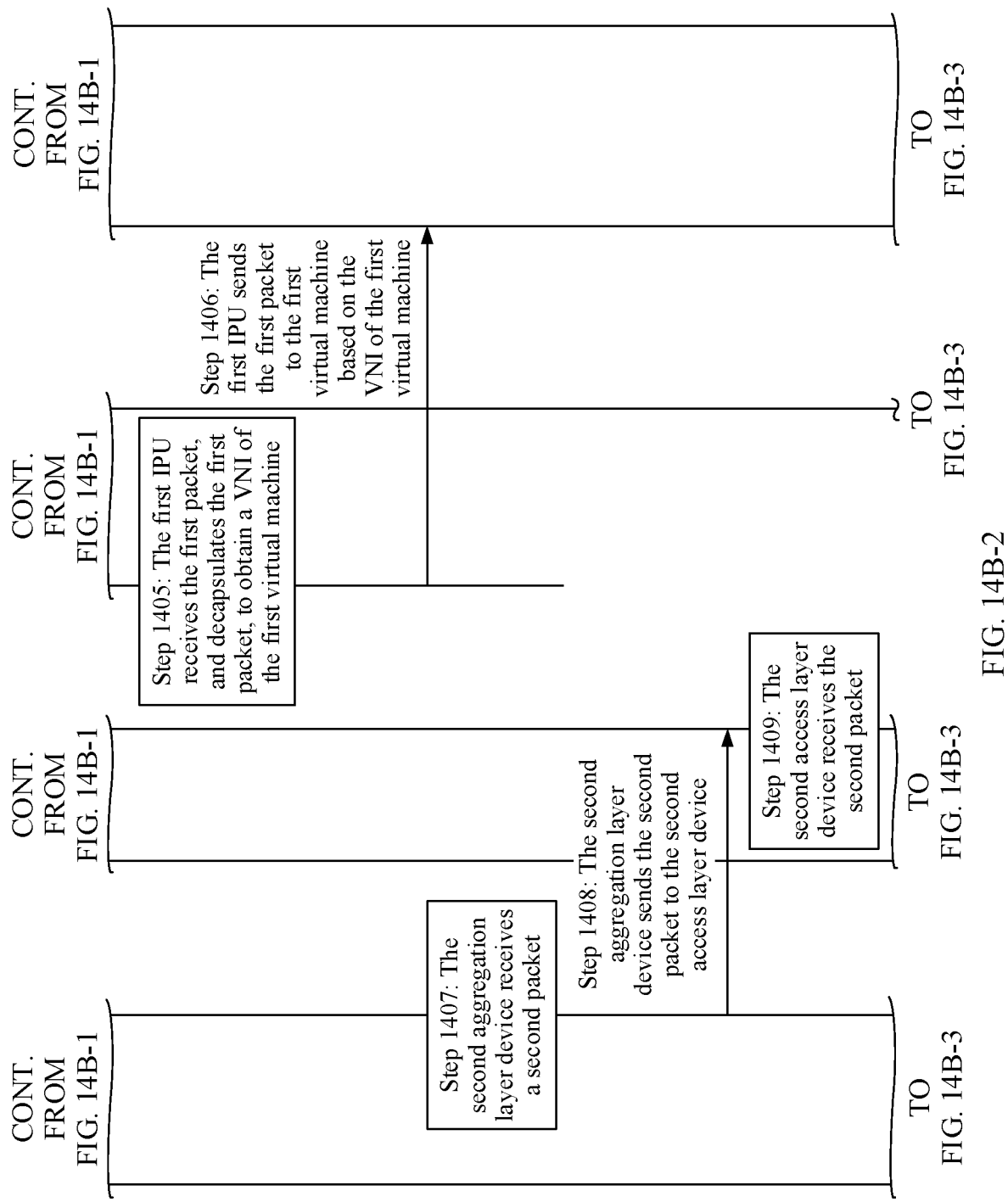
Figures 3, 14B:
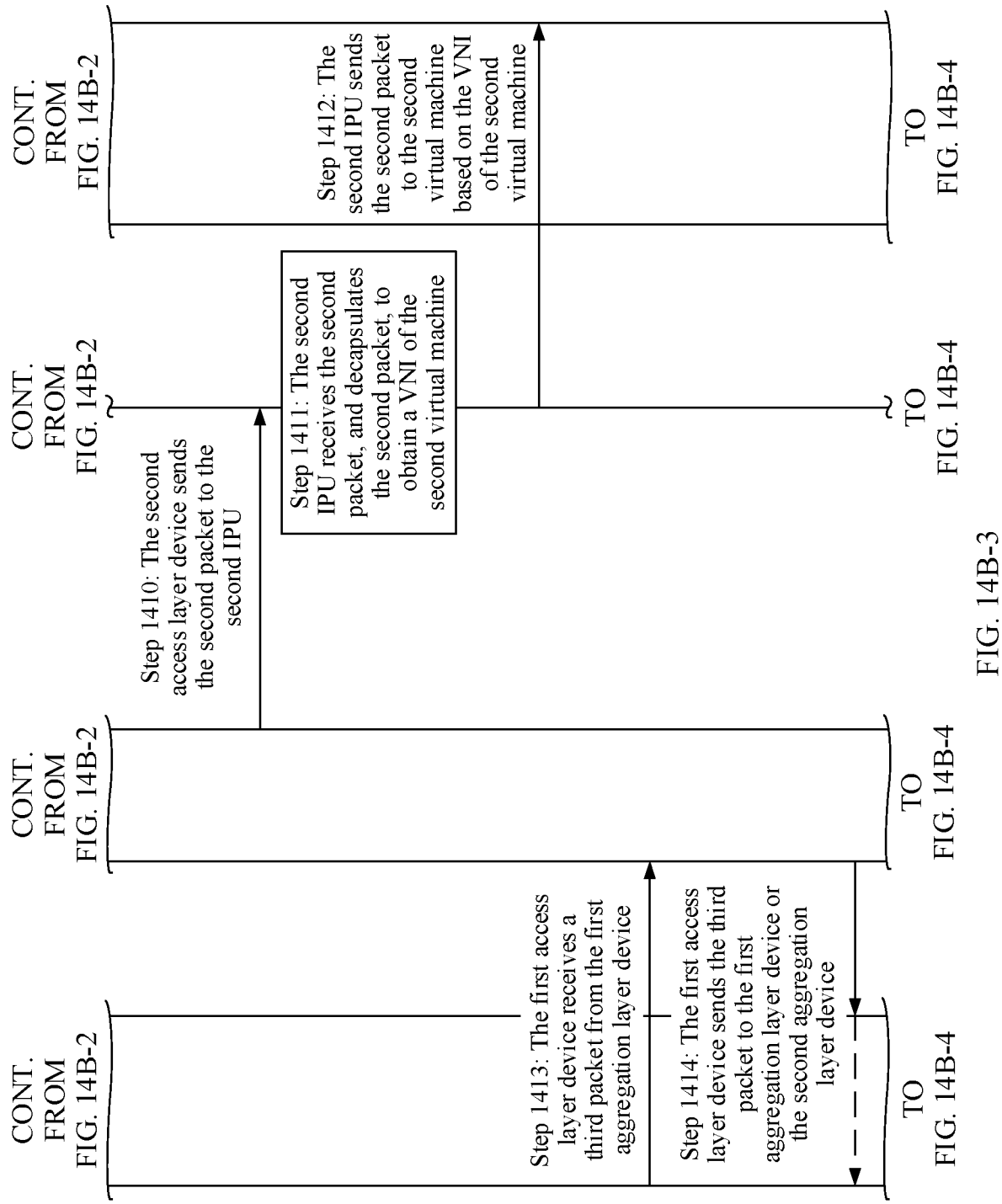

With reference to FIG. 14A-1 to FIG. 14A-3, as shown in FIG. 14B-1 to FIG. 14B-4, when a communication fault occurs between the first access layer device and the first IPU, the packet forwarding method provided in the embodiments of this application further includes step 1413 to step 1418.

Step 1413: The first access layer device receives a third packet from the first aggregation layer device.

The third packet is a packet to be sent to the first virtual machine.

Step 1414: The first access layer device sends the third packet to the first aggregation layer device or the second aggregation layer device.

In the embodiments of this application, if a communication fault occurs between the first access layer device and the first IPU, an entry that is in the routing table stored in the first access layer device and that is generated based on the address of the first IPU in the first routing information is unavailable, that is, the first IPU cannot be found. A priority of the address of the first IPU in the first routing information is higher than a priority of the address of the first IPU in the second routing information. Therefore, when an entry generated based on the address of the first IPU with a higher priority in the first routing information is unavailable, the first access layer device performs fast reroute (FRR) fast switching, that is, performs forwarding path switching, forwards the third packet to the first aggregation layer device or the second aggregation layer device by using the entry corresponding to the FRR in Table 9, and forwards the third packet based on an entry generated based on the address of the first IPU with a lower priority in the second routing information.

Step 1415: The first aggregation layer device or the second aggregation layer device sends the third packet to the second access layer device.

In an implementation, if the first access layer device sends the third packet to the first aggregation layer device, after receiving the third packet, the first aggregation layer device sends the third packet to the second access layer device (that is, the ToR 2).

In another implementation, if the first access layer device sends the third packet to the second aggregation layer device, after receiving the third packet, the second aggregation layer device sends the third packet to the second access layer device.

Step 1416: The second access layer device sends the third packet to the second IPU.

Step 1417: The second IPU receives the third packet from the second access layer device, and decapsulates the third packet, to obtain the VNI of the first virtual machine.

The second IPU receives the third packet from the second physical port (that is, the NIC 2) of the second IPU, and decapsulates the third packet, to obtain a VNI from a VxLAN header of the third packet. The VNI is the VNI of the first virtual machine.

Step 1418: The second IPU sends the third packet to the first virtual machine based on the VNI of the first virtual machine.

The second IPU determines, based on the VNI obtained through decapsulation, a private network routing table that is stored in the second IPU and that corresponds to the VNI, determines, based on the private network routing table by using a longest match method, that a next-hop device of the third packet is the first virtual machine, and sends the third packet to the first virtual machine through the first virtual port (that is, the vNIC 1) of the first IPU.

It may be understood that, for a forwarding path of the third packet when a communication fault occurs between the first access layer device and the first IPU (it should be noted that, on the forwarding path, the first access layer device sends the third packet to the second aggregation layer device), refer to the black solid curve in FIG. 11B.

It should be noted that, after a communication fault occurs between the first access layer device and the first IPU, the first access layer device and the first aggregation layer device update respective routing tables, and cancel respective forwarding entries generated based on the first routing information. After the routing table is updated, the first aggregation layer device receives a packet (the packet is referred to as a fifth packet). If a destination address of the fifth packet is still the service address of the first virtual machine, for a forwarding path of the fifth packet, refer to the dashed curve in FIG. 11C.

It can be learned that, in this case, a packet is forwarded across nodes, that is, the virtual routing device performs remote memory access when a communication fault occurs, so as to ensure that the packet is successfully sent to the first virtual machine, thereby improving communication reliability.

Figure 15A:
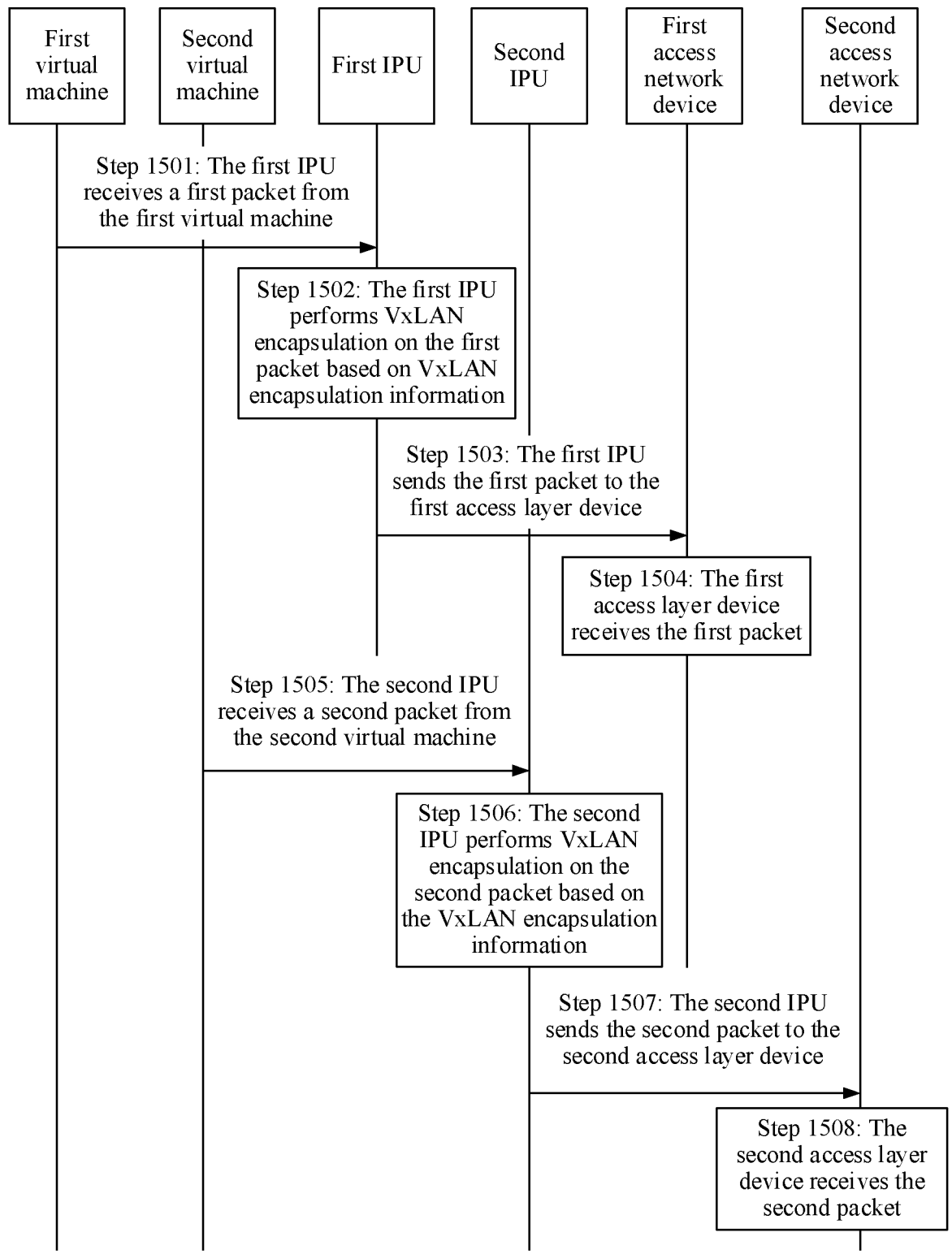
FIG. 15A is an eleventh schematic diagram of a packet forwarding method according to an embodiment of this application.

With reference to FIG. 11D, when the routing information is configured in the first manner (that is, the routing information is configured by performing step 801' and step 802'), the packet forwarding method provided in the embodiments of this application may be applied to a data center in an SRv6 network or a data center in a VxLAN network. The following uses the data center in the VxLAN network as an example for description. As shown in FIG. 15A, in a process in which a packet leaves a virtual machine, the packet forwarding method provided in the embodiments of this application includes step 1501 to step 1508.

Step 1501: The first IPU receives a first packet from the first virtual machine.

A destination address of the first packet may be an address (denoted as a PE address 1) of an edge node on a network side.

Step 1502: The first IPU performs VxLAN encapsulation on the first packet based on VxLAN encapsulation information.

In the embodiments of this application, after receiving the first packet, the first IPU searches a private network routing table stored in the first IPU for the VxLAN encapsulation information for the first packet, and then encapsulates the first packet based on the VxLAN encapsulation information.

Step 1503: The first IPU sends the first packet to the first access layer device.

Step 1504: The first access layer device receives the first packet.

Subsequently, the first access layer device, the first aggregation layer device, or the like forwards the packet to a device corresponding to the destination address of the packet. For a forwarding path of the first packet, refer to the curve in FIG. 11D.

Step 1505: The second IPU receives a second packet from the second virtual machine.

Step 1506: The second IPU performs VxLAN encapsulation on the second packet based on the VxLAN encapsulation information.

Step 1507: The second IPU sends the second packet to the second access layer device.

Step 1508: The second access layer device receives the second packet.

In the embodiments of this application, an uplink forwarding process of the second packet is similar to the uplink forwarding process of the first packet. For related descriptions of step 1505 to step 1508, refer to the descriptions of step 1501 to step 1504. Details are not described herein again.

Figures 1, 15B:
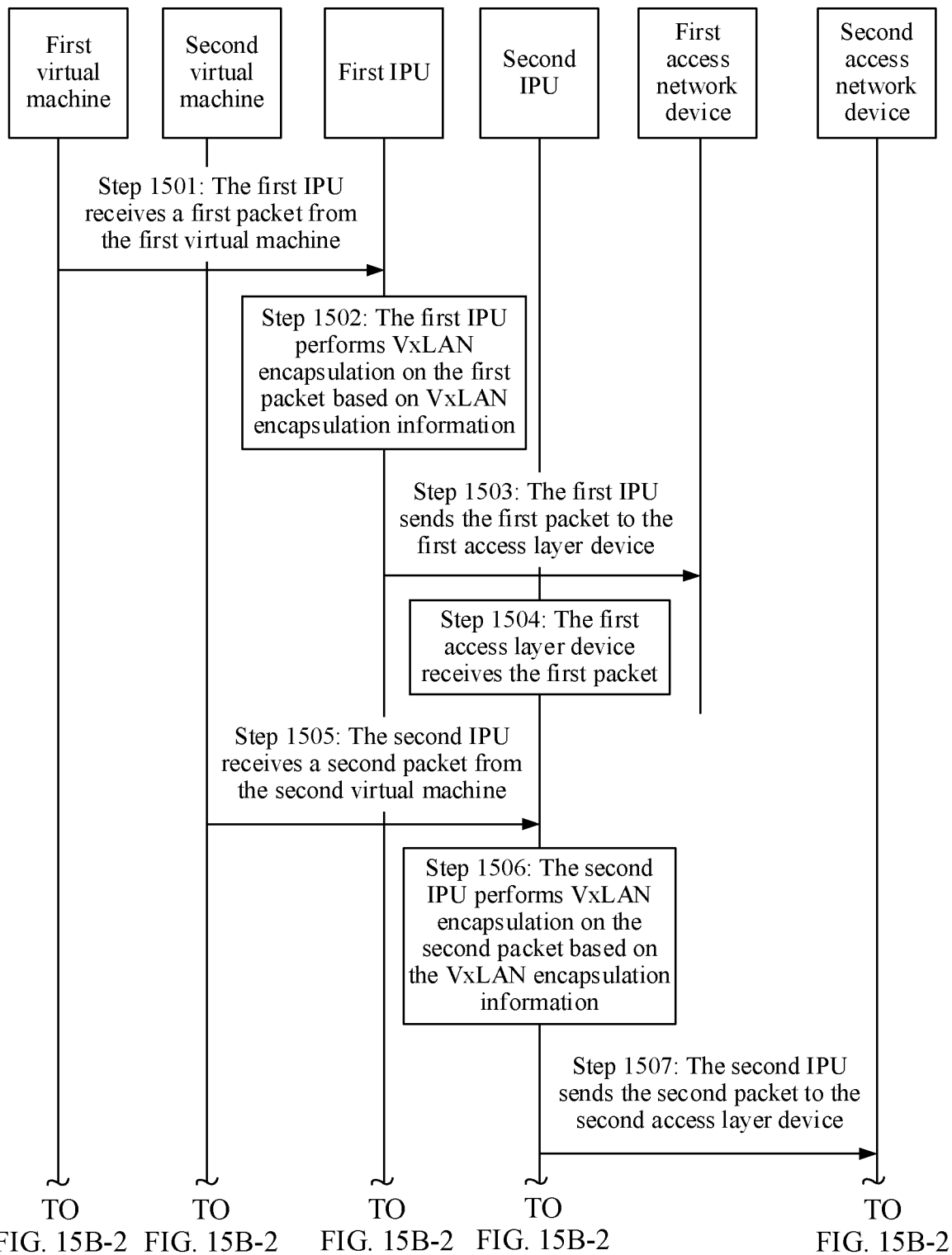
Figures 2, 15B:
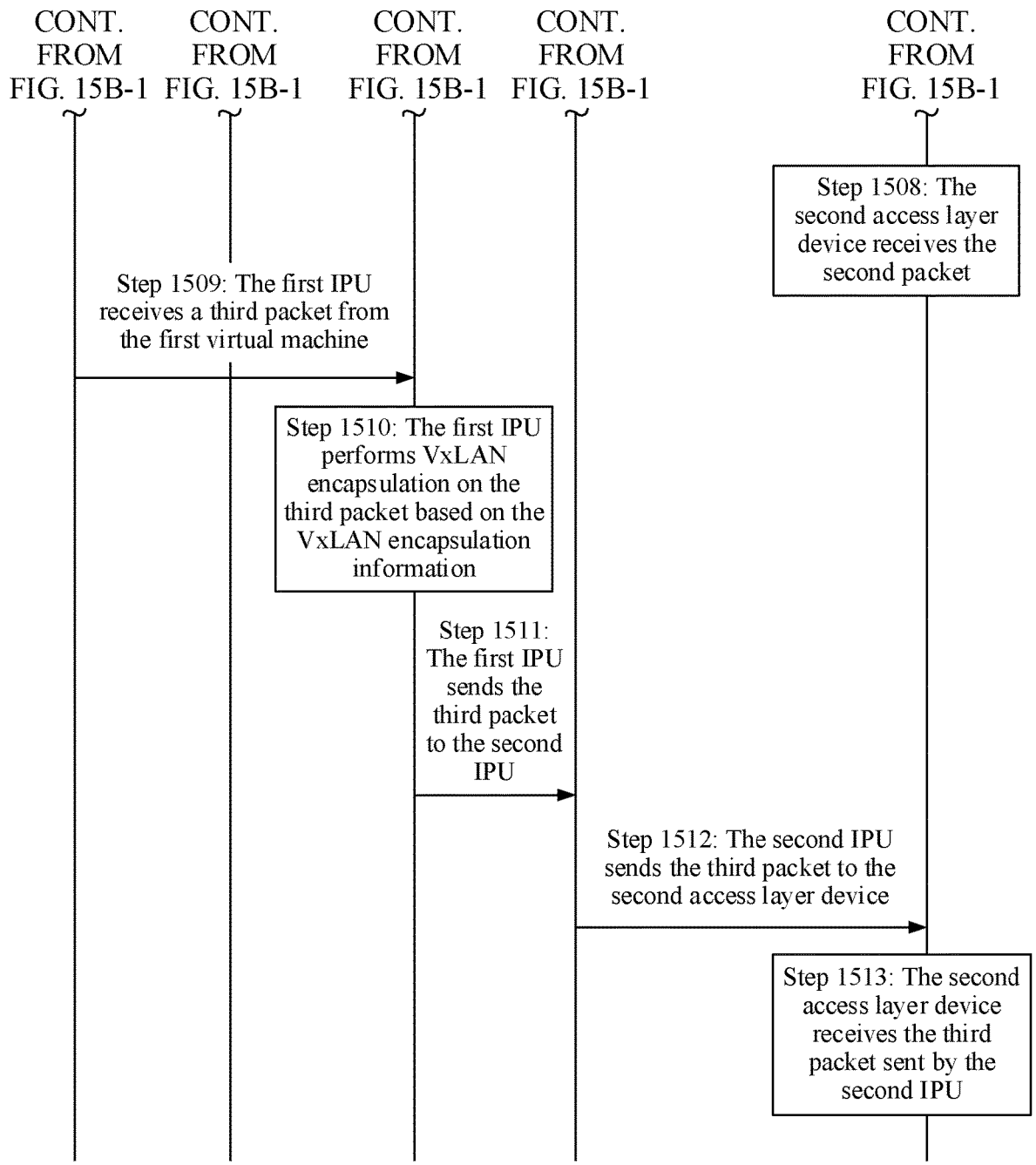

With reference to FIG. 15A, as shown in FIG. 15B-1 and FIG. 15B-2, when a communication fault occurs between the first access layer device and the first IPU, the packet forwarding method provided in the embodiments of this application further includes step 1509 to step 1513.

Step 1509: The first IPU receives a third packet from the first virtual machine.

A destination address of the third packet may be the same as the destination address of the first packet in step 1501.

Step 1510: The first IPU performs VxLAN encapsulation on the third packet based on the VxLAN encapsulation information.

Step 1511: The first IPU sends the third packet to the second IPU.

In the embodiments of this application, the first IPU detects that a communication fault occurs between the first IPU and the first access network device (for example, a fault occurs on the first physical port). In this case, the first IPU sends the third packet to another IPU (for example, the second IPU), so that the third packet is forwarded through a port of the another IPU.

Step 1512: The second IPU sends the third packet to the second access layer device.

Step 1513: The second access layer device receives the third packet sent by the second IPU.

Subsequently, the second access layer device sends the third packet to the first aggregation layer device, so that the packet is forwarded to a device corresponding to the destination address of the third packet. For a forwarding path of the third packet, refer to the curve in FIG. 11E. It can be learned that, in this case, a packet is forwarded across nodes, that is, the virtual routing device performs remote memory access when a communication fault occurs, so as to ensure that the packet is successfully sent to the network device, thereby improving communication reliability.

Correspondingly, the embodiments of this application provide a computer device. The computer device is applied to a virtual routing device, the virtual routing device is applied to the data center in the NUMA architecture in the foregoing method embodiments, the data center includes a server and a network device, a virtual machine and the virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine.

Figure 16:
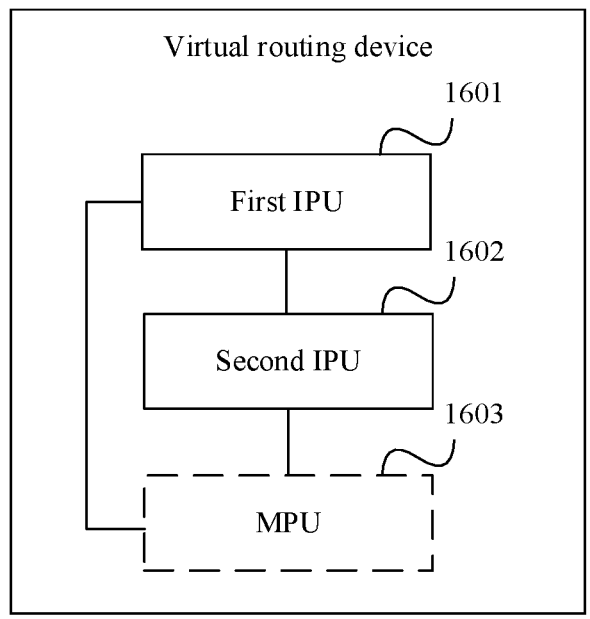
FIG. 16 is a schematic structural diagram of a virtual routing device according to an embodiment of this application.

As shown in FIG. 16, the virtual routing device includes a first IPU 1601, configured to: receive a first packet from the network device, where the first packet is a packet to be sent to the first virtual machine; and send the first packet to the first virtual machine. The first IPU is located on the first NUMA node, the first IPU includes a first virtual port and a first physical port, the first IPU is connected to the first virtual machine through the first virtual port, and the first IPU is connected to the network device through the first physical port. For example, the first IPU 1601 is configured to support the virtual routing device in performing step 903, step 904, step 1205, step 1206, step 1411, and step 1412 in the foregoing method embodiments.

The virtual routing device includes a second IPU 1602, configured to: receive a second packet from the network device, where the second packet is a packet to be sent to the second virtual machine; and send the second packet to the second virtual machine. The second IPU is located on the second NUMA node, the second IPU includes a second virtual port and a second physical port, the second IPU is connected to the second virtual machine through the second virtual port, and the second IPU is connected to the network device through the second physical port. For example, the second IPU 1602 is configured to support the virtual routing device in performing step 907, step 908, step 1211, step 1212, step 1405, and step 1406 in the foregoing method embodiments.

Optionally, the second IPU 1602 is further configured to perform step 910, step 911, step 1217, step 1218, step 1417, and step 1418 in the foregoing method embodiments.

The first IPU 1601 of the virtual routing device is further configured to: receive a first packet from the first virtual machine; and send the first packet to the network device. For example, the first IPU 1601 is configured to support the virtual routing device in performing step 1001, step 1002, step 1005, step 1006, step 1301, step 1302, step 1303, step 1309, step 1310, step 1311, step 1501, step 1502, step 1503, step 1509, step 1510, and step 1511 in the foregoing method embodiments.

The second IPU 1602 is configured to: receive a second packet from the second virtual machine; and send the second packet to the network device. For example, the second IPU 1602 is configured to support the virtual routing device in performing step 1003, step 1004, step 1007, step 1305, step 1306, step 1307, step 1312, step 1505, step 1506, step 1507, and step 1512 in the foregoing method embodiments.

The first IPU 1601 of the virtual routing device is further configured to send first routing information to the network device, where the first routing information includes an address of the first IPU. For example, the first IPU 1601 is configured to support the virtual routing device in performing step 801 (for example, step 801*a*), step 803, and step 801' in the foregoing method embodiment.

The second IPU 1602 is further configured to send second routing information to the network device, where the second routing information includes an address of the second IPU. For example, the second IPU 1602 is configured to support the virtual routing device in performing step 801 (for example, step 801*b*) and step 803 in the foregoing method embodiment.

Optionally, the first IPU 1601 of the virtual routing device is further configured to perform other steps in the embodiments of this application, for example, step 704 and step 705. The second IPU 1602 is further configured to perform other steps in the embodiments of this application, for example, step 707 and step 708.

For detailed descriptions corresponding to the foregoing steps, refer to FIG. 7A and FIG. 7B, FIG. 8A, FIG. 8B, FIG. 8C, FIG. 9A, FIG. 9B-1 and FIG. 9B-2, FIG. 10A, FIG. 10B, FIG. 12A-1 to FIG. 12A-3, FIG. 12B-1 to FIG. 12B-4, FIG. 13A, FIG. 13B-1 and FIG. 13B-2, FIG. 14A-1 to FIG. 14A-3, FIG. 14B-1 to FIG. 14B-4, FIG. 15A, and FIG. 15B-1 and FIG. 15B-2, and the detailed descriptions in the foregoing method embodiments. Details are not described herein again.

Optionally, the first IPU 1601 and the second IPU 1602 are further configured to perform other related actions in the foregoing method embodiments. For details, refer to the descriptions in the foregoing embodiments. Details are not described herein again.

Optionally, as shown in FIG. 16, the virtual routing device further includes at least one MPU 1603. The MPU 1603 may support the virtual routing device in completing operations on a control plane. For example, the MPU 1603 performs steps 703 and step 706 in the foregoing method embodiment.

The apparatus embodiment described in FIG. 16 is merely an example. For example, the unit (or module) division is merely logical function division, and there may be other division manners in actual implementation. For example, a plurality of units or components may be combined or integrated into another system, or some features may be ignored or may not be performed. Function units in the embodiments of this application may be integrated into one module, or each of the modules may exist independently physically, or two or more units are integrated into one module. In FIG. 16, a form of a software function unit may be used. For example, the first IPU 1601, the second IPU 1602, and the MPU 1603 may be implemented by a software function module generated after the at least one processor 401 of the server in FIG. 4 reads the program code stored in the memory. The foregoing units in FIG. 16 may alternatively be separately implemented by different hardware of the server in FIG. 4. For example, the first IPU 1601 and the MPU 1603 are implemented by some processing resources (for example, one core or two cores in a multi-core processor) in the at least one processor 401 in FIG. 4. In this way, the processor 401 may perform step 704, step 705, step 801 (specifically, step 801*a*), step 803, step 801', step 903, step 904, step 1001, step 1002, step 1005, step 1006, step 1205, step 1206, step 1301, step 1302, step 1303, step 1309, step 1310, step 1311, step 1411, step 1412, step 1501, step 1502, step 1503, step 1509, step 1510, and step 1511 in the foregoing method embodiments.

The second IPU 1602 may be implemented by the other processing resources (for example, the other cores in the multi-core processor) in the at least one processor 401 of the server in FIG. 4. In this way, the processing 401 may perform step 707, step 708, step 801 (specifically, step 801*b*), step 803, step 907, step 908, step 910, step 911, step 1003, step 1004, step 1007, step 1211, step 1212, step 1405, step 1406, step 1217, step 1218, step 1305, step 1306, step 1307, step 1312, step 1417, step 1418, step 1505, step 1506, step 1507, and step 1512 in the foregoing method embodiments.

The processor 401 is further configured to perform other related actions in the foregoing method embodiments. For details, refer to the descriptions in the foregoing embodiments. Details are not described herein again.

Optionally, in the embodiments of this application, the physical port (for example, the first physical port) of the first IPU, the virtual port (for example, the first virtual port) of the first IPU, the physical port of the second IPU, and the virtual port of the second IPU may be implemented by the network interface 403 in FIG. 4. In this way, the first IPU receives a packet from the network device through the first physical port, and sends the packet to the first virtual machine through the first virtual port, or receives a packet from the first virtual machine through the first virtual port, and sends the packet to the network device through the first physical port. The second IPU receives a packet from the network device through the second physical port, and sends the packet to the second virtual machine through the second virtual port, or receives a packet from the second virtual machine through the second virtual port, and sends the packet to the network device through the second physical port. Obviously, the function modules may alternatively be implemented in a manner of combining software and hardware.

Correspondingly, the embodiments of this application provide a network device. The network device is applied to the data center in the NUMA architecture in the foregoing method embodiments, the data center includes a server and the network device, a virtual machine and a virtual routing device are deployed on the server, and the virtual machine communicates with the network device by using the virtual routing device. The server includes a first NUMA node and a second NUMA node, the virtual machine includes a first virtual machine and a second virtual machine, the first NUMA node includes the first virtual machine, and the second NUMA node includes the second virtual machine. The virtual routing device includes a first IPU and a second IPU, the first IPU is located on the first NUMA node, and the second IPU is located on the second NUMA node. The first IPU includes a first virtual port and a first physical port, the first IPU is connected to the first virtual machine through the first virtual port, and the first IPU is connected to the network device through the first physical port. The second IPU includes a second virtual port and a second physical port, the second IPU is connected to the second virtual machine through the second virtual port, and the second IPU is connected to the network device through the second physical port.

Figure 17:
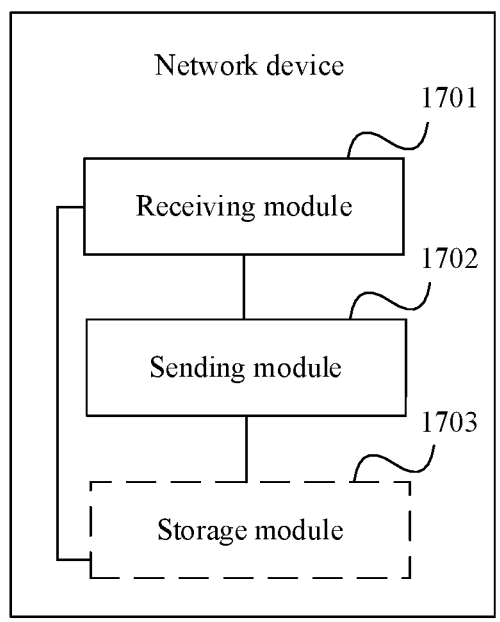
FIG. 17 is a schematic structural diagram of a network device according to an embodiment of this application.

As shown in FIG. 17, the network device includes a receiving module 1701 and a sending module 1702. The receiving module 1701 is configured to receive a first packet, where the first packet is a packet to be sent to the first virtual machine. For example, the receiving module 1701 is configured to support the network device in performing step 901 and step 1008 in the foregoing method embodiments. The sending module 1702 is configured to send the first packet to the first IPU. For example, the sending module 1702 is configured to support the network device in performing step 902 in the foregoing method embodiment.

The receiving module 1701 is further configured to receive a second packet, where the second packet is a packet to be sent to the second virtual machine. For example, the receiving module 1701 is configured to support the network device in performing step 905 in the foregoing method embodiment. The sending module 1702 is further configured to send the second packet to the second IPU. For example, the sending module 1072 is configured to support the network device in performing step 906 and step 909 in the foregoing method embodiment.

The receiving module 1701 of the network device provided in the embodiments of this application is further configured to: receive a first packet sent by the first IPU, where the first packet is received by the first IPU from the first virtual machine; and receive a second packet sent by the second IPU, where the second packet is received by the second IPU from the second virtual machine.

The receiving module 1701 of the network device provided in the embodiments of this application is further configured to receive first routing information and second routing information from the virtual routing device, where the first routing information includes an address of the first IPU, and the second routing information includes an address of the second IPU. The first routing information is used to indicate to the network device to send the received first packet to the first IPU, and the first packet is a packet to be sent to the first virtual machine. The second routing information is used to indicate to the network device to send the received second packet to the second IPU, and the second packet is a packet to be sent to the second virtual machine. For example, the receiving module 1701 is configured to support the network device in performing step 802 (including step 802*a* and step 802*b*), step 804, and step 802' in the foregoing method embodiment.

Optionally, the sending module 1702 of the network device is further configured to send fourth routing information to the virtual routing device, where the fourth routing information is used to indicate to the virtual routing device to send a packet whose destination address is the network device to the network device.

When the network device is a device in a multi-layer network, the network device includes, for example, a first aggregation layer device, a second aggregation layer device, a first access layer device, and a second access layer device. The first IPU is connected to the first access layer device, and the first access layer device is connected to the first aggregation layer device. The second IPU is connected to the second access layer device, and the second access layer device is connected to the second aggregation layer device.

It should be understood that the first aggregation layer device includes a receiving module and a sending module, and the first access layer device also includes a receiving module and a sending module. The receiving module of the first aggregation layer device is configured to perform step 1201 and step 1401 in the foregoing method embodiments. The sending module of the first aggregation layer device is configured to perform step 1202, step 1215, step 1402, and step 1415 in the foregoing method embodiments. The receiving module of the first access layer device is configured to perform step 1213, step 1304, step 1403, step 1413, and step 1504 in the foregoing method embodiments. The sending module of the first access layer device is configured to perform step 1204, step 1214, step 1404, and step 1414 in the foregoing method embodiments.

The second aggregation layer device includes a receiving module and a sending module, and the second access layer device also includes a receiving module and a sending module. The receiving module of the second aggregation layer device is configured to perform step 1207 and step 1407 in the foregoing method embodiments. The sending module of the second aggregation layer device is configured to perform step 1208, step 1215, step 1408, and step 1415 in the foregoing method embodiments. The receiving module of the second access layer device is configured to perform step 1209, step 1308, step 1313, step 1409, step 1508, and step 1513 in the foregoing method embodiments. The sending module of the second access layer device is configured to perform step 1210, step 1216, step 1410, and step 1416 in the foregoing method embodiments.

Optionally, the network device provided in the embodiments of this application further includes a storage module 1703. The storage module is configured to store first routing information and second routing information.

For detailed descriptions corresponding to the foregoing steps performed by the receiving module 1701 and the sending module 1702 of the network device, refer to FIG. 8A, FIG. 8B, FIG. 8C, FIG. 9A, FIG. 9B-1 and FIG. 9B-2, FIG. 10A, FIG. 10B, FIG. 12A-1 to FIG. 12A-3, FIG. 12B-1 to FIG. 12B-4, FIG. 13A, FIG. 13B-1 and FIG. 13B-2, FIG. 14A-1 to FIG. 14A-3, FIG. 14B-1 to FIG. 14B-4, FIG. 15A, and FIG. 15B-1 and FIG. 15B-2, and the detailed descriptions in the foregoing method embodiments. Details are not described herein again.

The apparatus embodiment described in FIG. 17 is merely an example. For example, the module division is merely logical function division, and there may be other division manners in actual implementation. For example, a plurality of modules or components may be combined or integrated into another system, or some features may be ignored or may not be performed. Function modules in the embodiments of this application may be integrated into one module, or each of the modules may exist independently physically, or two or more modules are integrated into one module. The foregoing modules in FIG. 17 may be implemented in a form of hardware, or may be implemented in a form of a software function unit. The network device includes a processor, a memory, and a network interface. The processor may support the network device in generating a forwarding entry based on first routing information and second routing information. Optionally, the processor also supports the network device in processing (for example, encapsulating or decapsulating) a received packet. The storage module 1703 may be a memory of the network device. The memory may support the network device in storing a received packet, and storing first routing information and second routing information, and a forwarding entry generated based on the first routing information and the second routing information. The network interface may support the network device in receiving a packet and/or sending a packet. The receiving module 1701 and the sending module 1702 are implemented by the network interface 403 in FIG. 4.

In this way, the network interface 403 may perform step 802 (including step 802*a* and step 802*b*), step 804, step 802', step 901, step 902, step 905, step 906, step 909, step 1008, step 1201, step 1202, step 1204, step 1207, step 1208, step 1209, step 1210, step 1213, step 1214, step 1215, step 1216, step 1304, step 1308, step 1313, step 1401, step 1402, and step 1403, step 1404, step 1407, step 1408, step 1409, step 1410, step 1413, step 1414, step 1415, step 1416, step 1504, step 1508, and step 1513 in the foregoing method embodiments.

The embodiments in this specification are all described in a progressive manner. For same or similar parts in the embodiments, refer to these embodiments. Each embodiment focuses on a difference from other embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instruction is loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above. For detailed working processes of the system, the apparatus, and the unit described above, refer to corresponding processes in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the method according to the embodiments of this application. The foregoing storage medium includes any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A computer device, wherein the computer device is implemented as a virtual routing device, wherein the virtual routing device is implemented as a data center in a non-uniform memory access (NUMA) architecture, the data center comprises a server and a network device, a virtual machine, and the virtual routing device is deployed on the server, and the virtual machine communicates with the network device by using the virtual routing device; the server comprises a first NUMA node and a second NUMA node, the virtual machine comprises a first virtual machine and a second virtual machine, the first NUMA node comprises the first virtual machine, and the second NUMA node comprises the second virtual machine, and wherein the virtual routing device comprises:

a first interface processing unit (IPU), wherein the first IPU is implemented on a network interface card (NIC) located on a first NUMA node, the first IPU comprises a first virtual port and a first physical port, the first IPU is connected to the first virtual machine through the first virtual port, and the first IPU is connected to the network device through the first physical port, the first IPU being configured to:
send first routing information to the network device, wherein the first routing information comprises an address of the first IPU, the first routing information indicates to the network device to send packets intended for the first virtual machine to the first IPU;
receive a first packet from the network device, wherein the first packet is a packet to be sent to the first virtual machine;
cache the first packet in the first memory; and
send the first packet to the first virtual machine; and a second IPU, wherein the second IPU is located on the second NUMA node, the second IPU comprises a second virtual port and a second physical port, the second IPU is connected to the second virtual machine through the second virtual port, and the second IPU is connected to the network device through the second physical port, wherein the second IPU is configured to:
send second routing information to the network device, wherein the second routing information comprises an address of the second IPU, the first routing information indicates to the network device to send packets intended for the second virtual machine to the second IPU;
receive a second packet from the network device, wherein the second packet is a packet to be sent to the second virtual machine; and
send the second packet to the second virtual machine.

2. The computer device according to claim 1, wherein the second IPU is further configured to: when a communication fault occurs between the network device and the first IPU, receive a third packet from the network device, wherein the third packet is a packet to be sent to the first virtual machine; and send the third packet to the first virtual machine.

3. The computer device according to claim 1, wherein when the data center is located in a segment routing over internet protocol version 6 (SRv6) network, an address of the IPU is an SRv6 locator, and a virtual private network identifier of the virtual machine is a virtual private network segment identifier (VPN SID); and
the first IPU is configured to: decapsulate the first packet to obtain a VPN SID of the first virtual machine; and send the first packet to the first virtual machine based on the VPN SID of the first virtual machine.

4. The computer device according to claim 1, wherein when the data center is located in a virtual extensible local area network (VxLAN), an address of the IPU is a VxLAN tunnel endpoint (VTEP) address, and a virtual private network identifier of the virtual machine is a virtual network identifier (VNI); and
the first IPU is configured to: decapsulate the first packet to obtain a VNI of the first virtual machine; and send the first packet to the first virtual machine based on the VNI of the first virtual machine.

5. The computer device according to claim 1, wherein an address of the first IPU is different from an address of the second IPU; and
a virtual private network identifier of the first virtual machine is assigned based on the address of the first IPU, and a virtual private network identifier of the second virtual machine is assigned based on the address of the second IPU.

6. A computer device, implemented as a virtual routing device, and the virtual routing device comprises:
a first interface processing unit (IPU) implemented on a network interface card (NIC), configured to send first routing information to a network device, wherein the first routing information comprises an address of the first IPU, the first routing information is used to indicate to the network device to send a received first packet to the first IPU, and the first packet is a packet to be sent to a first virtual machine; and the first IPU is located on a first NUMA node, the first IPU comprises a first virtual port and a first physical port, the first IPU is connected to the first virtual machine through the first virtual port, and the first IPU is connected to the network device through the first physical port;
wherein the virtual routing device is implemented as a data center in a non-uniform memory access (NUMA) architecture, the data center comprises a server and the network device, a virtual machine and the virtual routing device are deployed on the server, and the virtual machine communicates with the network device by using the virtual routing device; the server comprises the first NUMA node and a second NUMA node, the virtual machine comprises the first virtual machine and a second virtual machine, the first NUMA node comprises the first virtual machine, and the second NUMA node comprises the second virtual machine;
and a second IPU implemented on a NIC, configured to send second routing information to the network device, wherein the second routing information comprises an address of the second IPU, the second routing information is used to indicate to the network device to send a received second packet to the second IPU, and the second packet is a packet to be sent to the second virtual machine; and the second IPU is located on the second NUMA node, the second IPU comprises a second virtual port and a second physical port, the second IPU is connected to the second virtual machine through the second virtual port, and the second IPU is connected to the network device through the second physical port.

7. The computer device according to claim 6, wherein when the data center is located in a segment routing over internet protocol version 6 (SRv6) network, an address of the IPU is an SRv6 locator, and a virtual private network identifier of the virtual machine is a virtual private network segment identifier (VPN SID).

8. The computer device according to claim 7, wherein the first IPU is further configured to send third routing information to the network device, wherein the third routing information comprises an address of the virtual routing device, and the third routing information is used to indicate to the network device to send a received third packet to the second IPU when a communication fault occurs between the network device and the first IPU, wherein the third packet is a packet to be sent to the first virtual machine; or
the second IPU is further configured to send third routing information to the network device, wherein the third routing information is used to indicate to the network device to send a received fourth packet to the first IPU when a communication fault occurs between the network device and the second IPU, wherein the fourth packet is a packet to be sent to the second virtual machine.

9. The computer device according to claim 6, wherein when the data center is located in a virtual extensible local area network (VxLAN), an address of the IPU is a VxLAN tunnel endpoint (VTEP) address, and a virtual private network identifier of the virtual machine is a virtual network identifier (VNI).

10. The computer device according to claim 6, wherein the second routing information further comprises the address of the first IPU; and
a priority of the address of the first IPU in the first routing information is higher than a priority of the address of the first IPU in the second routing information.

11. The computer device according to claim 6, wherein the first IPU is further configured to receive fourth routing information from the network device, wherein the fourth routing information is used to indicate to the first IPU to send a packet whose destination address is the network device to the network device; or the second IPU is further configured to receive fourth routing information from the network device, wherein the fourth routing information is used to indicate to the second IPU to send a packet whose destination address is the network device to the network device.

12. The computer device according to claim 6, wherein the virtual routing device further comprises at least one main processing unit (MPU).

13. A network device, the network device is implemented as a data center in a non-uniform memory access (NUMA) architecture, wherein the network device comprising:

at least one processor;

one or more memories coupled to the at least one processor and storing instructions for execution by the at least one processor, the instructions, when executed by the at least one processor, cause the network device to:

receive first routing information and second routing information from a virtual routing device, wherein the first routing information comprises an address of a first interface processing unit (IPU), and the second routing information comprises an address of a second IPU, wherein the data center further comprises a server, a virtual machine and the virtual routing device are deployed on the server, and the virtual machine communicates with the network device by using the virtual routing device; the server comprises a first NUMA node and a second NUMA node, the virtual machine comprises a first virtual machine and a second virtual machine, the first NUMA node comprises the first virtual machine, and the second NUMA node comprises the second virtual machine; the virtual routing device comprises the first IPU and the second IPU, the first IPU is located on the first NUMA node, and the second IPU is located on the second NUMA node; the first IPU comprises a first virtual port and a first physical port, the first IPU is connected to the first virtual machine through the first virtual port, and the first IPU is connected to the network device through the first physical port; the second IPU comprises a second virtual port and a second physical port, the second IPU is connected to the second virtual machine through the second virtual port, and the second IPU is connected to the network device through the second physical port;

the first routing information is used to indicate to the network device to send a received first packet to the first IPU, and the first packet is a packet to be sent to the first virtual machine; and the second routing information is used to indicate to the network device to send a received second packet to the second IPU, and the second packet is a packet to be sent to the second virtual machine.

14. The network device according to claim 13, wherein the instructions further instruct the at least one processor to cause the network device to: receive the first routing information from the first IPU of the virtual routing device; and receive the second routing information from the second IPU of the virtual routing device.

15. The network device according to claim 14, wherein the receiving module is further configured to receive third routing information from the virtual routing device, wherein the third routing information comprises an address of the virtual routing device, wherein the third routing information is used to indicate to the network device to send a received third packet to the second IPU when a communication fault occurs between the network device and the first IPU, wherein the third packet is a packet to be sent to the first virtual machine; or the third routing information is used to indicate to the network device to send a received fourth packet to the first IPU when a communication fault occurs between the network device and the second IPU, wherein the fourth packet is a packet to be sent to the second virtual machine.

16. The network device according to claim 14, wherein the first routing information further comprises the address of the second IPU; and a priority of the address of the first IPU in the first routing information is higher than a priority of the address of the first IPU in the second routing information.

* * * * *